INVENTORS
STEPHEN T. MORELAND
ROBERT E. TYNER

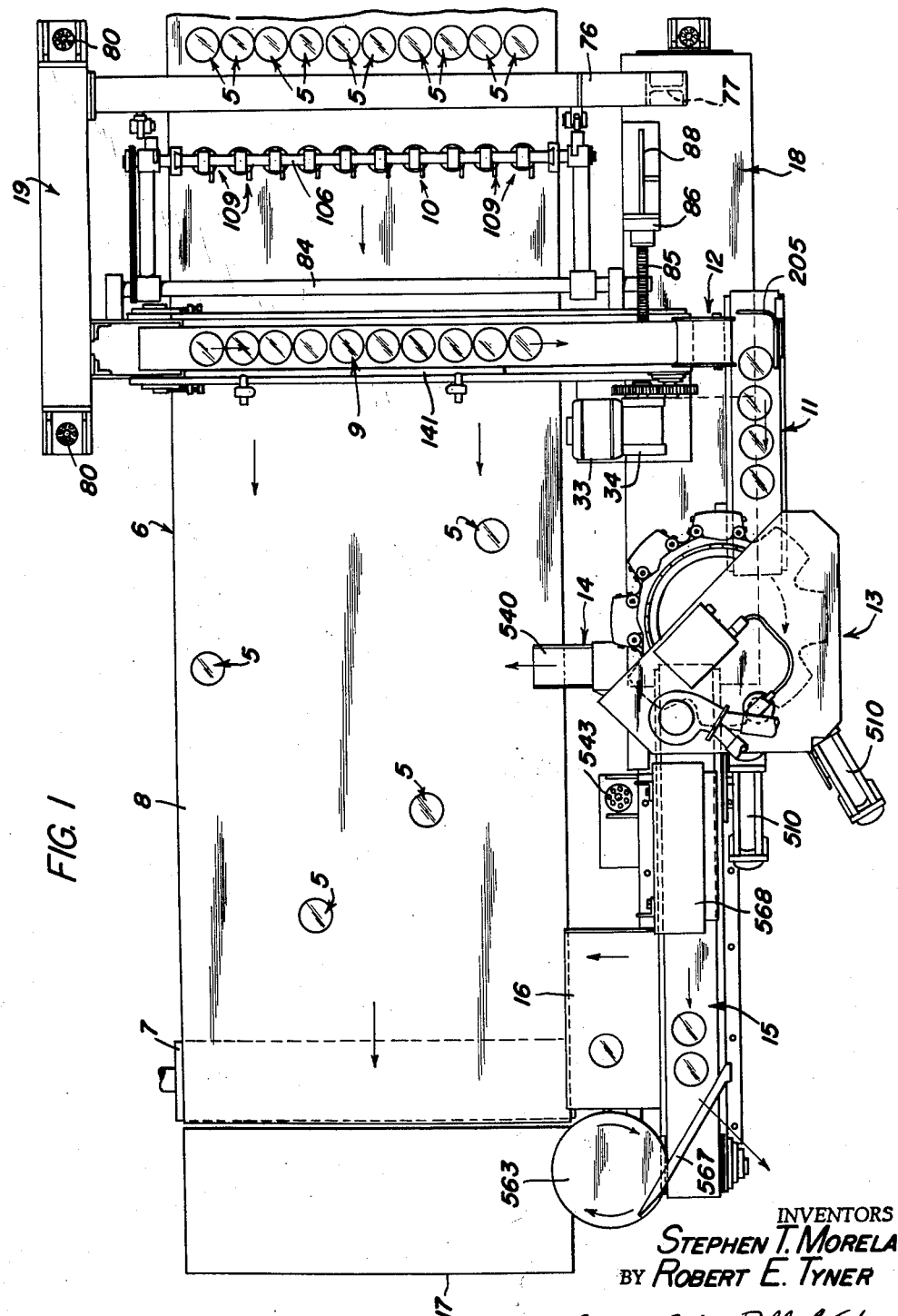

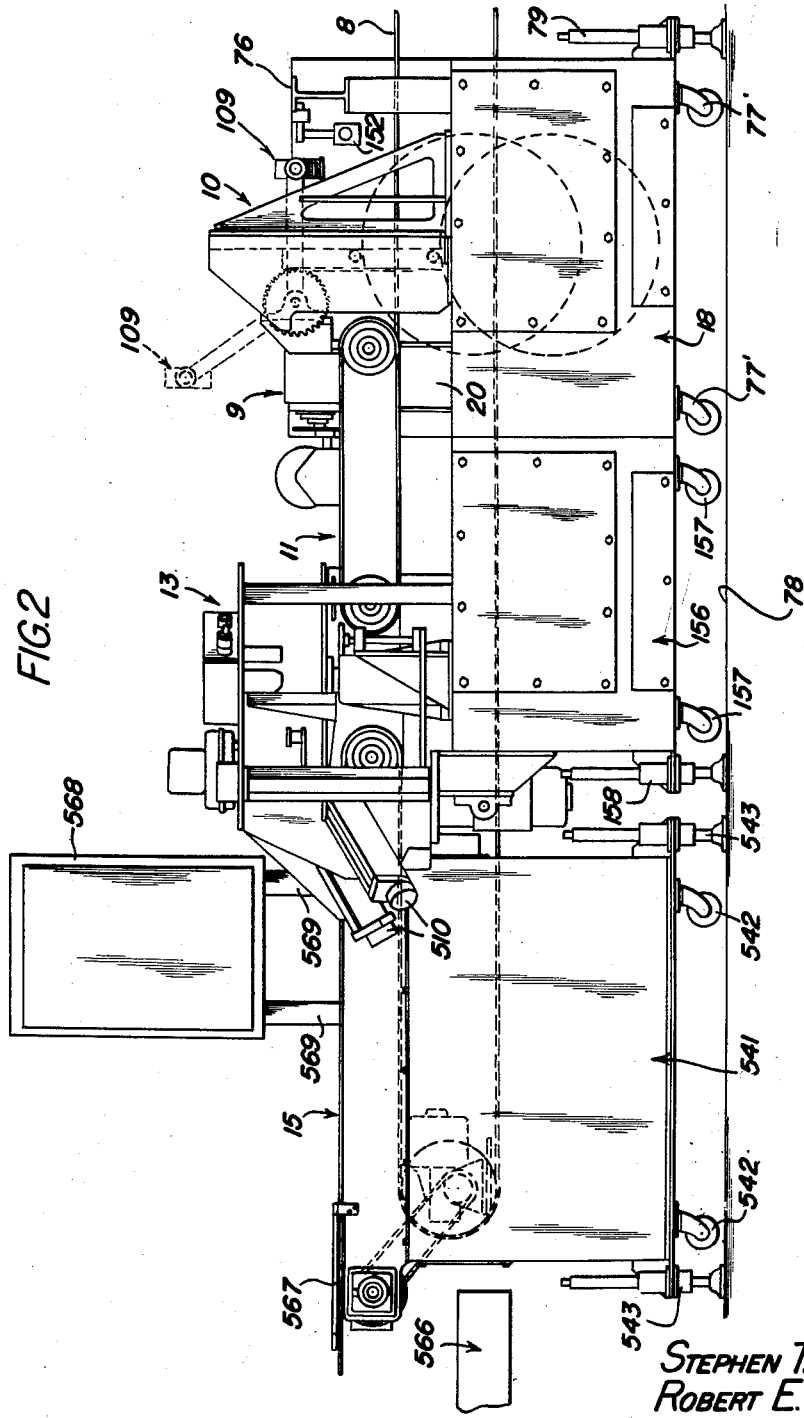

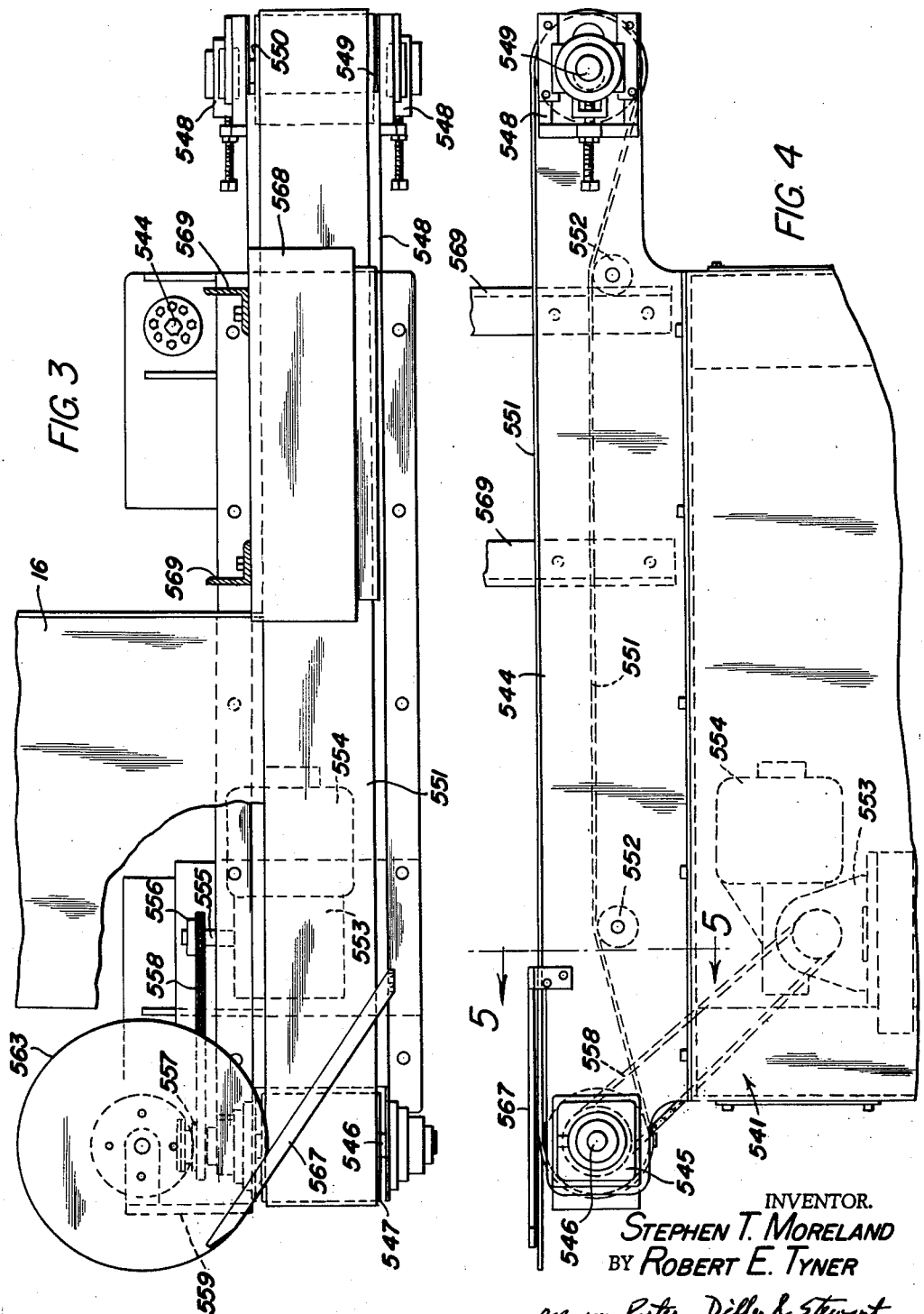

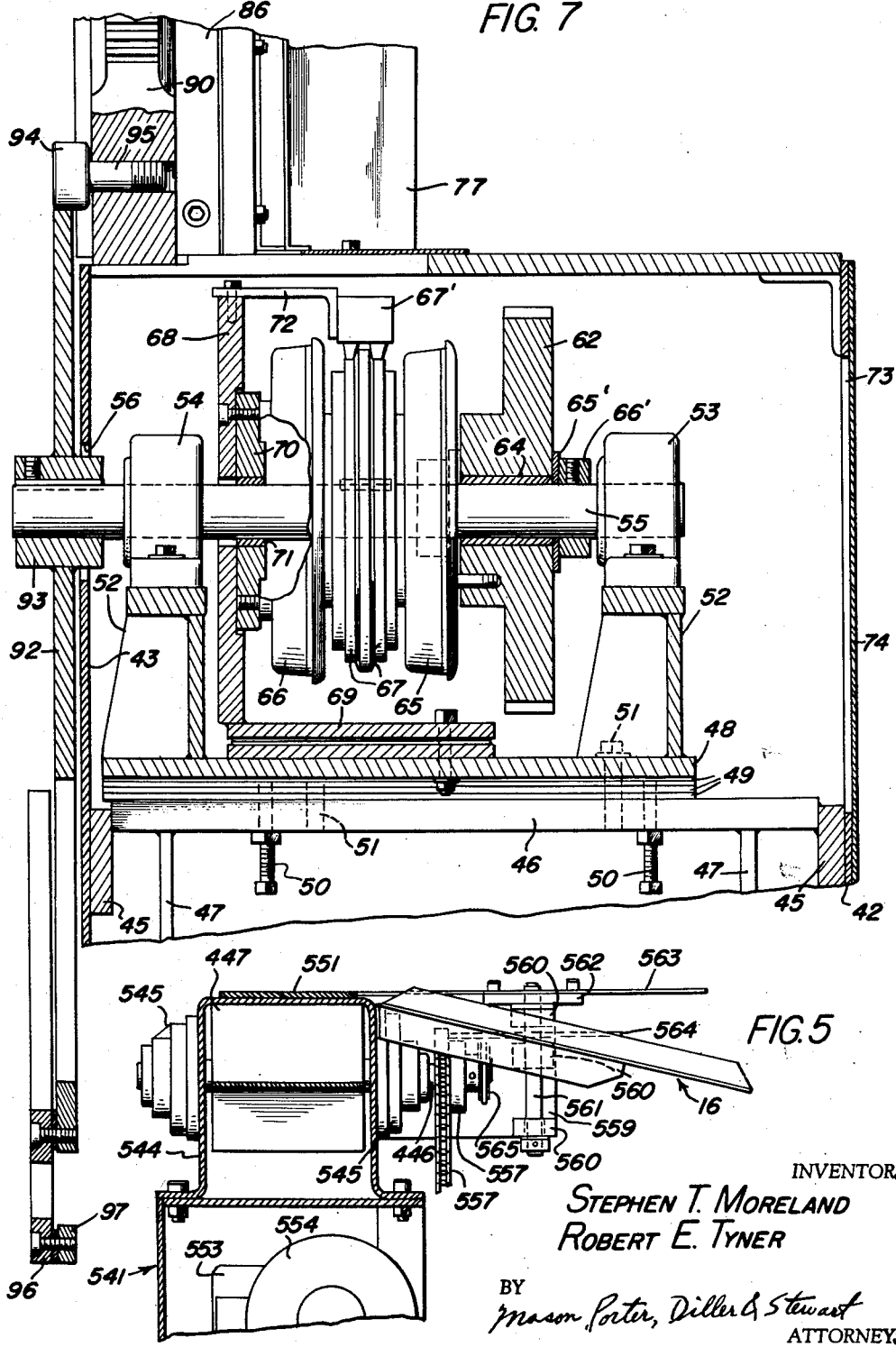

BY Mason, Porter, Diller & Stewart
ATTORNEYS

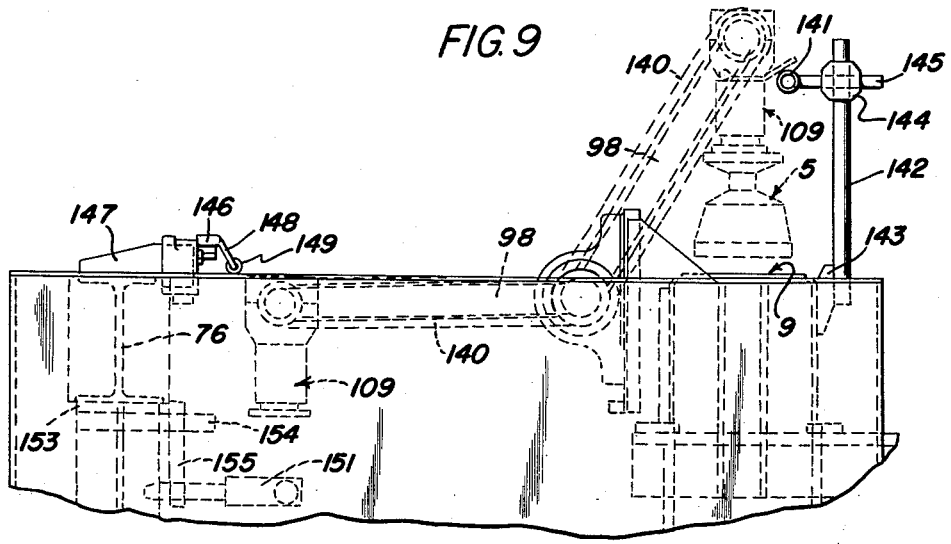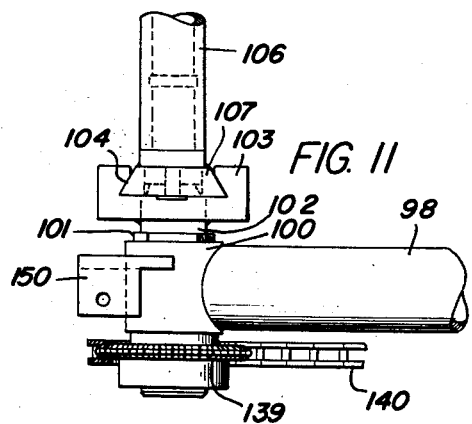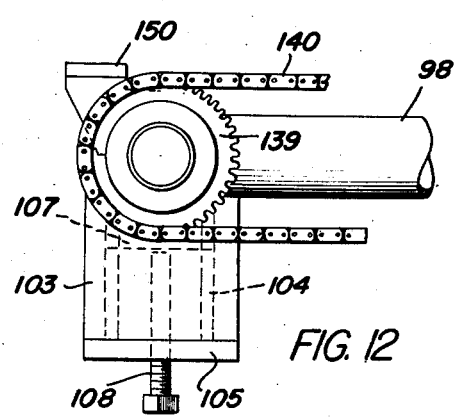

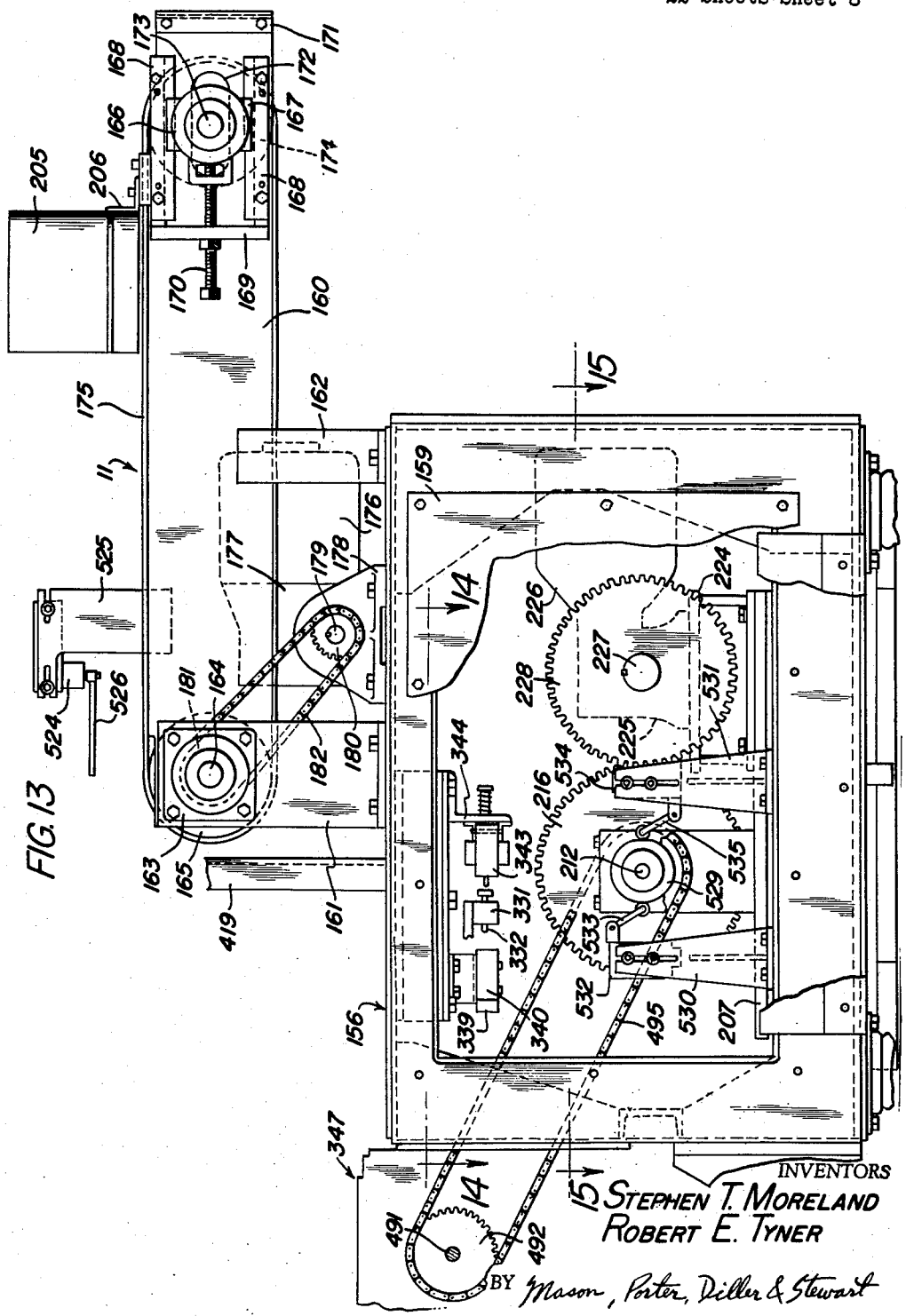

Jan. 22, 1963   S. T. MORELAND ETAL   3,074,550
PHOTOELECTRIC INSPECTION OF GLASSWARE
Filed March 20, 1959   22 Sheets-Sheet 9
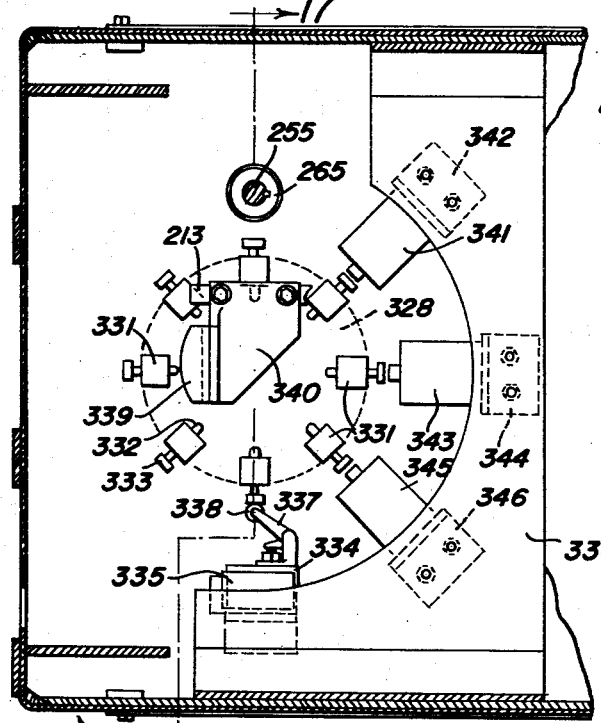
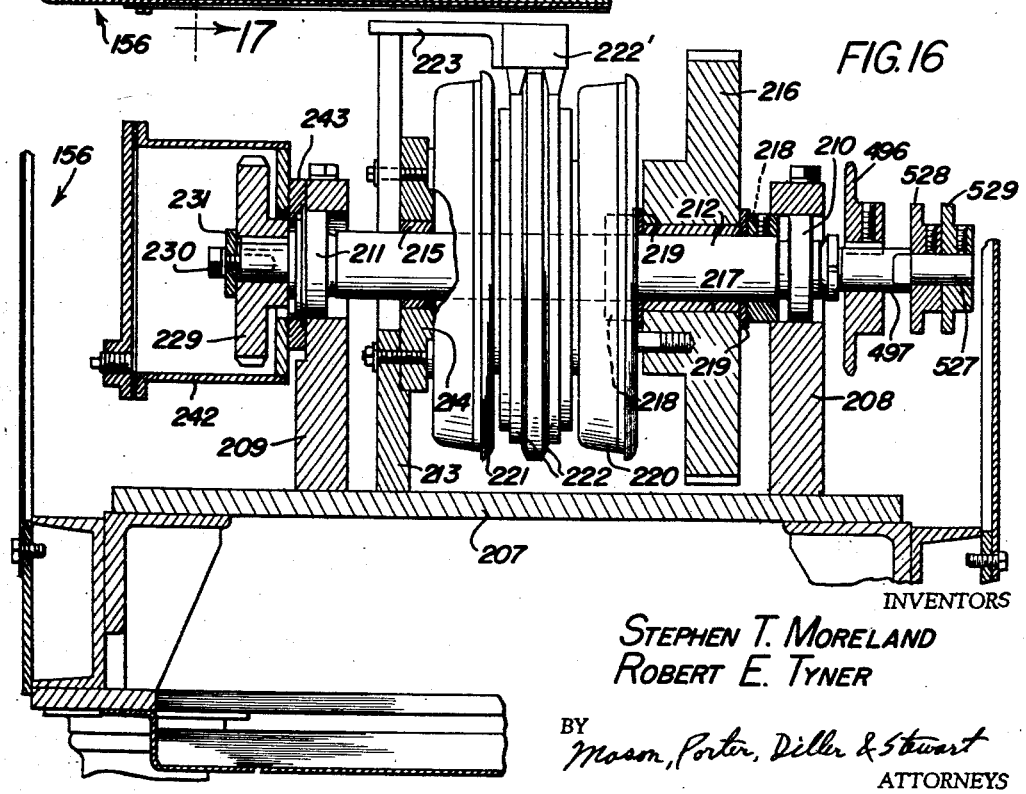
INVENTORS
STEPHEN T. MORELAND
ROBERT E. TYNER
BY Mason, Porter, Diller & Stewart
ATTORNEYS

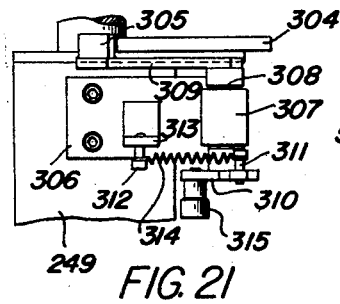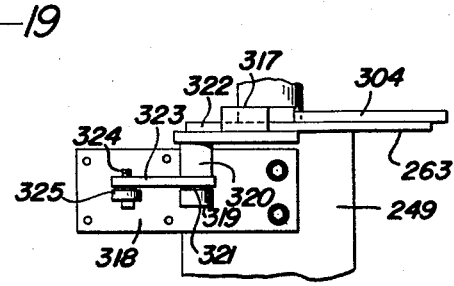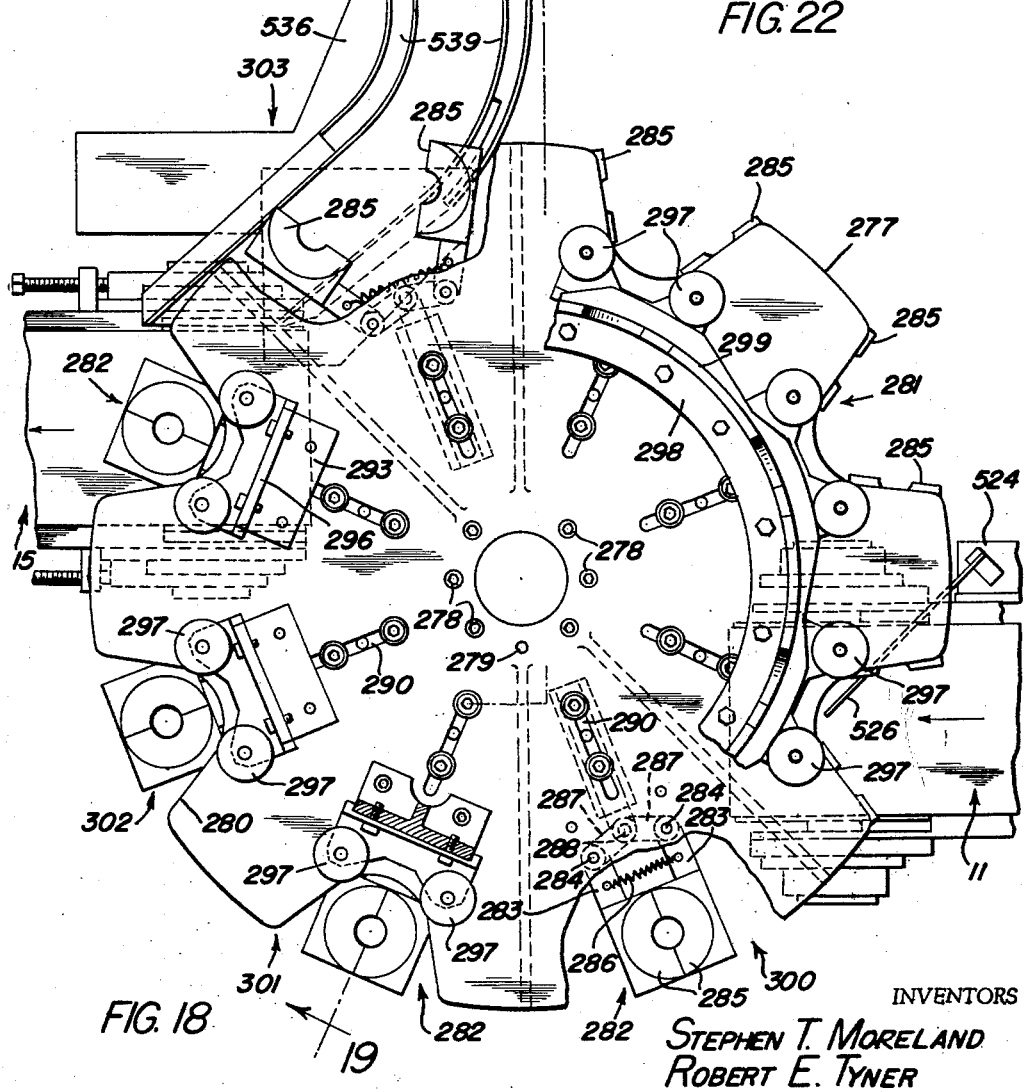

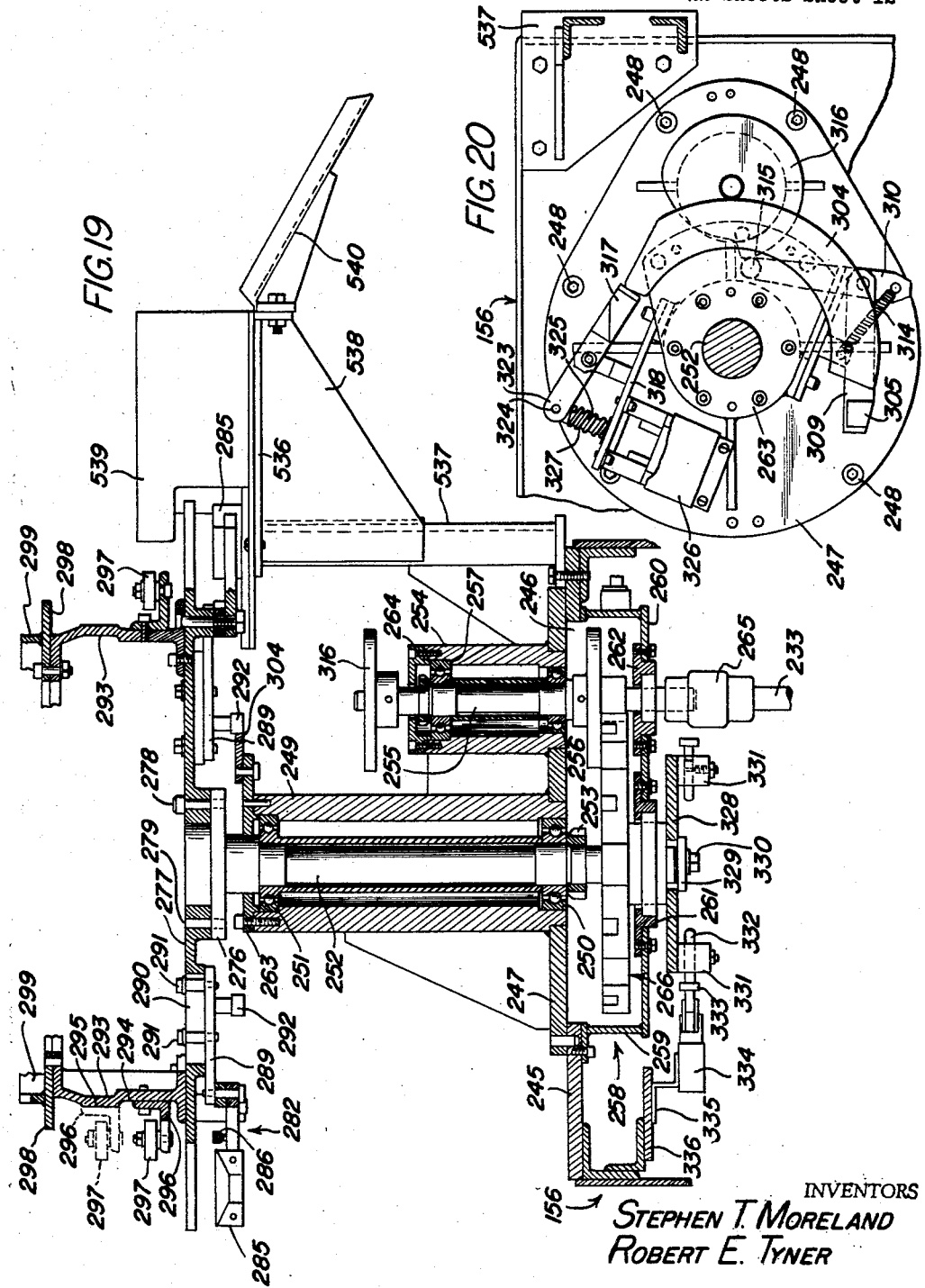

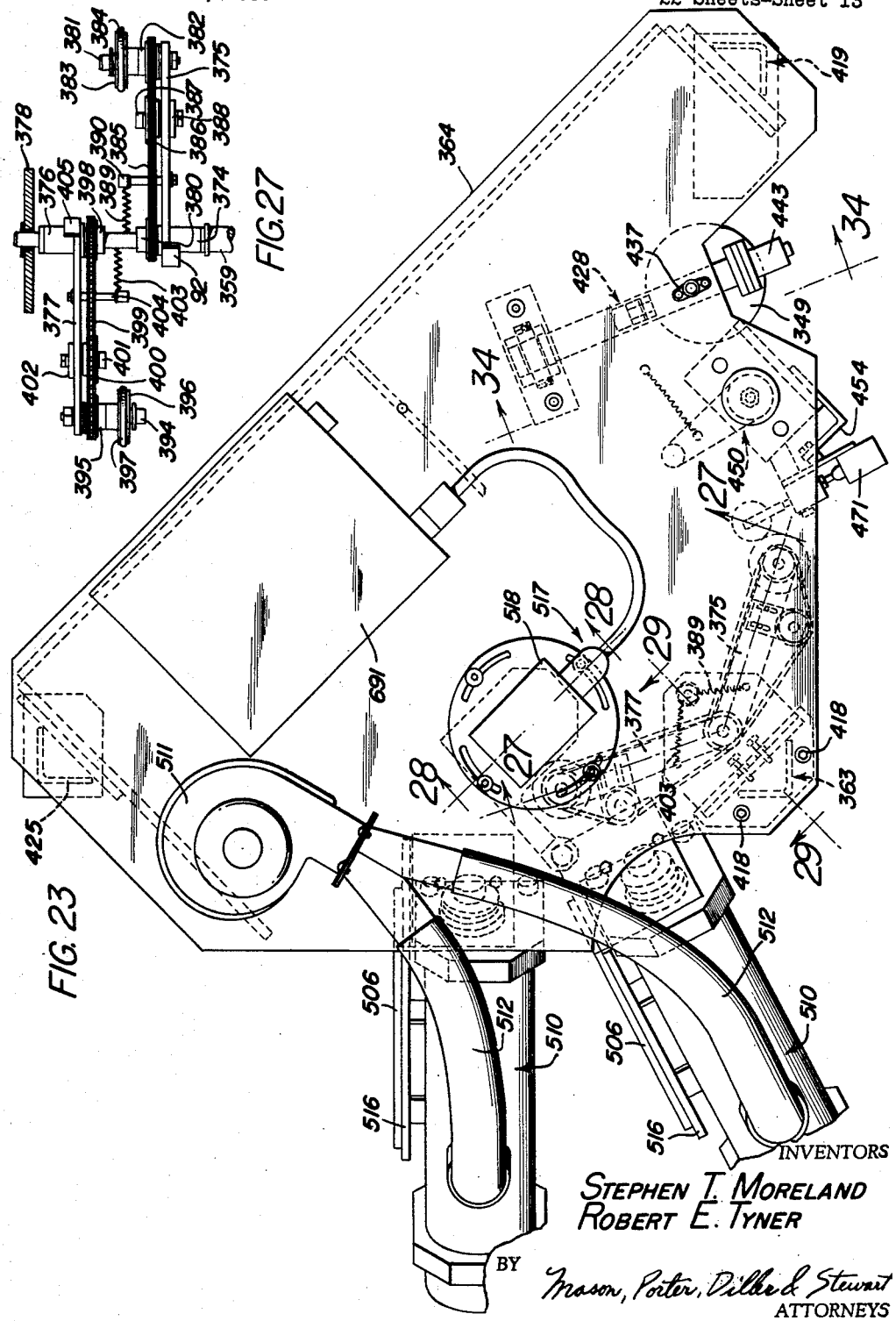

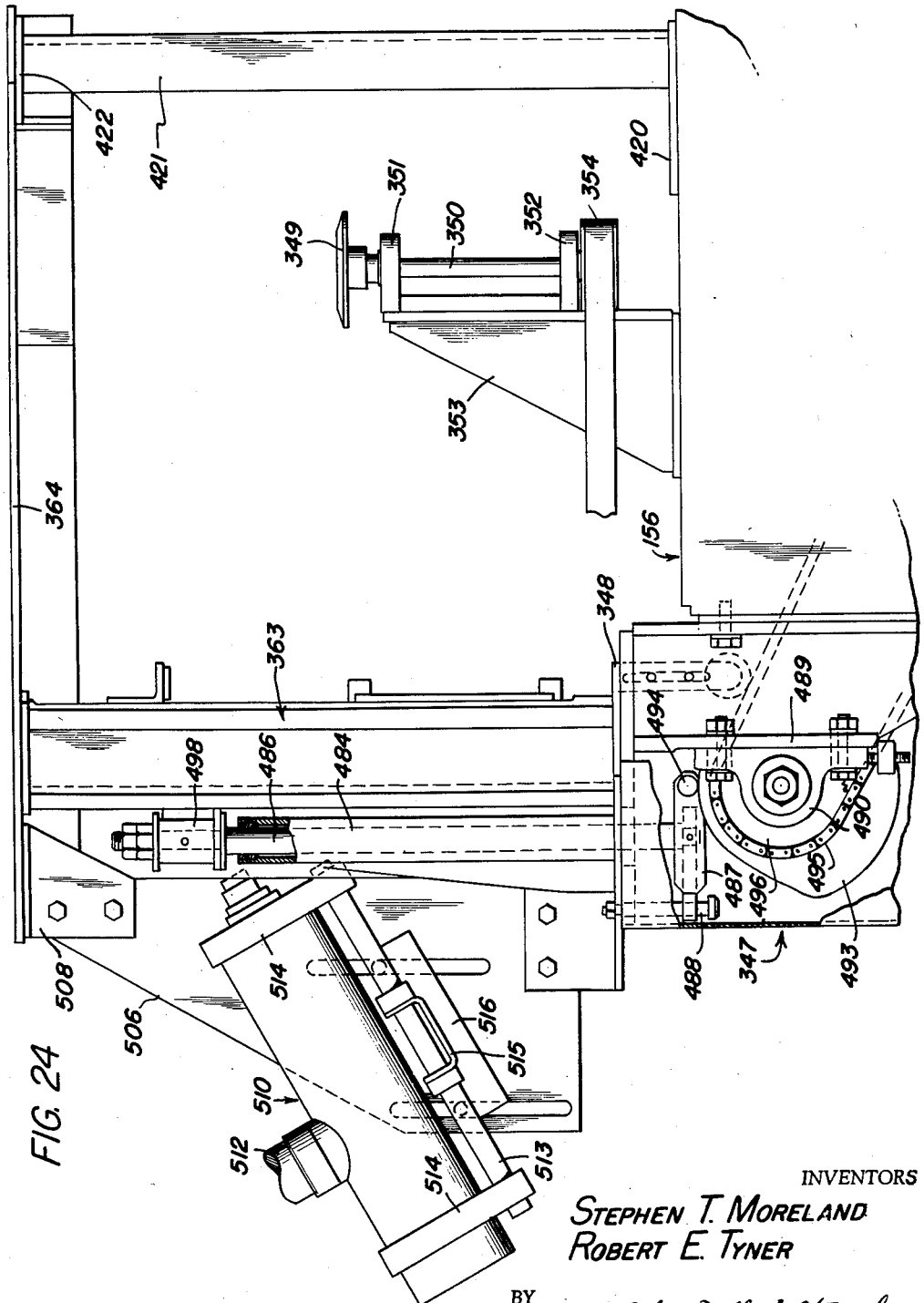

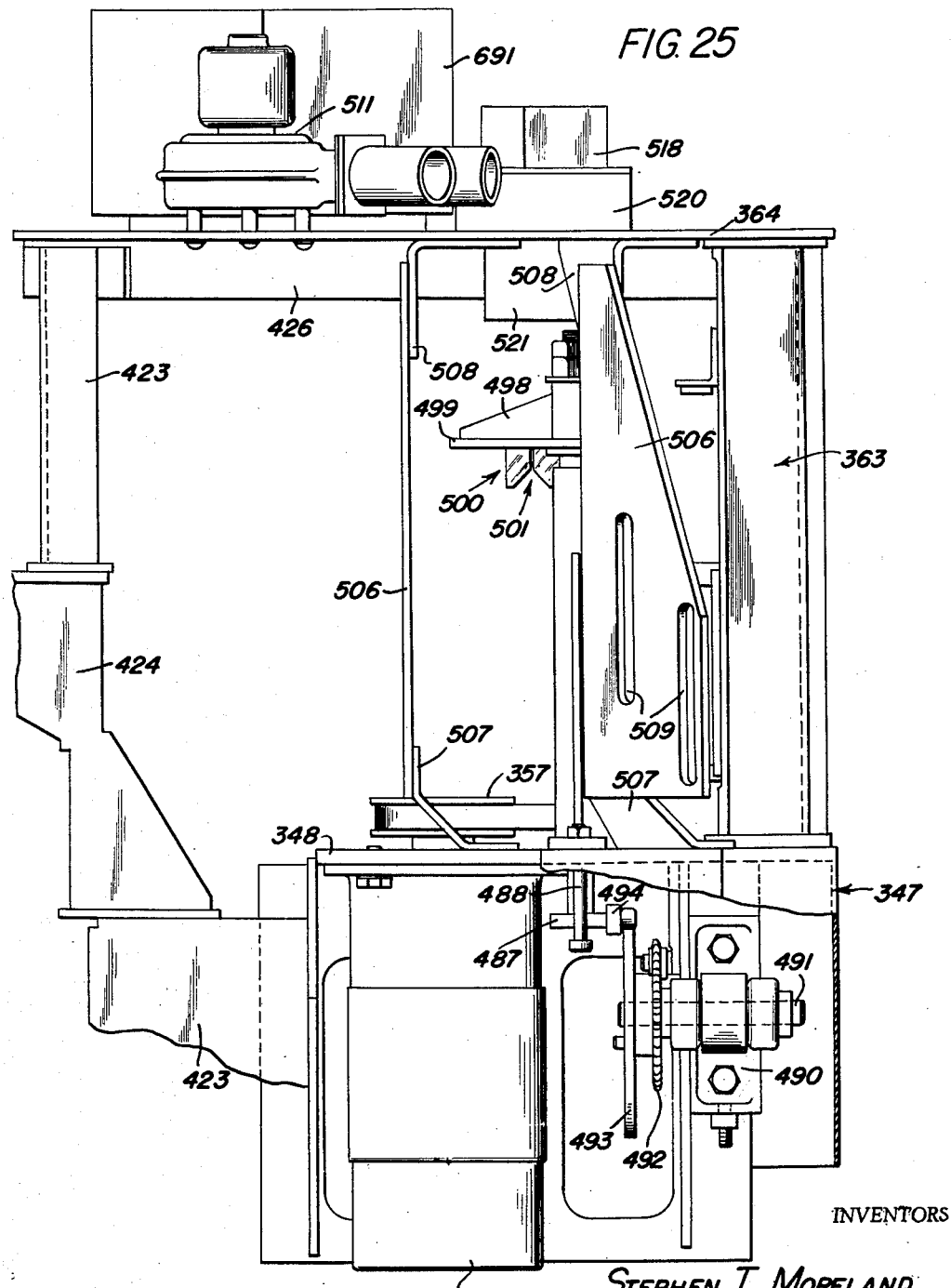

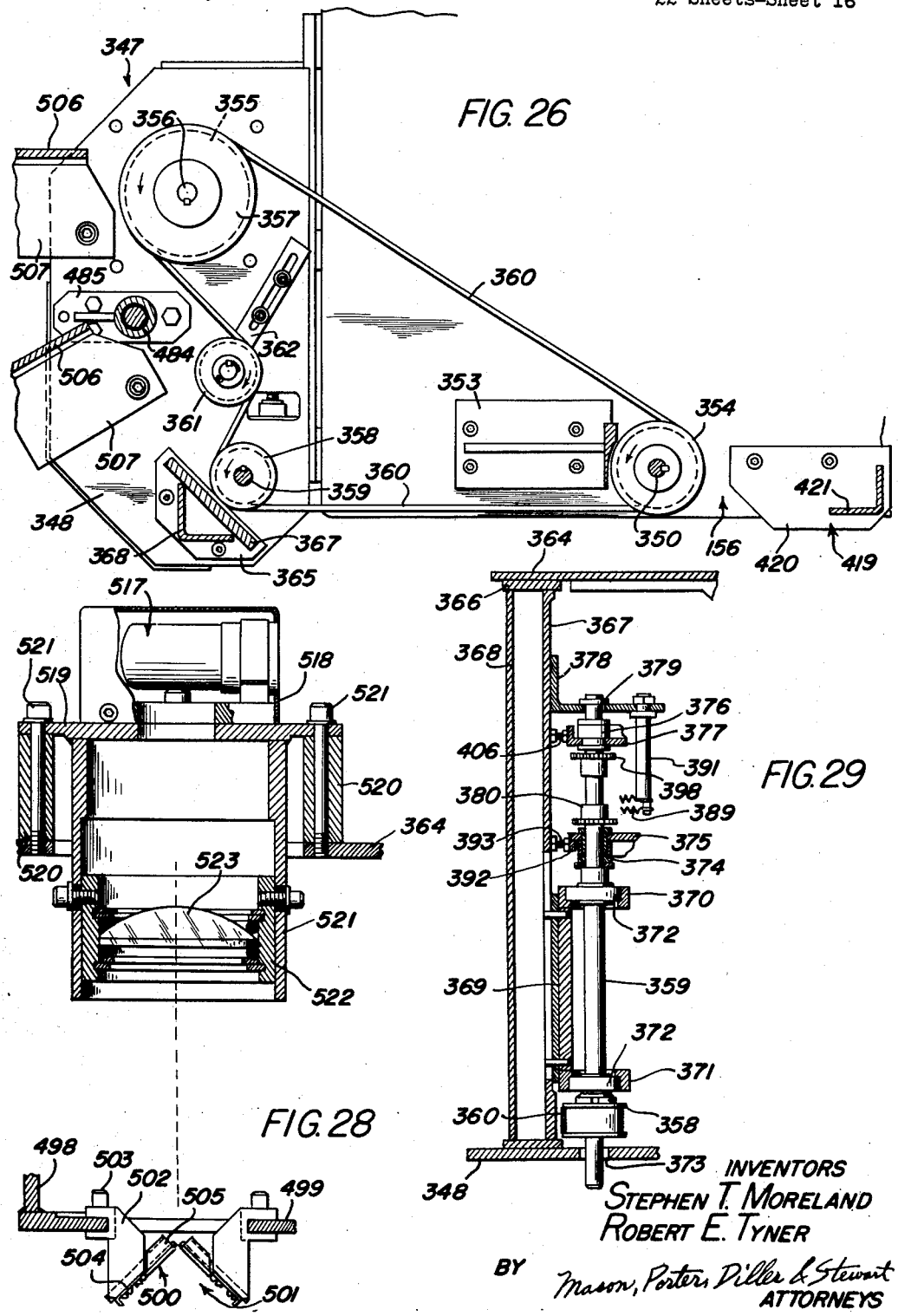

Jan. 22, 1963 S. T. MORELAND ETAL 3,074,550
PHOTOELECTRIC INSPECTION OF GLASSWARE
Filed March 20, 1959 22 Sheets-Sheet 17
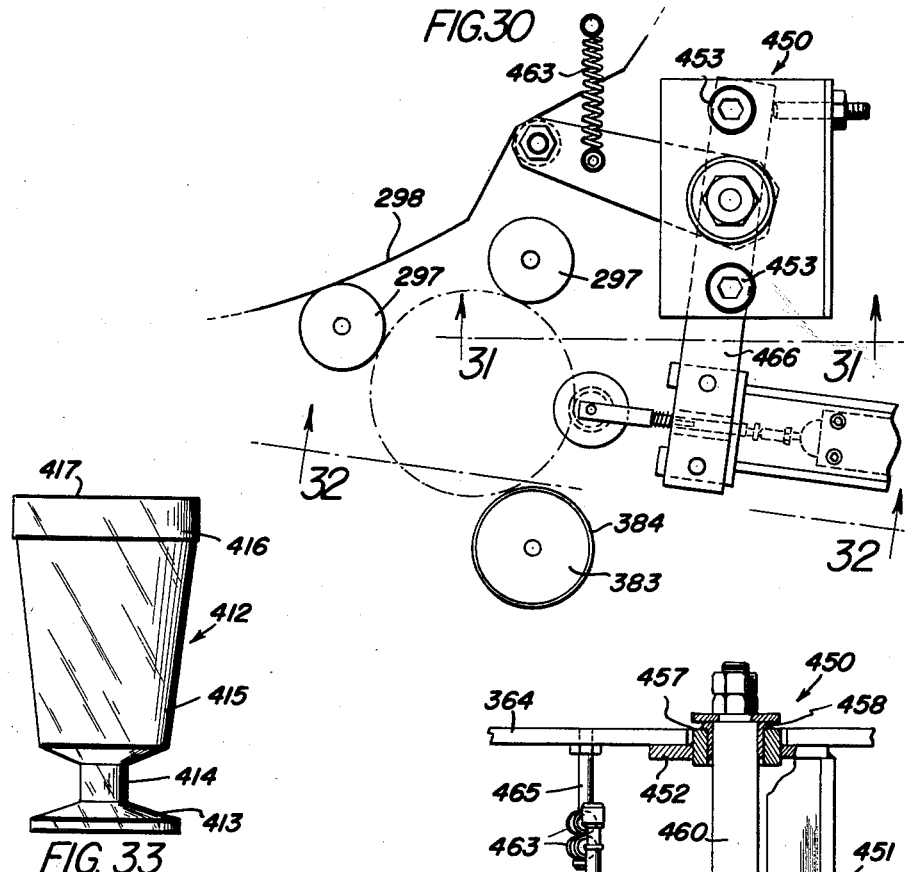
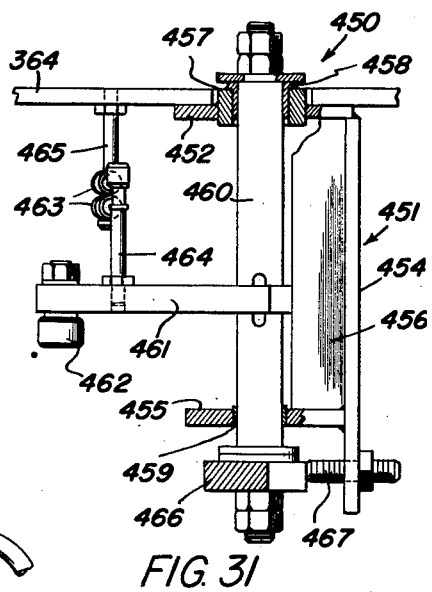
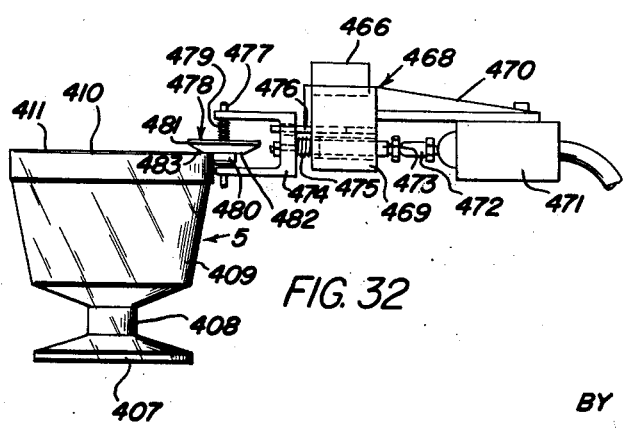
INVENTORS
STEPHEN T. MORELAND
ROBERT E. TYNER
BY Mason Porter, Diller & Stewart
ATTORNEYS

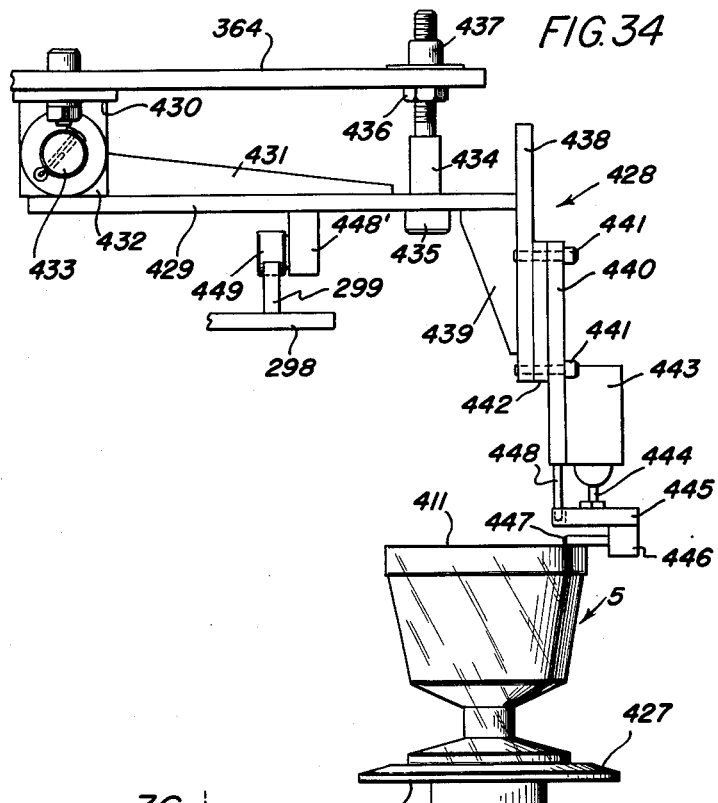

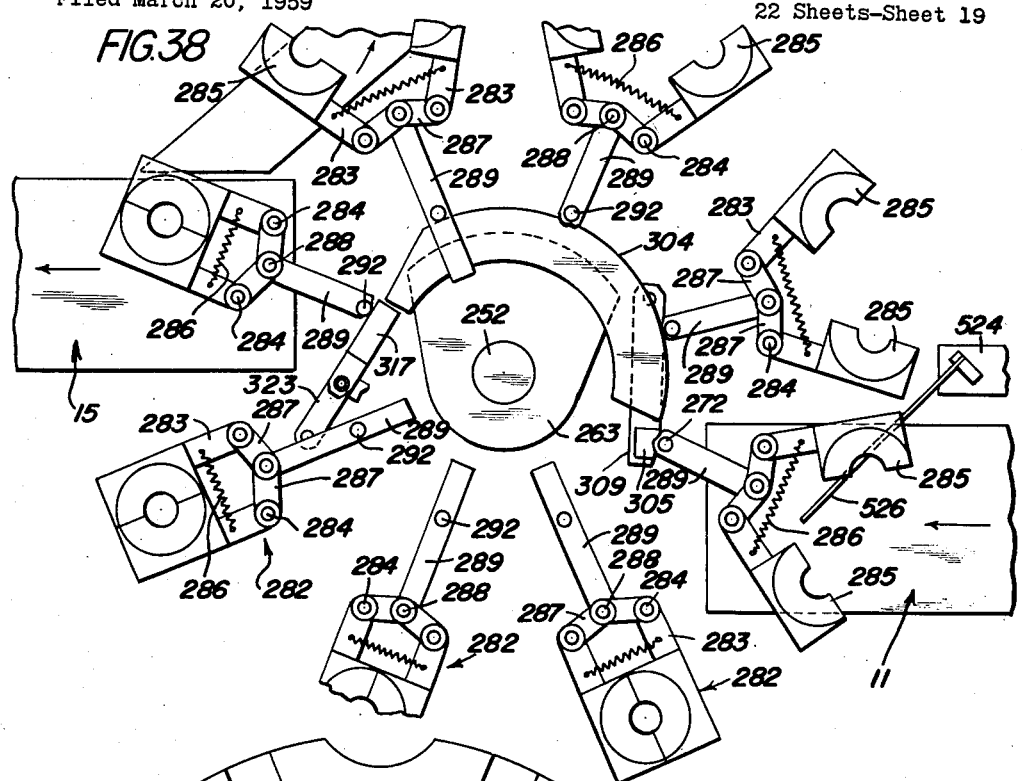
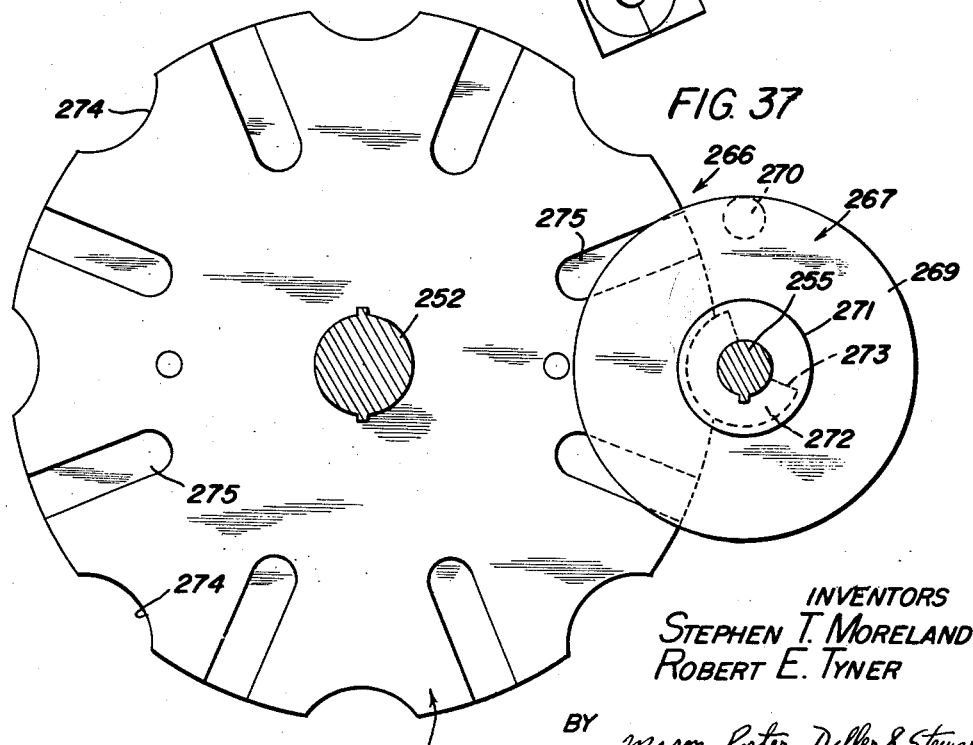

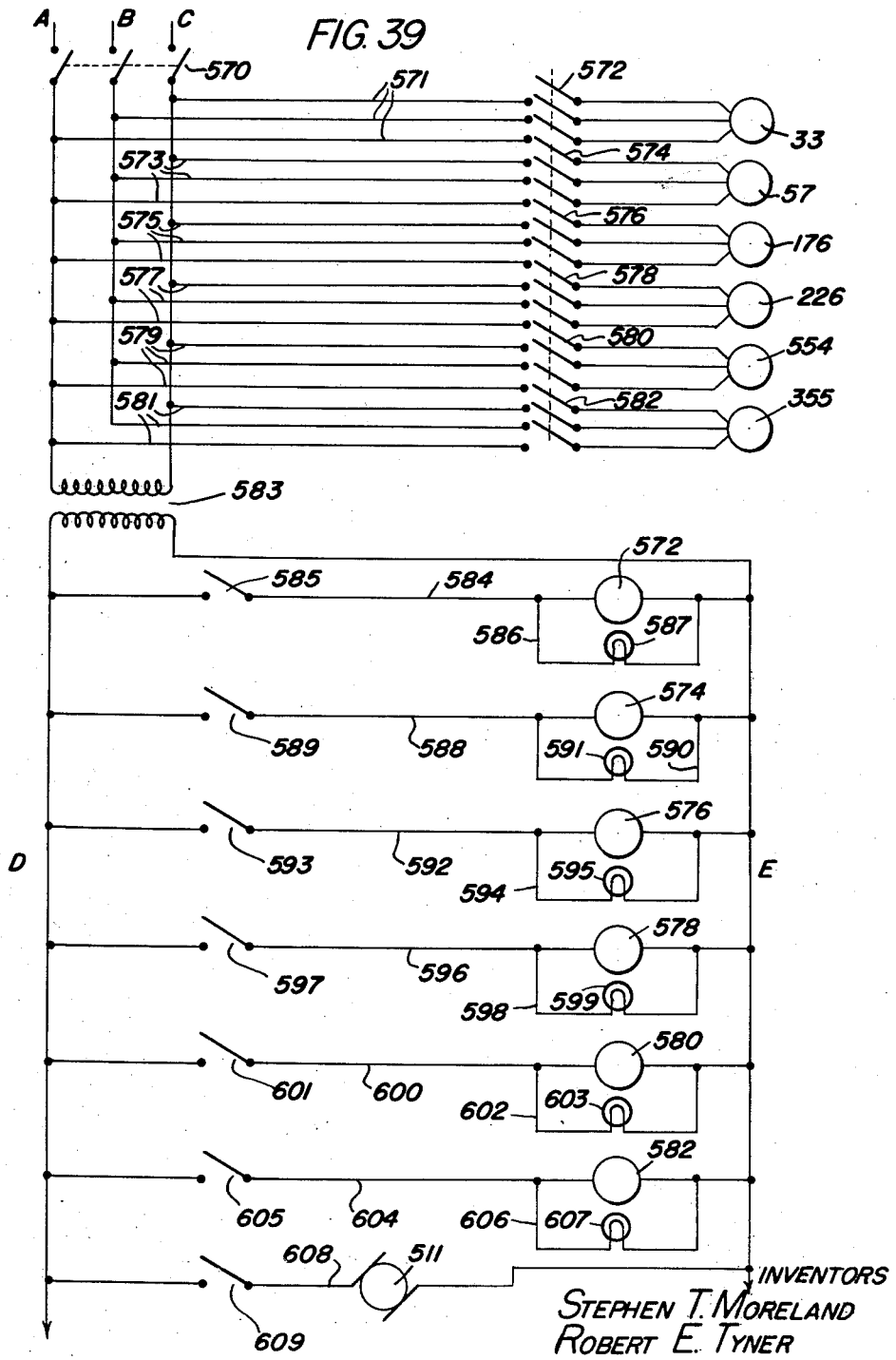

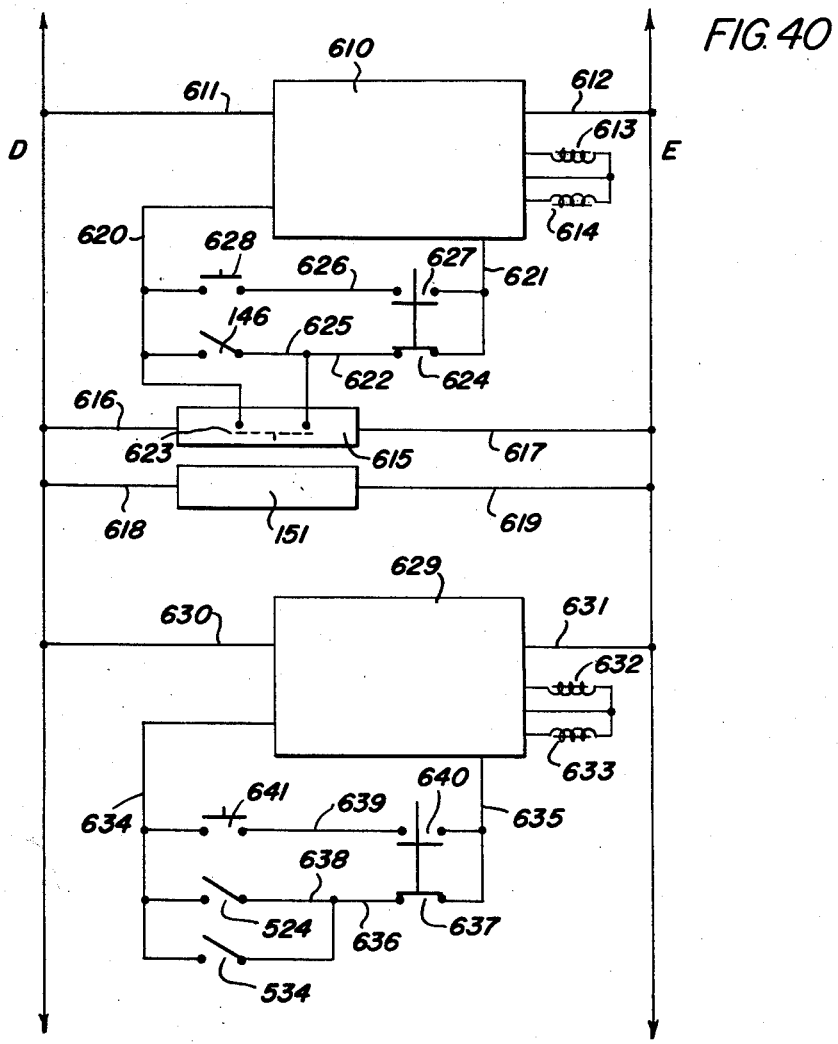

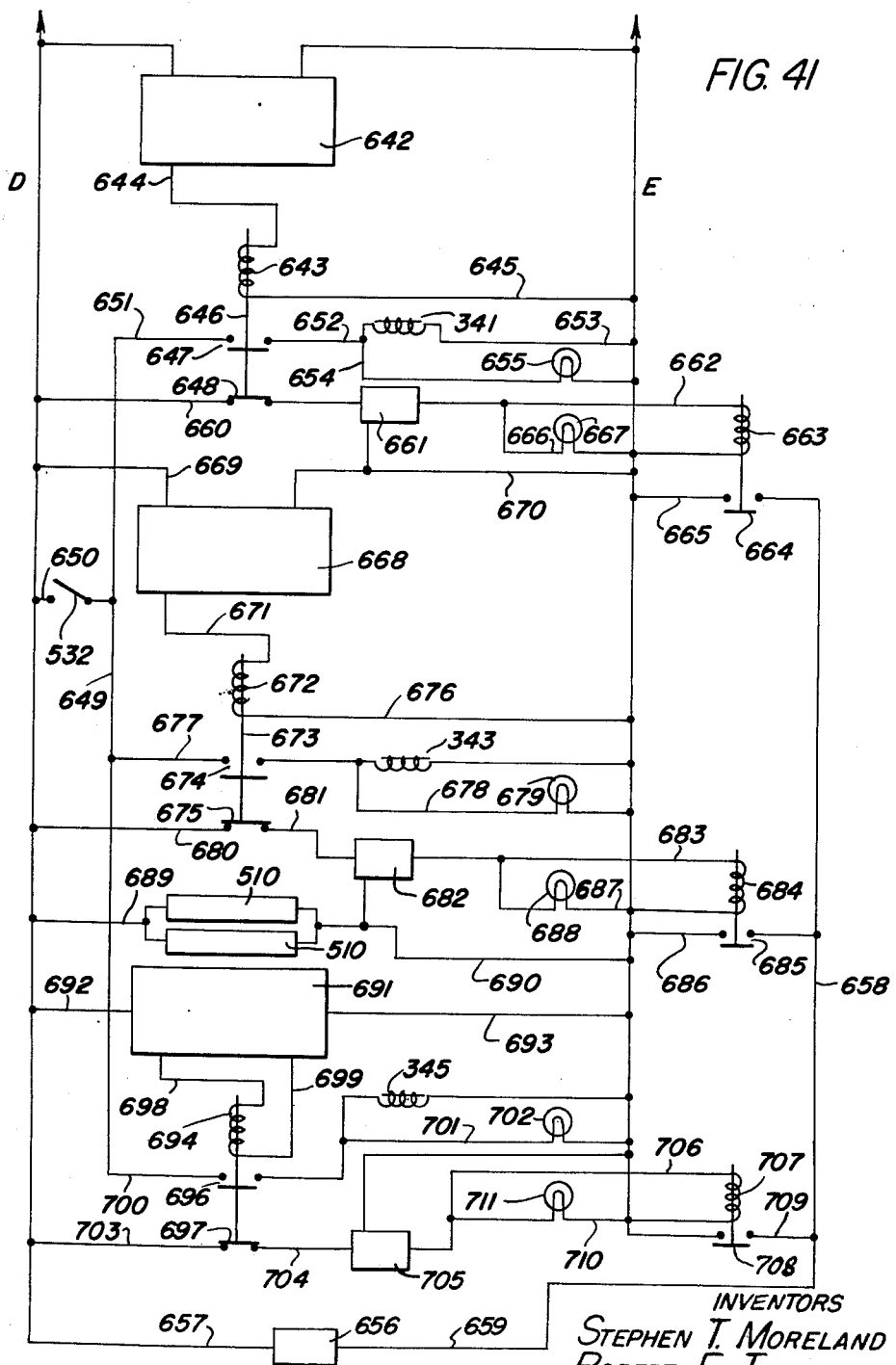

United States Patent Office 3,074,550
Patented Jan. 22, 1963

3,074,550
PHOTOELECTRIC INSPECTION OF GLASSWARE
Stephen T. Moreland, Wethersfield, Conn., and Robert E. Tyner, Toledo, Ohio, assignors to Continental Can Company, Inc., New York, N.Y., a corporation of New York
Filed Mar. 20, 1959, Ser. No. 800,728
53 Claims. (Cl. 209—75)

The invention relates generally to the art of inspecting glassware, and more particularly seeks to provide a novel mechanism for transferring and inspecting glassware, such as sherbet glasses and goblets.

In the manufacturing of glassware, such as sherbet glasses and goblets, the glassware is deposited onto a Lehr conveyor by the molding machine in rows and columns, with the glassware being inverted. The glassware then moves through a Lehr oven where the glassware is annealed. After the glassware has been annealed, it is then necessary to inspect the glassware prior to packaging thereof. In addition to defects found in other types of glassware, glassware, such as sherbet glasses and goblets, may have defective bases or bases improperly positioned because of defects in the formation of the stems.

In view of the foregoing, it is an object of the invention to provide a novel transfer mechanism which will take advantage of the inverted positions of the glassware on the lehr conveyor to test or inspect the glassware for defects in either the formation of the base or the formation of the stem, the transfer mechanism having sealing surfaces on pickup heads thereof which are of a nature that unless the bases are properly formed within the desired tolerances and are substantially horizontal within the desired tolerances, the pickup heads will not accept the glassware for transfer and the defective glassware will remain on the lehr conveyor while the glassware having properly formed bases and stems will be picked up and transferred by the transfer mechanism.

Another object of the invention is to provide a novel transfer mechanism for transferring glassware from a delivery conveyor, such as a lehr conveyor, to a supply conveyor for an inspection mechanism with the glassware being disposed in single file, the transfer mechanism including a transverse conveyor which extends transversely of and above the delivery conveyor, and a transfer mechanism which wil lengage a row of glassware on the delivery conveyor and elevate and swing the glassware into overlying relation to the transverse conveyor, in which position the glassware is released and is moved along the transverse conveyor in single file to the supply conveyor.

Still another object of the invention is to provide a novel transfer mechanism for transferring a row of glassware from a lehr conveyor to an elevated transverse conveyor, the transfer mechanism including a support bar which has secured thereto a plurality of pickup heads, the pickup heads being disposed in vertical positions for engaging glassware on the lehr conveyor, and there being provided means for swinging the support bar and the pickup heads being disposed in vertical positions for engaging glassware on the lehr conveyor, and there being provided means for swinging the support bar and the pickup heads to a position overlying the transverse conveyor, the support bar being rotatably supported and having means connected thereto for rotating the support bar as it is swung, whereby the pickup heads remain in vertical positions normal to the lehr conveyor at all times.

In addition to the afore-mentioned possible defects in the formation of the base and stem of articles of glassware, such as sherbet glasses and goblets, glassware may be formed with defects in the rim thereof. In view of this, it is necessary to also check glassware for height, out-of-roundness and internal flaws in the glass.

In view of the foregoing, it is another object of the invention to provide an inspection unit for glassware, the inspection unit being of the turret type and having a plurality of individual holders which will receive individual articles of glassware from a supply conveyor and which will freely support the glassware in a manner that permits the glassware to undergo inspection and tests for imperfections in height, roundness and internal imperfections in the glass in a continuous step-by-step operation.

A further object of the invention is to provide a novel inspection unit for inspecting glassware, the inspection unit being of a multiple inspection type with the inspection taking place at circumferentially spaced stations, the inspection unit having means for releasing an article of glassware passing the various tests and inspections when in alignment with a receiving conveyor, and these means being overrideable by the failure of the glassware to pass any of the tests or inspections so that the glassware will not be discharged onto the receiving conveyor, but onto a chute which will deliver the imperfect glassware to a cull box.

Another object of the invention is to provide a novel transfer and inspection mechanism for glassware, such as sherbet glasses and goblets, the glassware being supplied by a delivery conveyor in the form of a lehr conveyor, the glassware first being engaged by a transfer mechanism which engages the bases of the glassware which are disposed uppermost and should the glassware be properly formed in the area of the bases, the glassware will be picked up from the lehr conveyor and transferred to a transverse conveyor which extends across and above the lehr conveyor, the glassware then being inverted and deposited onto a supply conveyor which delivers the glassware to an inspection unit where the glassware is inspected for height, out-of-roundness and internal flaws, the glassware then passing onto a receiving conveyor which delivers the previously passed glassware to a station where it is visually inspected and packed, the culls remaining on the lehr conveyor after the transfer operation passing with the lehr conveyor to the end thereof and being deposited into a cull box, glassware rejected by the inspection unit being returned to the lehr conveyor and delivered to the cull box, and the glassware rejected by the visual inspection also being returned to the lehr conveyor and delivered to the cull box.

Yet another object of the invention is to provide a novel multisectioned inspection unit for glassware, the inspection unit being of the turret type and having a glassware receiving station, a plurality of inspection and testing stations, a station for discharging glassware passing the inspection of the inspection unit and a discharge station for imperfect glassware, the various stations being arranged in the order named and there being provided normally operative means for releasing the glassware passing the inspections and tests onto a receiving conveyor, these means being rendered inoperative by the failure of the glassware to pass any of the inspections and tests, and all of the glassware remaining in the turret at the discharge station being automatically discharged and rejected.

A further object of the invention is to provide a novel mechanism for testing glassware for height, the mechanism including a turntable upon which the glassware rides, and a feeler disposed at a predetermined height above the turntable, the feeler engaging the lip of the glassware as it is rotated and any variation in height beyond a predetermined range resulting in the rejection of the glassware.

A still further object of the invention is to provide a novel mechanism for testing glassware for out-of-roundness, the mechanism including means for engaging the rim of the glassware and rotating the glassware while the glassware is engaged with a feeler which engages the outer surface of the rim in the vicinity of the lip of the glassware, the feeler being connected to a rejecting mechanism which will automatically reject the glassware upon movement of the feeler beyond predetermined limits.

Still another object of the invention is to provide a novel conveyor unit for delivering inspected glassware to a packaging station, the conveyor unit including an endless conveyor of the belt type which is provided adjacent the discharge end thereof with a transverse diverter, and there being disposed at the discharge end of the endless conveyor and to one side thereof a storage turntable to which the glassware is diverted so as to provide a storage area for glassware which may accumulate while the packer is placing an empty carton into position.

A still further object of the invention is to provide a novel photoelectric inspection unit for inspecting glassware in the area of the rims thereof for internal flaws, such as checks, etc., the photoelectric inspection unit including means for engaging the glassware in the area of the rim to rotate the glassware, a light source directed onto the rim of the glassware, a photoelectric cell pickup head spaced from the light source, and a mirror assembly having support means for lowering the mirror assembly into the glassware being inspected whereby when the light source strikes any fault in the glassware, light will be reflected to the mirror assembly and directed by the mirror assembly to the photoelectric cell unit so as to bring about the automatic rejection of the rejected glassware.

With the above, and other objects in view that will hereinafter appear, the nature of the invention will be more clearly understood by reference to the following detailed description, the appended claims and the several views illustrated in the accompanying drawings.

In the drawings:

FIGURE 1 is a plan view of the transfer and inspection system and shows the relationship of the various components thereof with respect to each other and to a lehr conveyor which delivers the glassware to be transferred and inspected to the system.

FIGURE 2 is a side elevational view of the transfer and inspection system of FIGURE 1, and shows further the arrangement and details of the components thereof.

FIGURE 3 is an enlarged plan view of the receiving conveyor or visual inspection conveyor, with parts broken away, and shows the relation thereof with respect to a storage turntable for glassware.

FIGURE 4 is an enlarged fragmentary elevational view of the receiving conveyor of FIGURE 3 and shows further the details thereof.

FIGURE 5 is an enlarged fragmentary transverse sectional view taken along the line 5—5 of FIGURE 4 and shows the structural details of the receiving conveyor.

FIGURE 7 is an enlarged fragmentary sectional view taken along the line 7—7 of FIGURE 6 and further shows the specific details of the drive for the transfer mechanism.

FIGURE 9 is an enlarged fragmentary elevational view taken from the left end of FIGURE 8, and shows the transfer mechanism rotated to a position overlying the transverse conveyor and ready to release glassware carried thereby onto the transverse conveyor.

FIGURE 10 is an enlarged fragmentary vertical sectional view taken through one of the pickup heads offset from the center thereof and shows the specific details of construction of the pickup head.

FIGURE 11 is an enlarged fragmentary plan view showing the connection between the support bar or shaft for the pickup heads and a crank arm which swings the support bar.

FIGURE 12 is an enlarged fragmentary elevational view looking into the end of the mechanism of FIGURE 11, and shows further the details of mounting of the support bar and the details of a sprocket which rotates the support bar as the crank arms swing to retain the pickup heads in vertical positions at all times.

FIGURE 13 is an enlarged elevational view of the support for both the supply conveyor and the inspection mechanism, and shows the details of mounting the supply conveyor, front cover panels of the support being partially broken away to show the details of the drive for the inspection mechanism.

FIGURE 14 is an enlarged fragmentary horizontal sectional view taken along the line 14—14 of FIGURE 13, and shows the general details of a memory mechanism of the inspection mechanism.

FIGURE 16 is an enlarged fragmentary vertical sectional view taken along the line 16—16 of FIGURE 15, and shows the main drive shaft arrangement for the inspection mechanism.

FIGURE 18 is an enlarged fragmentary plan view of the inspection mechanism, and shows the arrangement of the supply conveyor, the visual inspection conveyor and a cull discharge chute relative thereto, upper portions of the inspection mechanism being partially broken away and shown in section.

FIGURE 19 is a fragmentary vertical sectional view taken along the line 19—19 of FIGURE 18, and shows the specific mounting of the turret table of the inspection mechanism and the manner in which the turret table is driven.

FIGURE 20 is a fragmentary horizontal sectional view taken beneath the turret table, and shows the general arrangement of the cams for effecting the opening and closing of the holders for the glassware to be inspected.

FIGURE 21 is an enlarged fragmentary elevational view showing the mounting of the movable cam which permits the closing of the jaws of a glassware holder about an article of glassware to be inspected immediately following the beginning of the indexing of the turret table.

FIGURE 22 is an enlarged fragmentary elevational view showing the mounting of a cam which opens the glassware holders when aligned with the visual inspection conveyor in the event the glassware carried by the individual holders has passed all of the inspections of the inspection mechanism.

FIGURE 23 is an enlarged fragmentary plan view of a plate disposed above the turret, and shows the specific mounting of the components of the photoelectric cell inspection station, there also being shown in dotted lines the drives for drive rollers which rotate glassware at both the photoelectric cell inspection station and at the run-out inspection station.

Figure 6:
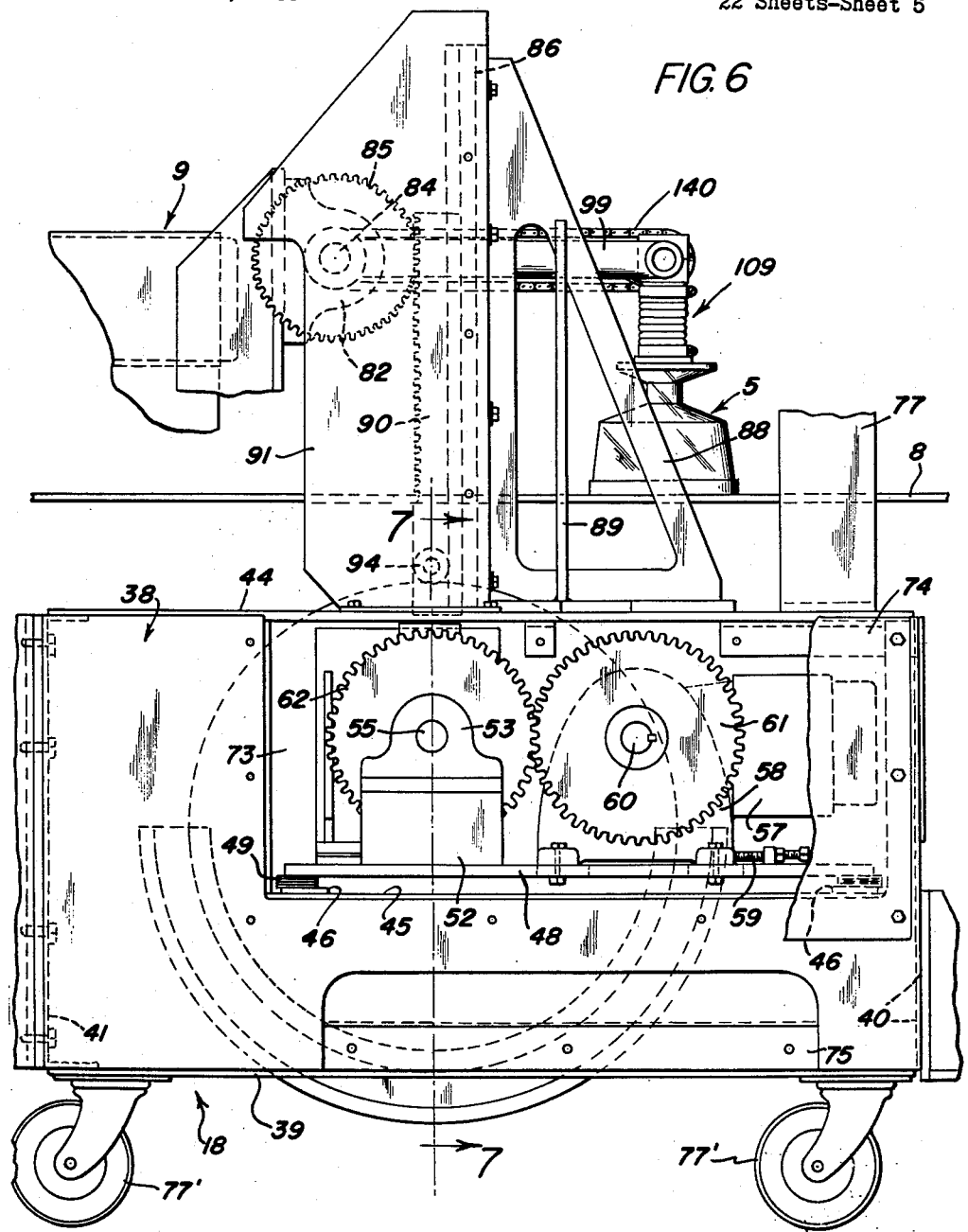
FIGURE 6 is an enlarged side elevational view of the transverse conveyor and transfer mechanism, with portions broken away, and shows generally the details of the drive for the transfer mechanism.

FIGURE 24 is an enlarged fragmentary elevational view showing generally the mounting of one of the light sources of the photoelectric cell inspection unit and the manner in which the mirror assembly of the photoelectric cell inspection unit is lowered into and lifted out of an article of glassware being inspected, there also being shown generally the drive for a rotating platform of the height inspection station.

FIGURE 25 is an enlarged elevational view, with portions omitted, showing further the details of the photoelectric cell inspection unit, the view being taken from the left end of the inspection mechanism, as viewed in FIGURE 1.

FIGURE 26 is an enlarged fragmentary horizontal sectional view beneath the turret table, and shows the details of the drive for the rotary platform of the height inspection station and a vertical take-off shaft from which the drive rollers of the run-out inspection station and the photoelectric cell inspection station are driven.

FIGURE 27 is a fragmentary sectional view taken along the line 27—27 of FIGURE 23, and shows the specific drives for the drive rollers of the run-out inspection station and the photoelectric cell inspection station.

FIGURE 28 is an enlarged fragmentary vertical sectional view taken generally along the line 28—28 of FIGURE 23, and shows the general arrangement between the light ray deflecting mirrors and the photoelectric cell pickup head.

FIGURE 29 is an enlarged fragmentary sectional view taken along the line 29—29 of FIGURE 23, and shows the specific mounting for the vertically disposed take-off shaft.

FIGURE 30 is an enlarged fragmentary plan view, and shows generally the details of the mechanism at the run-out inspection station.

FIGURE 31 is an enlarged fragmentary elevational view showing the details of mounting the support for the run-out gauge, the view being taken along the line 31—31 of FIGURE 30.

FIGURE 32 is a fragmentary vertical view taken generally along the line 32—32 of FIGURE 30, and shows the relationship of the run-out gauge with respect to a sherbet glass.

FIGURE 33 is an elevational view of a goblet which the components of the present invention may be adjusted to handle.

FIGURE 34 is an enlarged fragmentary elevational view taken generally along the plane indicated by the line 34—34 of FIGURE 23, and shows the specific details of the mechanism of the height inspection station.

FIGURE 35 is an end view of the inverter for inverting glassware passing from the transverse conveyor onto the supply conveyor.

FIGURE 36 is a fragmentary sectional view taken along the line 36—36 of FIGURE 35, and shows the specific details of the inverting mechanism.

FIGURE 37 is an enlarged fragmentary horizontal view showing the specific details of the Geneva drive mechanism for the turret turntable.

FIGURE 38 is a fragmentary schematic view showing the relationship of the holders for glassware in their various positions about the turret.

FIGURE 39 is a wiring diagram for the various motors of the invention.

FIGURE 40 is a wiring diagram showing the controls for the electric clutch and electric brake of both the transfer mechanism and the turret.

FIGURE 41 is a wiring diagram showing the controls for the various inspection stations of the inspection mechanism.

In the example of embodiment of the invention herein disclosed, a typical glass to be inspected is referred to by the numeral 5. The glasses 5 are delivered to the inspection mechanism by a delivery conveyor in the form of a lehr conveyor 6. The lehr conveyor is of a conventional type and only an idler roller 7 and the conveyor belt 8 of the lehr conveyor 6 are illustrated. In the making of the glasses 5, the glasses are molded in a conventional type of molding machine and are arranged on the lehr conveyor belt 8 in rows and columns. This is best shown at the right of FIGURE 1.

A transverse conveyor, generally referred to by the numeral 9, extends transversely of the lehr conveyor 6 in overlying relation thereto. A transfer mechanism, generally referred to by the numeral 10, also overlies the lehr conveyor 6 and functions to remove glasses 5 from the lehr conveyor 6 and deposit the glasses in single file on the transverse conveyor 9.

A supply conveyor 11 is positioned to one side of the lehr conveyor 6 and is in generally parallel relation with respect to the lehr conveyor 6. The right end portion of the supply conveyor 11 is in alignment with a discharge end of the transvere conveyor 9. A glass inverting mechanism, generally referred to by the numeral 12, is disposed intermediate the transverse conveyor 9 and the supply conveyor 11 for inverting the glasses 5 in their movement between the transverse conveyor 9 and the supply conveyor 11.

The supply conveyor 11 delivers glasses to be inspected to an inspecting mechanism, generally referred to by the numeral 13. The inspection mechanism 13, as will be described in detail hereinafter, mechanically inspects glasses 5 delivered thereto and automatically rejects those glasses which are detected as having defects. A return chute, generally referred to by the numeral 14, extends from the inspecting mechanism 13 to the lehr conveyor belt 8 so as to return cull glasses to the lehr conveyor 6 downstream of the transfer mechanism 10. A receiving or visual inspection conveyor 15 has the right end thereof associated with the inspecting mechanism 13 for receiving articles passing the inspecting mechanism 13. As the glasses 5 pass along the visual inspection conveyor 15, they are taken off of the visual inspection conveyor 15, visually inspected and those glasses 5 passing the visual inspection are packed in a suitable carton (not shown). A chute 16 extends between the visual inspection conveyor 15, adjacent the left end of the visual inspection conveyor, and the lehr conveyor 6 so that those glasses 5 which do not pass the visual inspection may be returned to the lehr conveyor 6.

At this time, it is pointed out that the transfer mechanism 10 is of a nature that it inspects glasses 5 for certain defects in the picking up of the glasses, and those glasses which are not accepted by the transfer mechanism 10 will remain on the Lehr conveyor belt 8 and be delivered to the left end thereof. A cull box 17 is disposed at the left end of the Lehr conveyor 6 for receiving all culls remaining on the Lehr conveyor belt 8. These culls will not only include those not accepted by the transfer mechanism 10, but also the culls rejected by the inspecting mechanism 13 and by the individual who visually inspects the glasses for defects.

*Transverse Conveyor*

The transverse conveyor 9 is supported by a pair of supports generally referred to by the numerals 18 and 19, the supports 18 and 19 being disposed on opposite sides of the lehr conveyor 6. An upright 20 extends upwardly from the top of the support 18 adjacent the left end thereof. A mounting plate 21 is secured to the upper end of the upright 20, the general configuration of the mounting plate 21 being best shown in FIGURE 8.

The transverse conveyor 9 includes a frame which is formed primarily of a pair of upright channel frame members 22 which have the right ends thereof (FIGURE 8) rigidly secured to the mounting plate 21. The left ends of the frame members 22 are secured to a vertical face of the support 19 by a pair of vertically extending angle members 23. Bearing members 24 are secured to the frame members 22 adjacent the right ends thereof. A drive shaft 25 is rotatably journaled in the bearings 24 and a drive roller 26 is secured to the drive shaft 25 for rotation therewith, the drive roller 26 being disposed between the frame members 22.

A pair of adjustable bearing supports 27 are secured to the frame members 22 adjacent the left ends thereof.

Bearing members 28 are adjustably carried by the bearing supports 27 for movement longitudinally of the frame members 22. The bearing members 28 are retained in adjusted positions through the use of adjusting screws 29. An idler shaft 30 is rotatably journaled in the bearings 28 and an idler roller 31 is secured to the idler shaft 30. A conveyor belt 32 is entrained over the drive roller 26 and the idler roller 31. The proper tension of the conveyor belt 32 is maintained by adjusting the positions of the bearing members 28 with respect to the bearing members 24.

An electric motor 33 is coupled to a reduction gear unit 34 and the two are mounted on the mounting plate 21. The reduction gear unit 34 has a drive shaft 35 on which there is mounted a drive gear 36. The drive gear 36 is meshed with a driven gear 37 secured to the drive shaft 25. Thus, the conveyor belt 32 is driven.

*Transfer Mechanism*

The support 18 is an important component of the transfer mechanism 10 in that it houses the drive mechanism thereof. The support 18 includes a generally rectangular housing 38. The housing 38 includes a bottom wall 39, a pair of end walls 40 and 41, a pair of side walls 42 and 43, and a top wall 44. These walls will be based by suitable framework, of which minor details are shown, for example, in FIGURE 7. Extending along the inner surfaces of the side walls 42 and 43 are longitudinal frame members 45 to which there are secured transverse frame members 46. The transverse frame members 46 are based by struts 47 which extend upwardly from the bottom wall 39. A base plate 48 extends between and overlies the transverse frame members 46. The base plate 48 is mounted at the desired elevation by means of a plurality of shims 49 disposed between the base plate 48 and the transverse frame members 46. Also, adjusting screws 50 are utilized to vertically adjust the base plate 48. The base plate 48 is secured to the transverse frame members by fasteners 51.

A pair of transversely aligned supports 52 are secured to and extend upwardly from the base plate 48 adjacent the left end thereof. Aligned bearing members 53 and 54 are mounted on the upper ends of the supports 52. The bearing members 53 and 54 are vertically disposed and are fixed relative to the base plate 48. A transverse shaft 55 is rotatably journaled in the bearing members 53 and 54 and extends beyond the bearing member 54 through an opening 56 in the side wall 43.

An electric motor 57 is connected to a reduction gear unit 58. The reduction gear unit 58 is seated on the base plate 48 and is longitudinally adjustable relative thereto. The reduction gear unit 58 is retained in a longitudinally adjusted position through the use of adjusting screws 59. The reduction gear unit 58 includes a shaft 60. A drive gear 61 is mounted on the shaft 60 for rotation therewith. A driven gear 62 is carried by the shaft 55 and is meshed with the drive gear 61.

Reference is now made to FIGURE 7 wherein it is shown that the driven gear 62 is rotatably journaled on the shaft 55. The driven gear 62 has a sleeve-type bearing 64 in which the shaft 55 is received so that the driven gear 62 may rotate about the shaft 55. Movement of the driven gear 62 to the right is prevented by a thrust washer 65' and a collar 66'.

The driven gear 62 is part of a conventional electric clutch 65 which, when energized, will drivingly connect the gear 62 to the shaft 55. Mounted in cooperating relation with the electric clutch is a conventional electric brake 66, and slip rings 67 and a brush unit 67'. To facilitate the supporting of the electric clutch 65 and the electric brake 66, both of which are supplied as a unit by the Warner Electric Brake and Clutch Co. of Beloit, Wisconsin, there is provided a vertical plate 68. The lower end of the vertical plate 68 is secured to a mounting plate 69 which is, in turn adjustably connected to the base plate 48. The vertical plate 68 carries a bearing mounting plate 70 in which a sleeve type bearing 71 is mounted. The shaft 55 passes through the sleeve type bearing 71 and is supported thereby. A mounting bracket 72 is secured to the upper end of the vertical plate 68. The brush unit 67' is connected to the mounting bracket 72. The electric clutch 65 and the electric brake 66 are so controlled whereby when the electric clutch is engaged, the electric brake is automatically disengaged, and when the electric clutch is disengaged, the electric brake is automatically engaged to instantaneously stop the movement of the transfer mechanism 10.

Access to the machinery within the housing 38 is obtained through an opening 73. The opening 73 is normally closed by a closure panel 74. A trough 75 for electric cables is also carried by the side wall 42 of the housing 38.

The support 19 is relatively thin as compared to the support 18 and does not carry internally any mechanism. The purpose of the support 19 is primarily for supporting one end of the transverse conveyor 9 and for stabilizing the support 18. A transverse beam 76 extends between the supports 18 and 19, with one end of the beam 76 being secured to a vertical face of the support 19 and the opposite end of the beam 76 being supported above the support 18 by an upright 77. The beam 76 has a dual function in that it supports certain control mechanism which will be described in more detail hereinafter.

Caster wheels 77' are secured to the undersides of the supports 18 and 19 to facilitate the movement of the supports 18 and 19, together with the transverse conveyor and the transfer mechanism. However, when the transverse conveyor 9 and the transfer mechanism 10 are positioned for operation, the supports 18 and 19 are elevated above the floor 78 of a building in which they are mounted. This is accomplished by a jack 79 secured to the right end (FIGURE 2) of the support 18. The left end of the support 18 is secured to another support, which is elevated, and which will be described in more detail hereinafter. The support 19 is supported in an elevated position through the use of a pair of jacks 80 mounted at the opposite ends thereof.

Figure 8:
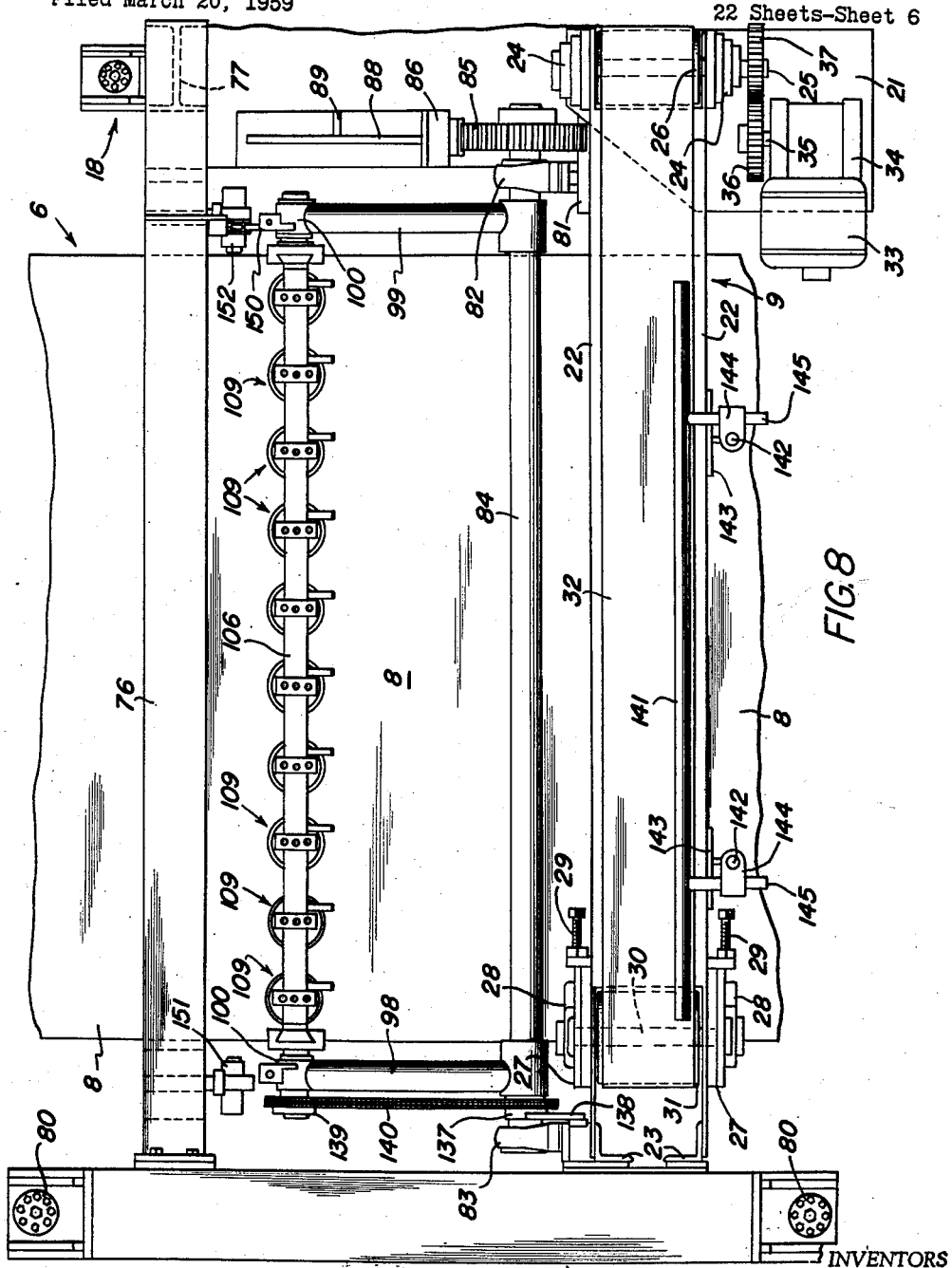
FIGURE 8 is an enlarged plan view of the transverse conveyor and the transfer mechanism and shows the relationship of the components of the two with respect to each other and to the lehr conveyor belt.

With reference to FIGURE 8, a vertical plate 81 extends upwardly from the mounting plate 21 adjacent one of the frame members 22. A bearing member 82 projects horizontally from the vertical plate 81. A second bearing member 83 is mounted in transverse alignment with the bearing member 82 and is secured to the same frame member 22 as is the vertical plate 81, and adjacent the opposite end of the frame member 22. An elongated shaft 84 extends through and is rotatably journaled in the bearings 82 and 83. The shaft 84 extends beyond the bearing 82 and a pinion 85 is secured thereto.

Referring to FIGURE 6 in particular, a guideway 86 extends vertically from the top of the support 18. The guideway 86 is based by a vertical gusset 88 which, in turn, is based by a vertical gusset 89, the gusset 88 extending longitudinally of the support 18, and the gusset 89 extending transversely of the support 18. A rack 90 is mounted in the guideway 86 for vertical reciprocatory movement. The rack 90 is meshed with the pinion 85 to oscillate the shaft 84 when the rack 90 is reciprocated. A shield 91 is secured to the guideway 86 so as to shield the operator of the inspecting mechanism from the rack 90 and the pinion 85.

A large cam 92 is secured to the shaft 55 for rotation therewith. The cam 92 is disposed exteriorly of the support 18 adjacent the side wall 43 thereof, and has a hub 93 which is keyed to the shaft 55. A follower 94 is secured to the lower end of the rack 90 by a fastener 95 which functions as an axle for the follower 94. The follower 94 engages the peripheral edge of the cam 92 and normally rides therealong when the force on the rack 90 is a downward one.

In order to facilitate the controlled movement of the rack during a major portion of its stroke, the cam 92 has an arcuate extension extension 96 secured thereto. A cam element 97 is, in turn, secured to the arcuate extension 96 and lies in the plane of the cam 92. The cam element 97 has a cam surface about its periphery. The follower 94 passes between the peripheral surface of the cam 92 and the cam element 97 to assure the positive actuation of the rack 90.

Reference is now had to FIGURE 8 wherein a pair of crank arms 98 and 99 are illustrated as being mounted on the shaft 84 adjacent the bearings 82 and 83. The crank arms 98 and 99 are rigidly secured to the shaft 84 for movement therewith. The outer ends of the arms 98 and 99 terminate in sleeve portions 100 which are transversely aligned. As is best illustrated in FIGURE 11, each of the sleeve portions 100 has a sleeve type bearing 101 extending therethrough.

A stub shaft 102 extends through each of the sleeve type bearings 101 and is rotatably journaled therein. A support block 103 is rigidly secured to the opposed ends of the stub shafts 102. Each of the support blocks 103 has a vertically extending dove-tailed slot 104 and a plate 105 extends across the underside of each of the support blocks 103 to close the lower end of the dove-tail slot.

A support shaft 106 extends between the support blocks 103. The support shaft 106 has enlarged end portions 107 which are of a cross-section complementary to the cross-section of the dove-tail slots 104. The end portions 107 are adjusted with respect to the support blocks 103 so that the support shaft 106 is coaxial with the stub shafts 102. This is accomplished by an adjusting screw 108 carried by the plate 105 (FIG. 12).

A plurality of pickup heads generally referred to by the numeral 109 is secured to the support shaft 106 in depending relation. The pickup heads 109 are spaced transversely of the Lehr conveyor belt 8 along the length of the support shaft 106. The pickup heads 109 are adjustably mounted on the support shaft 106 and will be aligned with the columns of glasses 5 passing along the Lehr conveyor 6.

As is best shown in FIGURE 10, each of the pickup heads 109 includes a mounting block assembly formed of a lower block 110 and an upper block 111. The blocks 110 and 111 are secured together by fasteners 112 extending therethrough. The blocks 110 and 111 combine to define an opening 113 through which the support shaft 106 passes. The pickup head 109 is retained in an adjusted position on the support shaft 106 by a setscrew 114 carried by the block 111 and engaging the shaft 106.

A bellows assembly, generally referred to by the numeral 115, is secured to the block 110 in depending relation. The bellows assembly 115 includes an upper plate 116, which is rigidly secured to the underside of the block 110, and a lower plate 117 which is spaced below the upper plate 116. A bellows member 118 extends between the plates 116 and 117. The bellows member 118 is secured to the upper plate 116 by being telescoped thereover and clamped thereto through the use of a hose clamp 119. An O-ring 120 is set in the periphery of the upper plate 116 and is engaged by the upper portion of the bellows member 118 to form a seal between the upper plate 116 and the bellows member 118. The bellows member 118 is also telescoped over the upper portion of the plate 117. That portion of the bellows member 118 telescoped over the upper end of the plate 117 is clamped to the periphery of the plate 117 by a clamp 121. Also, the upper portion of the plate 117 has seated therein an O-ring 122, which O-ring is compressibly engaged by the lower portion of the bellows member 118 to form a seal between the bellows member 118 and the plate 117.

The lower part of the plate 117 terminates in an outwardly projecting annular flange 123. A resilient pad 124 is seated against the underside of the plate 117 and has a rim portion 125 which is engaged over the annular flange 123 to retain the pad 124 in place. The pad 124 has a central bore 126 therethrough which is aligned with a bore 127 extending through the plate 117.

At this time, it is pointed out that the pad 124 is intended to engage the bottom of an inverted glass, such as a sherbet glass, and should the bottom be properly formed and properly oriented with respect to the remainder of the glass, the pad 124 will engage the bottom of the glass and form a seal therewith. As long as the interior of the bellows assembly 115 is sealed against the ingress of air, but is arranged so that air may egress therefrom, when the pad 124 is in sealing engagement with the bottom of a glass and the bellows assembly 115 is collapsed and then permitted to expand, the siphon effect of the bellows assembly 115 on the bottom of the glass will be such as to provide the necessary suction to retain the glass in engagement with the pad 124 as long as the seal of the bellows assembly 115 is maintained.

A bore 128 is formed in the plate 116 offset from the center thereof. A valve body 129 is seated in the bore 128 and has a passage 130 therethrough. The upper part of the valve body defines a valve seat 131.

Normally cooperating with the valve body 129 to close the passage 130 is a valve member 132 which, when seated on the valve body 129, engages the valve seat 131 and forms a seal therewith. The valve member 132 also has an upwardly projecting stem 133.

A lever 134 is pivotally connected to the block 110 by a fastener 135. The lever 134 may be considered to be a valve actuator, and has the stem 133 extending therethrough. The stem 133 is provided adjacent the upper end thereof with a transverse pin 136 which overlies the lever 134 so that when the lever 134 is moved upwardly, the valve member 132 will be moved upwardly therewith to unseat the valve member 132. At this time, it is pointed out that the valve member 132 is free to move vertically without like movement of the lever 134, and that the valve member 132 is sufficiently light whereby when the bellows assembly 115 is collapsed and the bore 126 in the pad 124 is closed, the pressure built up within the bellows assembly 115 will unseat the valve member 132 and permit the pressure within the bellows assembly 115 to be dissipated.

It is the purpose of the transfer mechanism 10 to pick up glasses 5 resting on the Lehr conveyor 6 and to rotate the crank arms 98 and 99 through an angle of approximately 120° so that the glasses 5 picked up by the transfer mechanism 10 will be elevated and moved forwardly from positions resting upon the Lehr conveyor 6 to positions overlying the transverse conveyor 9. This is best shown in FIGURE 9. During the movement of the glasses 5 from the Lehr conveyor 6 to the transverse conveyor 9, it is desired that the glasses 5 be vertically disposed at all times. In order to assure this, a first sprocket 137 is journaled on the shaft 84 intermediate the bearing 83 and the crank arm 98. The sprocket 137 is fixed against rotation with the shaft 84 by an arm 138 which extends between the sprocket 137 and a fixed part of the mounting means for the bearing 83. A second sprocket 139 is secured to the stub shaft 102 carried by the sleeve portion of the crank arm 98. The second sprocket 139 is rigidly secured to the stub shaft 102 for the purpose of rotating the stub shaft 102 and the shaft 106. The sprockets 137 and 139 are of the same diameter, and a chain 140 is entrained over the two sprockets 137 and 139. Since the sprocket 137 is fixed against rotation, when the shaft 106 is swung about the shaft 84, the chain 140 will be anchored by the sprocket 137, but will have a tendency to prevent movement of the sprocket 139. This tendency to prevent movement of the sprocket 139 results in the rotation of the sprocket 139 and the like rotation of the shaft 106. The rotation of the shaft 106 is such that the pickup heads 109 are retained in their vertical positions at all times.

From the foregoing description of the bellows assembly 115, it will be apparent that the pickup operation of the pickup head 109 is automatic. On the other hand, when the pickup heads 109 are disposed in overlying relation to the transverse conveyor 9, it is necessary that the bellows assembly 115 be vented to release the glasses 5. This is accomplished by pivoting the lever 134 in a clockwise direction, as illustrated in FIGURE 10, so as to unseat the valve member 132.

In order to automatically pivot all the levers 134 when the pickup heads 109 are in overlying relation to the transverse conveyor 9, a stop bar 141 is provided. The stop bar 141, as is best shown in FIGURE 9, is positioned for engagement by the levers 134 as the pickup heads 109 swing into overlying relation with respect to the transverse conveyor 9. Movement of the pickup heads 109 with respect to the stop bar 141 will result in the pivoting of the levers 134 to unseat the valve members 132 and thus release the glasses 5 carried by the bellows assemblies 115.

The stop bar 141 is positioned by a support assembly which includes a pair of standards 142 which are spaced transversely of the Lehr conveyor 6. The standards 142 are supported by brackets 143 which, in turn, are secured to one of the frame members 22 of the transverse conveyor 9. This is best shown in FIGURE 8. A fitting 144 is vertically adjustably mounted on the upper part of each of the standards 142. Each of the fittings 144 carries a horizontally disposed arm 145 which has one end thereof secured to the stop bar 141. The arms 145 are longitudinally adjustable with respect to their respective fittings 144 so that the stop bar 141 may be positioned both longitudinally of the Lehr conveyor 6 and vertically thereof.

It is to be understood that the transfer mechanism 10 is automatic in operation and operates at such a speed that jars of a row of jars on the Lehr conveyor 6 will be picked up from the Lehr conveyor and transferred to the transverse conveyor 9 and the pickup heads 109 returned to their initial positions prior to the movement of a next row of glasses along the conveyor 6 to the pickup position.

Reference is now had to FIGURES 8 and 9, wherein the general details of the control for the transfer mechanism 10 are illustrated. These controls include a limit switch 146 which is supported by a mounting bracket 147. The mounting bracket 147 is rigidly secured to the beam 76 in alignment with the crank arm 99. The limit switch 146 includes an actuator 148 which has a roller type follower 149. A switch actuating member 150 is secured to the sleeve portion 100 of the crank arm 99. In the at rest position of the transfer mechanism 10, the switch actuating member 150 engages the follower 149 and moves it downwardly to open the limit switch 146 which is normally closed.

The operation of the transfer mechanism 10 is initiated through the use of a photoelectric cell unit. The photoelectric cell unit includes a light source 151 and a photoelectric cell pickup head 152. The light source is aligned with the photoelectric cell pickup head transversely of the Lehr conveyor 6 and in advance of the at rest positions of the pickup heads 109. The light source 151 and a photoelectric cell pickup head 152 are mounted in the same manner. As is shown in FIGURE 9, a mounting plate 153 is secured to the underside of the beam 76. The mounting plate 153 supports a horizontal arm 154. A vertical arm 155 depends from the horizontal arm 154 and, in turn, supports either the light source 151 or the photoelectric cell pickup head 152. The operation of the transfer mechanism 10 will be described in more detail hereinafter.

A cabinet type support generally referred to by the numeral 156 is provided for both the supply conveyor 11 and the inspection mechanism 13. The support 156 is very similar to the support 18, and is coupled thereto as an extension thereof. The support 156 is portable and caster wheels 157 are secured to the underside of the support 156 to facilitate the transportation thereof. The left end of the support 156 is provided with suitable jacks 158 which cooperate with the jacks 79 and 80 to maintain the support 156 in an elevated position, such as is shown in FIGURE 2.

The support 156 is generally rectangular in both plan and elevation. It is formed of a structural framework and includes the usual sides, ends, top and bottom. Since these are all conventional and may be varied as may be desired, the construction details of the support 156 will not be set forth here. However, it is pointed out that the sides of the support 156 will have suitable access openings which are closed by removable inspection panels, such as the panels 159.

*Supply Conveyor*

The supply conveyor 11 includes an elongated frame 160 which extends longitudinally thereof. The frame 160 is of an inverted channel shape in cross-section. A pair of transversely spaced mounting brackets 161 extend upwardly from the central part of the support 156 and at the left end of the frame 160. Other mounting brackets 162 extend upwardly from the top of the support 156 at the right side thereof and engage the central portion of the frame 160. The mounting brackets 161 and 162 constitute the entire support for the frame 160.

A pair of fixed bearings 163 are secured to the upper portions of the mounting brackets 161 and in alignment with the frame 160. A drive shaft 164 extends between and is rotatably journaled in the bearings 163. The drive shaft 164, in turn, supports a drive roller 165.

The right hand end of the frame 160 supports a pair of movable bearings 166. The movable bearings 166 are mounted in carriers 167 which are guided in their movement longitudinally of the frame 160 by upper and lower guides 168 which are rigidly secured to the frame 160. A vertical plate 169 projects outwardly from each side of the frame 160 to the left of the carrier 167. An adjusting screw 170 is carried by each plate 169 and is connected to an associated one of the carriers 167 so as to longitudinally position the bearings 166.

An end plate 171 extends across the right hand end of the frame 160 to stiffen the frame. The sides of the frame 160 are provided with elongated slots 172 adjacent the right hand end of the frame 160. An idler shaft 173 extends through the slots 172 and is rotatably journaled in the bearings 166. An idler roller 174 is carried by the idler shaft intermediate the sides of the frame 160. A conveyor belt 175 is entrained over the drive roller 165 and the idler roller 174.

An electric motor 176 is secured to a reduction gear unit 177. The reduction gear unit 177 has a base 178 which is rigidly secured to the support 156 intermediate the mounting brackets 161 and 162. The reduction gear unit 177 has an output shaft 179 on which a sprocket 180 is mounted. A second sprocket 181 is mounted on the remote end of the drive shaft 164 in alignment with the sprocket 180. A drive chain 182 is entrained over the sprockets 180 and 181 to drive the drive shaft 164.

*Inverting Mechanism*

Reference is now had to FIGURES 35 and 36, wherein there are shown the details of the glass inverting mechanism 12. The glass inverting mechanism 12 includes a mounting bracket assembly generally referred to by the numeral 183. The mounting bracket assembly 183 is carried by the upright 20 and includes a pair of angle brackets 184 which are secured to the upright 20 in projecting relation. A vertical plate 185 extends between and is secured to the angle brackets 184. A pair of guides 186 extend upwardly along the face of the plate 185, as is best shown in FIGURE 35. A slide plate 187 extends between the guides 186 for vertical movement. The lower portion of the slide plate 187 is provided with a vertical slot 188. Extending through the slot 188 is a pair of vertically spaced guide fasteners 189 which are carried by the plate 185. The guide fasteners 189 may be tightened down to retain the vertical plate in a vertically adjusted position.

Vertical adjustment of the plate 187 is accomplished by an adjusting screw 190. The adjusting screw 190 is threadedly engaged in a nut 191 which is secured to the lower part of the plate 185. The upper end of the adjusting screw 190 bears against a projection 192 on the underside of the plate 187.

A horizontal mounting plate 193 overlies the upper end of the plate 187 and projects outwardly therefrom. The plate 193 is based adjacent opposite ends thereof by a pair of spaced gussets 194 which are secured to the plate 187.

A pair of ears 195 project upwardly from the plate 193 adjacent opposite ends thereof. An elongated web 196 is positioned between the ears 195, and a pivot shaft 197 extends through the web 196 and the ears 195 to pivotally mount the web with respect to the ears. The pivot shaft 197 is held in place by a pair of collars 198.

An angulated support 199 is secured to the upper side of the web 196. The cross-section of the support 199 is best illustrated in FIGURE 36. A pair of upstanding straps 200 are secured to the upper surface of the support 199 and extend longitudinally thereof in spaced parallel relation. A guide block 201 is secured to each of the straps 200. The guide blocks 201 are preferably formed of plastic material, such as Formica, and extend generally vertically coextensive with the straps 200. The lower part of each of the guide blocks 201 has an elongated slot 202 in which the upper part of an associated strap 200 is seated. The guide blocks 201 are secured to the straps 200 by pins 203.

It is to be noted that the guide blocks 201 are spaced apart and are disposed at the discharge end of the transverse conveyor 9. The purpose of the guide blocks 201 is to receive glasses as they pass off of the transverse conveyor 9 and to invert them in their movement from the transverse conveyor 9 to the supply conveyor 11. The guide blocks 201 are retained in the desired angular relation with respect to the transverse conveyor 9 by a pair of setscrews 204 which are disposed on opposite sides of the web 196 and are carried by the central portion of the support 199. When the guide blocks 201 are properly adjusted, both vertically and angularly, with respect to the transverse conveyor 9, as a glass, such as the glass 5, passes off of the transverse conveyor 9, the then lowermost rim thereof will strike the guide blocks 201 and the base thereof will continue to move because of inertia with the result that the glass 5 will fall or tilt over so that the base thereof will swing into engagement with the guide blocks 201 and the glass 5 will be in a generally horizontal position. The glass 5 will then slide about the guide blocks 201 and be deposited onto the supply conveyor 11 in upright positions.

In order to prevent the accidental sliding of a glass 5 off of the supply conveyor 11 from the glass inverting mechanism 12, a shield 205 is provided. This shield overlies the upper run of the conveyor belt 175, and mounting brackets 206 secure the shield to the frame 160 of the supply conveyor 11.

*Inspection Mechanism*

The inspection mechanism 13 includes a primary drive unit which is mounted within the support 156. A base plate 207 is supported within the support 156 slightly above the bottom of the support 156, as is best shown in FIGURE 16. A pair of uprights 208 and 209 extend upwardly from the base plate 207 in transversely spaced relation. Bearings 210 and 211 are carried by the uprights 208 and 209 in alignment. A shaft 212 extends through the bearings 210 and 211 and is rotatably journaled therein.

An upright 213 is secured to the base plate 207 adjacent the upright 209. A bearing holder 214 is secured to the upright 213 remote from the upright 209. The bearing holder 214 carries a sleeve type bearing 215 in which an intermediate part of the shaft 212 is rotatably journaled.

A gear 216 is positioned on the shaft 212 adjacent the upright 208. The gear 216 has a sleeve type bearing 217 and is mounted for rotation on the shaft 212. The gear 216 is positioned on the shaft 212 by a pair of collars 218 and a pair of thrust washers 219. A conventional electric clutch and brake assembly also manufactured by the Warner Electric Brake and Clutch Co. of Beloit, Wisconsin, including an electric clutch 220 and an electric brake 221, are secured to the gear 216 and are disposed intermediate the gear 216 and the bearing holder 214. The electric clutch 220 is so connected to the shaft 212 so that a drive between the gear 216 and the shaft 212 may be accomplished. Power is supplied to the electric clutch 220 by slip ring 222 and a brush unit 222' which is secured to the upright 213 by a mounting bracket 223.

Reference is now had to FIGURE 13 wherein there are shown the details of the drive for the gear 216. A platform 224 is secured to the base plate 207 adjacent the right end thereof and in overlying relation to the base plate 207. A reduction gear unit 225 is secured to the platform 224 and extends upwardly therefrom. An electric motor 226 is connected to the reduction gear unit 225 for driving the reduction gear unit. The reduction gear unit 225 has an output shaft 227 on which a drive gear 228 is mounted. The drive gear 228 is aligned with and is meshed with the gear 216. Thus, the gear 216 will be continuously driven although the shaft 212 is rotated only when the electric clutch 220 is engaged and the electric brake associated therewith is released.

Figure 15:
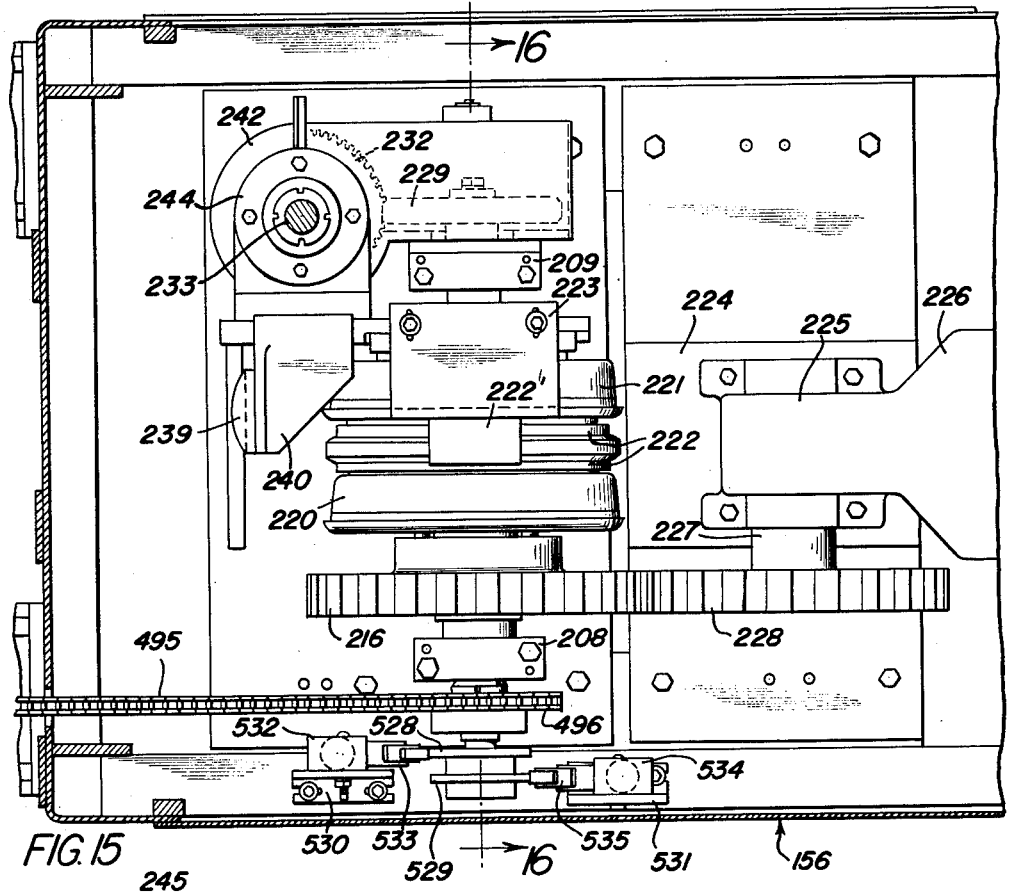
FIGURE 15 is an enlarged fragmentary horizontal sectional view taken along the line 15—15 of FIGURE 13, and shows further the specific details of the drive mechanism for the inspection mechanism.
Figure 17:
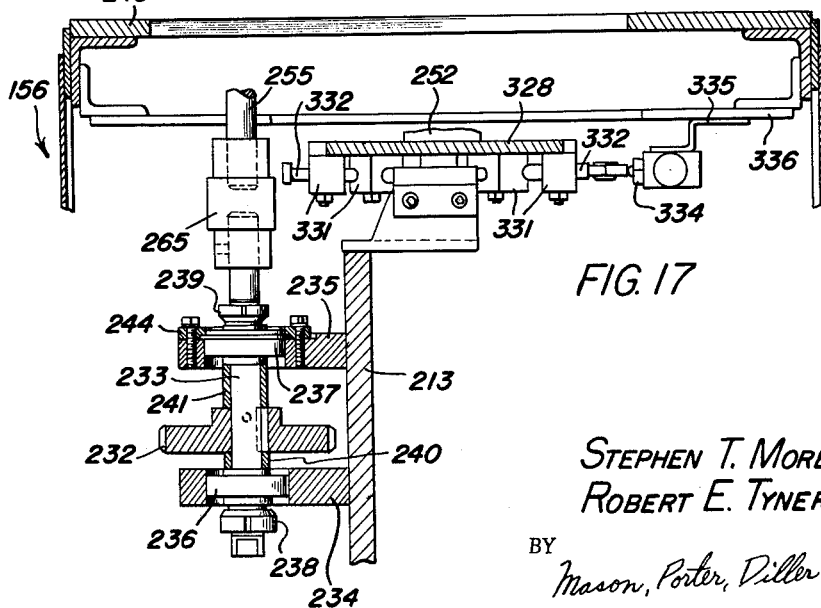
FIGURE 17 is an enlarged fragmentary vertical sectional view taken along the line 17—17 of FIGURE 14, and shows the mounting of a vertical drive shaft and further the details of the memory mechanism.

A helical gear 229 is secured to the left end of the shaft 212, as viewed in FIGURE 16. The helical gear 229 is held in place on the end of the shaft 212 by a bolt 230 and a washer 231. A horizontally disposed helical gear 232 is meshed with the helical gear 229 to provide a right angle drive. The helical gear 232 is keyed to a vertically extending shaft 233 which is best illustrated in FIGURES 15 and 17.

The upright 213 supports a pair of horizontal bearing holders 234 and 235 which are vertically spaced. The bearing holder 234 carries a bearing 236, while the bearing holder 235 carries a bearing 237. The bearings 236 and 237 are in vertical alignment, and the shaft 233 is rotatably journaled in these bearings. The shaft 233 is vertically adjusted with respect to the bearings 236 and 237 by adjustable collars 238 and 239 disposed on opposite ends thereof. The helical gear 232 is disposed intermediate the bearings 236 and 237 and is centered on the shaft 233 by a pair of sleeves 240 and 241.

A housing 242 encases the gears 229 and 232. The housing 242 is secured to the upright 209 and to the upright 213. A seal unit 243 (FIGURE 16) is disposed intermediate the housing 242 and the upright 209 to form a seal where the shaft 212 extends through the housing 242. The bearing holder 235 overlies the upper surface of the housing 242, and carries a seal unit 244. The seal unit 244 seals the housing 242 where the shaft 233 passes therethrough. Incidentally, the housing 242 is omitted from FIGURE 17 for purposes of clarity.

Reference is now had to FIGURES 19 and 20 wherein the support 156 is illustrated as having a relatively thick top wall 245. The top wall 245 has a generally pear-shaped opening 246 therein which is normally closed by a generally pear-shaped cover plate 247. The cover plate 247 is removably secured in place by suitable fasteners 248.

A heavy tubular support 249 extends upwardly from the cover plate 247 generally along the longitudinal center of the support 156 and in transverse alignment with the shaft 233. Bearings 250 and 251 are positioned in the lower and upper ends of the support 249. A turntable shaft 252 extends through the bearings 250 and 251 and is rotatably journaled therein. The turntable shaft 252 is shouldered to engage the bearing 251 and to prevent downward movement of the turntable shaft 252. A collar 253 secured to the turntable shaft 252 below the bearing 250 prevents upward movement of the turntable shaft 252.

A second tubular support 254 is secured to the cover plate 247 and extends upwardly therefrom. The tubular support 254 is in vertical alignment with the shaft 233 and supports a shaft 255 which is coaxial with the shaft 233. The lower part of the tubular support 254 has a bearing 256 and the upper part of the tubular support 254 supports a second bearing 257 which is aligned with the bearing 256. The shaft 255 is rotatably journaled in the bearings 256 and 257.

The cover plate 247 forms a top wall of a housing generally referred to by the numeral 258. The main part of the housing 258 includes a body 259 which is secured to the underside of the top wall 245. Secured to the body 259 in sealed relation on the underside thereof is a bottom wall 260 through which the shafts 252 and 255 pass. A first seal unit 261 is carried by the bottom wall 260 and engages the shaft 252 to form a seal therewith. A second seal unit 262 is also carried by the bottom wall 260 and engages the lower part of the shaft 255 to form a seal therewith. The upper ends of the tubular supports 249 and 254 are provided with cover plates 263 and 264, respectively. It is to be noted that the upper end of the shaft 233 is coupled to the lower end of the shaft 255 by a coupling 265.

A Geneva drive unit, generally referred to by the numeral 266, is positioned within the housing 258. The details of the Geneva drive unit 266 are best illustrated in FIGURE 37. The Geneva drive unit 266 includes a drive wheel, generally referred to by the numeral 267, and a driven wheel, generally referred to by the numeral 268. The drive wheel 267 is carried by the shaft 255, whereas the driven wheel 268 is carried by the shaft 252.

The drive wheel 267 includes a circular plate portion 269 which overlies the driven wheel 268. A drive pin 270 depends from the plate portion 269. A mounting hub 271 extends upwardly from the plate portion 269 and facilitates the securing of the drive wheel 267 to the shaft 255. A cam portion 272 extends downwardly from the plate portion 269. The cam portion 272 is generally circular in outline and has a portion removed, as at 273.

The driven wheel 268 is of the eight station type and has a plurality of arcuate cross-sectional vertical recesses 274 formed in the periphery thereof. The diameter of the vertical recesses 274 is approximately the same as that of the cam portion 272. The upper part of the driven wheel 268 has formed therein a plurality of elongated slots 275, which slots radiate from the center of the driven wheel 268 and open through the periphery thereof. The slots 275 do not necessarily extend entirely through the driven plate 268, but need be of a depth only slightly greater than the length of the drive pin 270.

The driven wheel 268 is illustrated in an at rest position. It is to be noted that the cam 272 is positioned in one of the recesses 274 and is free to turn relative thereto, but at the same time, prevents rotation of the driven plate 268. As the drive plate 267 rotates, the drive pin 270 will move into one of the slots 275 and proceed to drive the driven wheel 268 in a clockwise direction. At the time the driven plate 268 starts to rotate, the removed portion of the cam 272 will become aligned with the periphery of the driven wheel 268 and thus permit the driven wheel 268 to rotate.

The shaft 252 terminates at the upper end thereof in a mounting plate 276. The mounting plate 276 underlies and supports a turret turntable 277. The turret turntable 277 is secured to the shaft 252 by a plurality of fasteners 278 and is oriented with respect to the shaft 252 and the driven wheel 266 by a locating pin 279.

The general configuration of the turret turntable 277 is best illustrated in FIGURE 18. The turret turntable 277 is generally circular in outline and has a plurality of pockets 280 formed in the periphery thereof. The pockets 280 are equally spaced and correspond in number to the slots 275 of the driven wheel 268. Each of these pockets 280 defines a station of the turret of which the turret turntable 277 is a part.

Since the construction of the turret, which is generally referred to by the numeral 281, is the same at each of the stations, the details of the turret at one station only will be described. An article holder, generally referred to by the numeral 282, is disposed at each station in alignment with its respective pocket 280. Each article holder 282 includes a pair of clamp arms 283 which underlie the turret turntable 277 and which are pivotally connected to the turret turntable 277 by pivot pins 284. The outer ends of the clamp arms 283 support jaw elements 285 which cooperate to support and hold a glass, such as the sherbet glass 5, which is being inspected. The jaw elements are removable and are preferably formed of a suitable plastic, such as Formica.

A spring 286 extends between the clamp arms of each pair of clamp arms 283 and constantly urges the jaw elements 285 towards each other. The rear or inner ends of the clamp arms 283 terminate in levers 287 which are pivotally connected together by a pivot pin 288. The pivot pin 288 also connects the levers 287 to a slide bar or link 289 which extends radially of the turntable 277.

The turntable 277 is provided with a plurality of radiating slots 290. Each of the slots 290 is aligned with one of the pockets 280. Each of the slide bars 289 is aligned with a respective one of the slots 290 and underlies the slot 290. A pair of guide members 291 is carried by each of the slide bars 289 and passes through the slot 290. The guide members 291 secure the slide bar 289 to the underside of the turret turntable 277 and limit movement thereof to a radial movement relative to the turret turntable 277.

A follower 292 is secured to the underside of each of the slide bars 289 in depending relation and intermediate the guide members 291. Unless the follower 292 of one of the article holders 282 is engaged with a cam, several of which will be described in detail hereinafter, the slide bar 289 will be free to move inwardly towards the center of the turret turntable 277 with the result that the spring 286 will move the jaw elements 285 to contacting positions.

It is to be understood that each of the pockets 280 is of a size to permit the article to be received by the article holder 282 to freely move thereinto. To facilitate the centering of the article with respect to the article holder, it is to be noted that the pockets 280 are outwardly flared.

A support bracket 293 is secured to the upper surface of the turret turntable 277 inwardly of each of the pockets 280. The outer face of the support bracket 293 includes a lower mounting surface 294 and an upper mounting surface 295. As is illustrated in FIGURE 19, an angle bracket 296 is secured to the support bracket 293 in abutment with the lower mounting surface 294. However, when other types of glasses are to be inspected, for example a goblet which will be described in more detail hereinafter, the angle bracket 296 may be secured to the upper mounting surface 295, as shown in dotted lines. Each of the angle brackets 296 supports a pair of back-up rollers which are mounted for rotation about vertical axes and are disposed on opposite sides of the center of a respective one of the pockets 280 (FIGURE 18). The back-up rollers 297 are vertically positioned to engage the rim of a glass being inspected.

At this time, it is pointed out that a generally circular cam plate 298 extends about the center of the turret turntable 277 above the support brackets 293 and is supported by the support brackets 293. The cam 298, in turn, supports a circular outline, upright cam 299.

Reference is had to FIGURE 18 in particular, wherein it is shown that the supply conveyor 11 and the visual inspection conveyor 15 are offset on opposite sides of the center of the turret 281. As mentioned above, the turret 281 is of an eight pocket or eight station type. Accordingly, when the turret 281 is rotated in step-by-step relation by the Geneva type drive, the turret 281 will be rotated through an angle of 45° upon each driving thereof. The inspection mechanism 13 will include a height inspection station, generally referred to by the numeral 300. This will be disposed next to the supply conveyor 11. A run-out inspection station, generally referred to by the numeral 301, is disposed next to the height inspection station 300 in a clockwise direction. A photoelectric cell inspection station, generally referred to by the numeral 302, is next to the run-out inspection station 301 in a clockwise direction. The visual inspection conveyor 15 is next in the sequence. A cull discharge station, generally referred to by the numeral 303, is disposed in a counterclockwise direction from the visual inspection conveyor 15 and is next thereto. The area between the cull discharge station 303 and the supply conveyor 11 is open.

Reference is now had to FIGURES 19 and 20. A fixed cam 304 is secured to the upper side of the cover plate 263. The fixed cam 304 extends from a position generally aligned with the cull discharge station 303 to a position adjacent the supply conveyor 11. The cam 304 is aligned with the followers 292 and forces the followers 292 outwardly from the center of the turret turntable 277, thus opening the article holders 282. In this manner, all articles of glassware remaining in the holders 282 when they become aligned with the cull discharge station, will be released and discharged at this point. As the turret turntable 277 continues to rotate, the article holders 282 will remain open until they are aligned with the supply conveyor 11.

When the turret turntable 277 is indexed and the particular article holder 282 is aligned with the supply conveyor 11, the follower 292 thereof will have moved off of the fixed cam 304. However, at this time, it will be engaged by a movable cam 305. The movable cam 305 is supported by a mounting assembly which includes a mounting plate 306, which is secured to the tubular support 249. A vertically disposed bearing block 307 is supported by the mounting plate 306. A shaft 308 extends through the bearing block 307 and a lever 309 is secured to the upper end of the shaft 308. A second lever 310 is secured to the lower end of the shaft 308. The movable cam 305 is supported by the end of the lever 309 remote from the shaft 308.

The lever 310 projects beyond the shaft 308 and has a pin 311 projecting upwardly therefrom. The pin 311 is horizontally aligned with a pin 312, the pin 312 being supported from an ear 313 projecting from the mounting plate 306. A spring 314 extends between the pins 311 and 312 to swing the levers 309 and 310 about the axis of the shaft 308.

The end of the lever 310 remote from the pin 311 has a follower 315 secured thereto. The follower 315 is disposed below the lever 310 in depending relation, and is vertically aligned with a cam plate 316 which is secured to the upper end of the shaft 255. As is best shown in FIGURE 20, the cam plate 316 is of the type which includes a drop-off area so that the follower 315 will be quickly moved at one point of its engagement with the cam 316.

The action of the spring 314 is to urge the follower 315 into engagement with the cam plate 316 at all times. The rotation of the cam plate 316 is timed with the driving of the turret turntable 277 and when the turret turntable 277 is indexed, the follower 315 engages the highest point on the cam plate 216. When the follower 315 is in this position, the movable cam 305 is aligned with and forms an extension of the fixed cam 304.

When the turret 281 is indexed, the follower 292 of the article holder 282 which is aligned with the supply conveyor 11 is engaged with the movable cam 305. As soon as the shaft 255 begins to rotate to index the turret 281, the follower 315 will ride off of the high point of the cam plate 316 and will cause the pivoting of the levers 309 and 310 in such a manner so as to move the movable cam 305 inwardly, and thus permit the follower 292 engaged therewith to also move inwardly. In this manner, the article holder 282 will move to a closed position about the article received therein from the supply conveyor 11 before the turntable 277 is moved, the cam plate 316 being so oriented with respect to the drive wheel 267 to accomplish this.

A second movable cam 317 is associated with the fixed cam 304. The movable cam 317 is supported by a support assembly including a mounting plate 318 which is secured to the tubular upright 249. A pair of bearing blocks 319 and 320 are secured to the mounting plate 318 in spaced relation. A shaft 321 is rotatably journaled in the bearing blocks 319 and 320. A lever 322 is secured to the upper end of the shaft 321 above the bearing block 320. It is this lever that supports the movable cam 317 in alignment with the fixed cam 304.

A second lever 323 is secured to the shaft 321 intermediate the bearing blocks 319 and 320. A pin 324 secures the lever 323 to a plunger 325 of a solenoid type actuator 326 which is of a conventional type that may be purchased from numerous suppliers and which is secured to the reverse side of the mounting plate 318. A spring 327 encircles the plunger 325 intermediate the mounting plate 318 and the lever 323. The spring 327 serves to retain the plunger 325 in an extended position, in which position the movable cam 317 is retracted. When the solenoid type actuator 326 is energized, the plunger 325 will be withdrawn against the compression of the spring 327 and the movable cam 317 moved out into a position to be engaged by a follower 292. In this manner, the article holder 282 aligned with the visual inspection conveyor 15 will be opened when the solenoid type actuator 326 is energized.

It is the function of the invention to energize the solenoid type actuator 326 whenever an article of glassware which has passed the various inspections of the inspection mechanism 13 is aligned with the visual inspection conveyor 15. In this manner, all of the articles of glassware which have passed the various inspections will be released under control, and all articles of glassware remaining in the article holders 282 may automatically be discharged at the cull discharge station 303. In order to accomplish this, the inspection mechanism 13 is provided with a memory device.

The memory device includes a plate 328 which is secured to the lower end of the shaft 252 by a washer 329 and a bolt 330. A plurality of blocks 331 are secured to the underside of the plate 328 in circumferentially spaced, indexed relation with respect to the turret 281. Each of the blocks 331 carries a horizontally disposed pin 332 having a head 333 on the outer end thereof. Each of the blocks 331 and its pin 332 is provided with a pair of cooperating spring detents (not shown) which will hold the pin 332 in either an "out" position or an "in" position. As the plate 388 rotates, the heads 333 of the pins 332 will come into alignment with a switch 334 and actuate the switch. The switch 334 is supported by an angle bracket 335 which, in turn, is secured to the underside of a plate 336 which underlies the top wall 245 of the support 156.

Reference is now had to FIGURE 14 in particular, wherein the outline of the plate 336 is best illustrated. Also, it will be seen that the switch 334 includes an actuator 337 which has a follower 338 mounted in the outer end thereof. The follower 338 and the actuator 337 are so positioned that as the plate 328 rotates, the heads 333 of the pins 332 will engage the follower 338 to move the actuator 337 into a switch closing position providing the pin 332 is in its "out" position.

In order to assure the pins being in their "out" positions at the beginning of a cycle, a cam 339 is provided. The cam 339 is carried by a support 340 which is secured to the upper end of the upright 213. The cam 339 will engage all of the pins 332 which are in their "in" positions and will move them to their "out" positions as they pass by the cam 339.

A plurality of solenoid type actuators are secured to the underside of the plate 336 in circumferentially spaced relation. These solenoid type actuators include the solenoid type actuator 341, which is mounted by means of an angle bracket 342 carried by the plate 336. A second solenoid type actuator 343 is disposed next to the solenoid type actuator 341 and clockwise thereof. The solenoid type actuator 343 is mounted from the plate 336 by an angle bracket 344. A third solenoid type actuator 345 is disposed intermediate the solenoid type actuator 343 and the switch 344. The actuator 345 is mounted on the plate 336 by an angle bracket 346.

It is to be noted that when the turret 281 is indexed, the pins 332 come to rest in alignment with the solenoid type actuators 341, 343 and 345. The solenoid type actuator 341 is associated with the height inspection station 300, the solenoid type actuator 343 is associated with the run-out inspection station 301, and the solenoid type actuator 345 is associated with the photoelectric cell inspection station 302. In the event an article of glassware, such as one of the sherbet glasses 5, fails to pass the inspection at any one of these three stations, the solenoid type actuator corresponding to this particular station will be energized and the plunger thereof will move towards the center of the plate 328 so as to move an associated one of the pins 332 to its "in" position. Since the pins 332 become aligned with the various solenoid type actuators 341, 343, and 345 sequentially, it will be seen that in the event the article of glassware fails to pass any of the inspections, the pin associated therewith will be moved to its "in" position. When the pin is in its "in" position, the head 333 thereof will be moved out of alignment with the follower 338 for the switch 334 and as a result, when the article of glassware is aligned with the visual inspection conveyor 15, the switch 334 will not be closed so as to actuate the solenoid type actuator 326. Thus, the article of glassware failing to pass the inspection at any of the stations will remain in its article holder 282 and will be moved around to the cull discharge station 303 where it will be discharged.

Reference is now had to FIGURE 24, wherein it is shown that a housing 347 is secured to the left end of the support 156. The housing 347 includes a relatively heavy top wall 348 which functions as a support for various mechanism and the outline of which is best illustrated in FIGURE 26.

The height inspection station 300 includes a rotating platform 349. The rotating platform 349 is supported by a vertical shaft 350. The shaft 350 is carried by a pair of vertically spaced mounting blocks 351 and 352 which, in turn, are supported by an angle bracket 353 projecting up from the top wall of the support 156. A pulley 354 is secured to the lower end of the shaft 350.

Reference is now had to FIGURE 26 in particular. In this view, there is illustrated the drive for the shaft 350. This drive includes an electric motor 355 which is secured to the underside of the plate 348 and which includes an armature shaft 356 to which a drive pulley 357 is connected. The drive pulley 357 lies in a common plane with the pulley 354. Another pulley 358 also lies in the same plane and is carried by a shaft 359 which will be described in more detail hereinafter. A drive belt 360 is entrained over the pulleys 354, 357 and 358. The necessary tension in the drive belt 360 is maintained by an idler pulley 361 which is supported by a bracket 362 adjustably secured to the plate 348.

A standard assembly, generally referred to by the numeral 363, extends upwardly alongside the shaft 359 to support an upper mounting plate 364, the details of which will be described hereafter. The standard assembly includes a base 365 and a top support 366. A plate 367, which is disposed adjacent to and parallel to the shaft 359, extends between the base 365 and the top support 366. The plate 367 is reinforced by a vertical angle member 368 which is secured along its edges to the plate 367.

Reference is now had to FIGURE 29 wherein it is shown that a vertically adjustable mounting bracket 369 is secured to the plate 367. The mounting bracket 369 supports an upper bearing holder 370 and a lower bearing holder 371. The bearing holders 370 and 371 support aligned bearings 372 in which the shaft 359 is rotatably journaled. It is to be noted that the pulley 358 is mounted on the shaft 359 below the bearing holder 371 and that the shaft 359 extends down through an opening 373 in the plate 348.

Referring simultaneously to FIGURES 27 and 29, it will be seen that the shaft 359 has a sleeve bearing assembly 374 secured thereto above the bearing 372. The sleeve bearing assembly 374 carries an arm 375 for pivotal movement about the shaft 359. A similar sleeve bearing assembly 376 is mounted on the shaft 359 above the sleeve bearing assembly 374. The sleeve bearing assembly 376 supports an arm 377 for pivotal movement about the shaft 359. It is to be noted that the arms 375 and 377 extend in opposite directions from the shaft 359. An angle bracket 378 is secured to the plate 367 above the sleeve bearing assembly 376. The angle bracket 378 carries a bushing 379 in which the upper end of the shaft 359 is rotatably journaled. Thus, the angle bracket 378 and the bushing 379 support the upper end of the shaft 359 against deflection.

A sprocket 380 is secured to the shaft 359 for rotation therewith. The sprocket 380 is disposed above the sleeve bearing assembly 374. A shaft 381 is mounted on the outer end of the arm 375 for rotation. It is to be noted that the shaft 381 is disposed in parallel relation to the shaft 359. A sprocket 382 is secured to the shaft 381 in alignment with the sprocket 380. Also, a friction wheel 383 is secured to the shaft 381 for rotation with the sprocket 382. The friction wheel 383 has a driving tire 384. A chain 385 is entrained over the sprockets 380 and 382 and drivingly connects together the two. The chain 385 is tensioned by an idler sprocket 386 which is mounted on a shaft 387 carried by a bracket 388 secured to an intermediate portion of the arm 375.

The arm 375 is urged in a counterclockwise direction by a spring 389, as is best shown in FIGURE 23. The spring 389 has one end thereof connected to a pin 390 which extends up from the arm 375. A second pin 391 depends from the angle bracket 378, as is best shown in FIGURE 29, and the opposite end of the spring 389 is connected to this pin. Movement of the arm 375 in a counterclockwise direction is limited by an abutment 392 which is mounted on the inner end of the arm 375. The abutment 392 engages a stop member 393 which is adjustably carried by the plate 367.

The construction of the arm 377 is similar to that of the arm 375. A shaft 394 is secured to the outer part of the arm 377 in depending relation. Like the shaft 381, the shaft 394 is disposed parallel to the shaft 359. A sprocket 395 is mounted on the upper part of the shaft for rotation. A friction wheel 396 is also mounted on the shaft 394 and is connected to the sprocket 395 for rotation therewith. The friction wheel 396 includes a rubber tire 397 which will engage glassware to be rotated.

A sprocket 398 is secured to the shaft 359 below the sleeve bearing assembly 376 for rotation with the shaft 359. The sprocket 398 is horizontally aligned with the sprocket 395. A drive chain 399 is entrained over the sprockets 395 and 398 to drivingly connect the two together. The drive chain 399 is tensioned by an idler spocket 400 which is carried by a shaft 401 supported from the arm 377 by a mounting bracket 402.

As is best shown in FIGURE 23, the arm 377 is resiliently urged in a clockwise direction by a spring 403. One end of the spring 403 is connected to a pin 404 which depends from the arm 377. The opposite end of the spring 403 is connected to the pin 391 carried by the angle bracket 378. Springing of the arm 377 in a clockwise direction is limited by an abutment 405 which is mounted on the inner end of the arm 377 and which engages a stop member 406 which is adjustably carried by the plate 367 (FIGURE 29).

Reference is now had to FIGURE 32, wherein there are shown the details of one of the sherbet glasses 5 which is to be inspected by the inspection mechanism 13. The sherbet glass 5 includes a base 407, a stem 408, and a bowl 409. The bowl 409 has an upper portion in the form of a rim 410 which terminates in a lip 411.

The mechanism, which is the subject of the invention, may also be adjusted to handle goblets, such as the goblet generally referred to by the numeral 412. The goblet 412 includes a base 413, a stem 414 and a bowl 415. The bowl 415, as compared to the bowl 409, is relatively elongated and narrow. The upper portion of the bowl 415 terminates in a rim 416 which includes a peripheral lip 417. However, since the mechanism is illustrated as being adapted to receive only the sherbet glass 5, no further reference will be made to the goblet 412.

The previously mentioned mounting plate 364 is best illustrated in FIGURE 23. It is to be noted that the plate 364 is generally triangular in outline, and it is to be understood that it partially overlies the turret 281. The plate 364 sets on the top support 366 of the standard assembly 363 and is secured thereto by fasteners 418. The right corner of the mounting plate 364 is supported by a standard assembly generally referred to by the numeral 419. The standard assembly 419 extends upwardly from the support 156, as is shown in FIGURE 26. The standard assembly 419 includes a base 420 which is secured to the support 156. An angle upright 421 is secured to the base 420 and extends vertically therefrom. A top plate 422 is secured to the upper end of the angle member 421 and the mounting plate 364 overlies this.

As is best shown in FIGURE 25, a mounting bracket 423 is secured to the rear side of the housing 347. An offset standard 424 extends upwardly from the mounting bracket 423. The standard 424 in turn supports a second standard 425 which underlies and supports the third corner of the mounting plate 364. It is to be noted that the periphery of the mounting plate 364 is supported by a plurality of depending stiffeners 426.

*Height Inspection Station*

The height inspection station 300 includes mechanism for checking the height of glassware, such as the sherbet glasses 5, and to indicate when the height of the article of glassware being tested is without predescribed limits. A part of this mechanism has been previously described and includes the rotating platform 349 on which the sherbet glass 5 is seated during the inspection operation. It is to be noted that the rotating platform 349 has a bevelled upper portion 427. As the sherbet glasses 5 are moved to the height inspection station 300, the undersides of the bases 407 thereof will be disposed slightly below the upper surface of the rotating platform 349. As the bases 407 of the sherbet glasses engage the bevelled upper portion 427 of the rotating platform 349, they will be moved upwardly so that the sherbet glasses 5 will move free of the drawer elements 285.

The height inspection station 300 also includes gauging mechanism which is referred to in general by the reference numeral 428, as is best shown in FIGURE 34. The gauging mechanism 428 includes a support arm 429 which is mounted for pivotal movement. This is accomplished by a bracket 430 which is secured to the underside of the mounting plate 364. The support arm 429 has a rib 431 which is positioned between ears 432 of the bracket 430 and which is pivotally connected to the ears 432 by a pin 433. A stop member 434 limits the downward movement of the support arm 429 to that desired. The stop member 434 passes through the support arm 429 and terminates at its lower end in a head 435 which underlies and engages the support arm 429. The upper end of the stop member 434 is externally threaded and has a pair of nuts 436 and 437 engaged thereon, with the nuts clamping the mounting plate 364 therebetween to vertically adjustably position the head 435. The support arm 429 terminates at its outer end in a vertical plate 438. The plate 438 is based with respect to the support arm 429 by a gusset 439. A vertical mounting plate 440 is secured to the plate 438 by fasteners 441. A spacer 442 is disposed intermediate the plates 438 and 440. When a goblet, such as the goblet 412, is to be inspected, the spacer 442 will be omitted and the plate 440 will be moved higher up on the plate 438.

A conventional linear variable differential transformer 443 is rigidly secured to the lower part of the mounting plate 440. The transformer 443 includes a plunger 444 to which a support arm 445 is rigidly secured. The support arm 445 is horizontally disposed and a bearing assembly 446 is secured to the underside thereof. A Carboloy feeler rod 447 is rotatably carried by the bearing assembly 446. Rotation of the support arm 445 is prevented by a pin 448 which depends from the mounting plate 440 and which passes through an end portion of the support arm 445, thus limiting movement of the support arm 445 to vertical movement. It is to be understood that the plunger 444 is spring urged downwardly to a position normally below the lip 411 of the sherbet glass 5.

A support member 448' is secured to the underside of the support arm 429. The support member 448' carries a follower 449 which rotates about a horizontal axis. The follower 449 engages the vertical cam 299 so that as the turret 281 rotates, the entire gauging mechanism 428 will be elevated, with the feeler rod 447 being disposed above the path of sherbet glasses 5. After the sherbet glass 5 has ridden up onto the rotating platform 349, the feeler rod 447 is lowered into engagement with the lip 411 as the turret 281 is finally indexed.

It is to be understood that the linear variable differential transformer 443 is part of an electrical system which controls the operation of the solenoid type actuator 341 so that when the height of the lip 411 is beyond predetermined limits, the solenoid type actuator 341 will be energized. It is pointed out that the feeler rod 447 is of a relatively small diameter and therefore minute defects in the lip 411 will be detected thereby.

*Outside Diameter and Run-Out Inspection Station*

The inspection station 301 includes mechanism for gauging a glass, such as a sherbet glass 5, for both the outside diameter of the rim 410 in the vicinity of the lip 411, and also for run-out. The inspection station 301 relies upon the article holder 282 for the support of the sherbet glass 5 being inspected. It also relies upon the back-up rollers 297 for positioning the sherbet glass and facilitating the rotation thereof.

The mounting and driving of the drive wheel 383 has been described in detail heretofore. The at rest position of the drive wheel 383 is inwardly of the desired position of a sherbet glass when it is being rotated. As the sherbet glass 5 is indexed at the inspection station 301, it will engage the tire 384 of the drive wheel 383 and swing the drive wheel 383 outwardly until it assumes the position illustrated in FIGURE 30. At this time, the tire 384 and the back-up rollers 297 will engage the rim 410 of the sherbet glass 5 in a three-point suspension, with the drive wheel 383 rotating the sherbet glass 5.

The inspection station 301 also includes gauging mechanism generally referred to by the numeral 450 and best illustrated in FIGURES 30, 31 and 32. The gauging mechanism includes a mounting bracket assembly generally referred to by the numeral 451. The mounting bracket assembly 451 includes an upper plate 452 which is releasably secured to the underside of the mounting plate 364 by fasteners 453. A vertical plate 454 is secured to an edge of the upper plate 452 in depending relation. A lower plate 455 is secured to a lower portion of the vertical plate 454 in underlying parallel relation to the upper plate 452. The connections between the vertical plate 454 and the plates 452 and 455 are braced by a vertical filler 456.

A bearing holder 457 is rigidly secured to the upper plate 452 and extends therethrough. The bearing holder 457 supports a sleeve bearing 458. A second sleeve bearing 459 is mounted in the lower plate 455 in alignment with the sleeve bearing 458. A shaft 460 extends through the bearings 458 and 459 and is mounted for rotation.

An arm 461 is keyed to the shaft 460 intermediate the bearings 458 and 459 for rotation with the shaft 460. The arm 461 carries a follower 462 which is aligned with and engages the cam 298. It is to be noted that the follower 462 is retained in engagement with the cam 298 at all times by means of a pair of springs 463. First ends of the springs 463 are secured to an upstanding pin 464 carried by the arm 461. A second pin 465 depends from the mounting plate 364 and second ends of the spring 463 are connected to this pin.

A second arm 466 is secured to the lower end of the shaft 460 for rotation with the shaft 460 and the arm 461. The arm 466 extends on both sides of the shaft 460 and has a portion thereof engaged with an adjustable stop member 467 to limit the movement thereof in response to the urgings of the springs 463.

A mounting bracket assembly generally referred to by the numeral 468 is secured to the opposite end of the arm 466 in depending relation. The mounting bracket assembly 468 includes a block 469 and a horizontal arm 470.

A horizontally disposed variable linear differential transformer 471, which is like the transformer 443, is secured to the underside of the arm 470 in a horizontal position. The transformer 471 includes a horizontally disposed plunger 472 which is spring urged to the left, as viewed in FIGURE 32. A horizontally disposed plunger extension 473 is slidably mounted in the block 469 in alignment with the plunger 472 and in abutting engagement therewith. A C-shaped bracket 474 is secured to the left end of the plunger extension 473. A spring 475 is disposed between the bracket 474 and the block 469 and urges the bracket to the left. A pin 476 extends to the left from the block 469 and is received in a bore in the bracket 474 to prevent rotation of the bracket 474.

A vertical axle 477 extends between the arms of the bracket 474. A wheel type feeler 478 is mounted on the axle 477 for rotation within the general confines of the bracket 474. The feeler 478 is urged downwardly by a spring 479 which is positioned on the axle 477 between the upper surface of the wheel feeler 478 and the upper arm of the bracket 474.

The wheel 478 includes a lower cylindrical gauging portion 480 which engages the upper part of the rim 410 of a glass 5 being inspected. The wheel 478 also includes a large diameter upper portion 481 which has a bottom part 482 extending around the gauging portion 480 and normally seating on the lip 411 of the sherbet glass 5. The upper portion 481 is downwardly and inwardly beveled, as at 483. By so constructing the feeler 478, when the feeler 478 moves into engagement with a sherbet glass 5 to be gauged or inspected, the lip 411 of the sherbet glass will engage the beveled surface of the upper portion 481 with the result that the feeler 478 will ride up and over the lip 411 to the position illustrated in FIGURE 32.

It will be readily apparent that any variation in roundness of the rim 410 will result in the reciprocation of the feeler 478. Also, the feeler 478 will be positioned longitudinally of the transformer 471 in accordance with the outside diameter of the rim 410. This, the plunger 472 will assume a position with respect to the remainder of the transformer 471 in accordance with the outside diameter and roundness of the rim 410 of a sherbet glass 5 being inspected. The transformer 471 is a part of an electrical system which controls the energization of the solenoid type actuator 343 in the event the rim area of a sherbet glass being inspected is not within the predetermined limits.

*Photoelectric Cell Inspection Station*

The photoelectric cell inspection station 302 operates on the principle that light passing through glass having internal defects therein will be deflected by such defects. In accordance with the principles of the invention, two light sources, to be described hereinafter, are provided and deflected light rays will be picked up by a mirror assembly and directed to a photoelectric cell pickup head. In order that the mirror assembly may be in the proper position to pick up the reflected light rays, it is necessary that the individual mirrors be disposed partially within the sherbet glass 5 being inspected. For this reason, it is necessary that means be provided for vertically reciprocating the mirror assembly.

In the inspection of glassware, it is the customary procedure to direct light rays onto the surface of the glassware to be inspected and to provide suitable pick-up means which are parts of a photoelectric cell inspection unit, which pick-up means normally are unaffected by the light rays, but will receive light rays deflected by imperfections in the glass. The reflected light rays are directly proportional to the imperfections and by use of suitable control means the photoelectric cell inspection unit may be utilized to determine whether the article is to be rejected. It is on this broad principle that the photoelectric cell inspection unit of this invention is based.

In FIGURE 26, a vertical guide tube 484 is illustrated. The vertical guide tube 484 has the lower end thereof secured to a mounting plate 485 which is removably secured to the top wall 348 of the housing 347.

As is best shown in FIGURE 24, a vertical shaft 486 extends through the guide tube 484 and projects down into the housing 347. An arm 487 is secured to the lower end of the shaft 486. The arm 487 engages a depending pin 488 carried by the top wall 348 of the housing 347. The arm 487 and the pin 488 have a sliding connection which permits the vertical reciprocation of the arm 487, but prevents rotation of the arm.

The housing 347 includes a vertical support plate 489. The vertical support plate 489 is disposed adjacent the shaft 486 and a bearing assembly 490 is secured to the support plate 489. A horizontal shaft 491 is rotatably journaled in the bearing assembly, as is best shown in FIGURE 25. The horizontal shaft 491 has a sprocket 492 secured thereto. A cam plate 493 is also secured to the shaft 491. A follower 494 is carried by the arm 487 and engages the cam plate 493 to vertically position the shaft 486.

The sprocket 492 is driven by a chain 495 which is entrained over the sprocket. The opposite end of the chain 495 is entrained over a sprocket 496, illustrated in FIGURE 16. The sprocket 496 is splined to a reduced end portion 497 of the shaft 212. It is to be understood that the cam plate 493 is driven in timed relation to the rotation of the turret 281.

An arm 498 is rigidly secured to the upper end of the shaft 486, as is best shown in FIGURES 24 and 25. A horizontal mounting plate 499 is, in turn, secured to the arm 498. The mounting plate 499 supports two mirror assemblies 500 and 501. Since the two mirror assemblies are identical, the details of only the mirror assembly 500 will be described here.

The mirror assembly 500 includes a bracket 502 which has a C-shaped portion receiving a portion of the mounting plate 499. The bracket 502 is clamped in an adjusted position by a clamp screw 503. A support bracket 504 is secured to the underside of the bracket 502 at generally a 45° angle. A mirror 505 is mounted in the support bracket 504 for movement therewith.

Reference is now had to FIGURE 25, wherein it is shown that a pair of mounting plates 506 are positioned intermediate the housing 347 and the mounting plate 364. The mounting plates 506 are secured to the top wall 348 of the housing 347 by brackets 507. The mounting plates 506 are also secured to the mounting plate 364 by brackets 508. Each of the mounting plates 506 is provided with a pair of vertically elongated slots 509.

As is best shown in FIGURE 23, a light source 510 is secured to each of the mounting plates 506. The light sources 510 may be of any desired design, but should direct a concentrated light beam on the rim portion of an article of glassware being inspected. It is to be noted that the light sources 510 are disposed generally 10° on opposite sides of a line radiating from the center of the area where an article of glassware is to be rotated. It is also to be noted that a blower 511 is mounted on top of the mounting plate 364 and that the blower is connected to the light sources 510 by a pair of hoses or tubes 512. In this manner, the heat generated by the light sources 510 is dissipated.

Reference is now had to FIGURE 24, wherein it is shown that each of the light sources 510 is disposed at an upwardly directed angle. Each of the light sources 510 is secured to its associated mounting plate 506 by means of a mounting bracket which includes a support bar 513. The support bar 513 is provided with a pair of clamps 514 which extend around the light source 510 adjacent opposite ends thereof. The support bar is longitudinally adjustably carried by a sleeve portion 515 of a mounting bracket 516 which is adjustably secured to its respective mounting plate 506. Thus, the light source 510 may be vertically adjusted, the angle of the light source may be adjusted, and the light source moved in towards or away from the article of glassware being inspected.

Reference is now had to FIGURE 28, wherein the broad aspects of a photoelectric cell pickup head assembly are illustrated. The photoelectric cell pickup head assembly includes a conventional type of photoelectric cell pickup head 517 which is mounted in a housing 518. The housing 518 is secured to a support plate 519 which overlies the mounting plate 364. The support plate 519 is elevated above the mounting plate 364 by means of spacers 520 through which fasteners 521 securing the support plate 519 in place pass.

A lens holder is secured to the underside of the support plate 519 concentric to the photoelectric cell pickup head 517. The lens holder, referred to by the numeral 521, projects down through the mounting plate 364 and is concentric with the axis of the mirror assembly. A lens mounting ring 522 is removably mounted in the lower part of the lens holder 521. The lens mounting ring 522 suitably supports a lens 523 which concentrates light rays from the mirrors 505 towards the photoelectric cell pickup head 517.

It is to be understood that the drive wheel 396 is a component of the photoelectric cell inspection station 302. The friction drive wheel 396 cooperates with the backup rollers 297 for the particular station of the turret 281 to center and rotate the article of glassware being inspected. The tire 397 will be disposed coplanar with the back-up rollers 297 and will engage the rim portion of the article of glassware. By rotating the article of glassware, all portions of the rim will be exposed to the light source, and thus checked for internal defects.

It is to be understood that when a perfect goblet or sherbet glass is positioned at the photoelectric cell inspection station 302, a small percentage of the light rays passing through the rim thereof will be reflected to the mirrors 505. However, the photoelectric cell pickup head 517 may be adjusted to not be actuated by these stray light rays. On the other hand, the adjustment of the photoelectric cell pickup head will be such that any light reflected to the mirrors 505 by flaws in the glass will be directed to the photoelectric cell pickup head and the photoelectric cell pickup head actuated so as to energize the solenoid type actuator 345.

Several switches are required for the proper operation of the inspection mechanism 13. These switches include a turret control switch 524 which is supported by a mounting bracket 525 extending upwardly from the frame 160 of the supply conveyor 11. The turret control switch 524 includes an actuator 526 which is disposed in the path of glassware passing from the supply conveyor 11 into the turret 281. As is best shown in FIGURE 18, the actuator 526 will be engaged by glassware which is received in one of the pockets 280 aligned with the supply conveyor 11 and ready to be engaged by the drawer elements 285 of an associated one of the article holders 232. The switch 524 controls the initiation of the indexing of the turret 281.

Reference is now had to FIGURE 16, wherein it is shown that the shaft 212 has an end part 527. A pair of cams 528 and 529 are mounted on the end part 527 of the shaft 212 for rotation therewith.

Reference is now had to FIGURE 13. A pair of standards 530 and 531 are supported by the frame of the support 156 on opposite sides of the shaft 212. The standard 530 supports a switch 532 which has an actuator 533 constantly engaging the cam 528. The standard 531 supports a switch 534 having an actuator 535 which constantly engages the cam 529.

The switch 532 will be part of the electrical control system for the photoelectric cell inspection station, as will be described in more detail hereinafter. It is essential that the control circuit of the photoelectric cell inspection station not be in operation until such time as the mirrors 505 are properly positioned with respect to the sherbet glass 5 being inspected. Accordingly, the switch 532 will be incorporated in this circuit and will not be closed until the mirrors 505 are in position. The switch 532 also controls the energization of the solenoid type actuators 341 and 343 for the height inspection mechanism and the outside diameter and run-out mechanisms, respectively, in a manner to be described in more detail hereinafter.

The switch 534 is a limit switch which is used in conjunction with the switch 524 for controlling the driving of the shaft 212. The feelers 447 and 478 are urged to positions where they will indicate a defect in the article of glassware before they become engaged with the glassware. It is therefore essential that the control systems for the inspection stations 300 and 301 not be energized until such time as the feelers 447 and 478 are engaged with the sherbet glasses.

The discharge station 303 includes a generally L-shaped plate 536, which is disposed below the plane of the bases of the glassware being inspected by the inspection mechanism 13. The plate 536 is supported by a standard assembly 537 which extends upwardly from the top wall 245 of the support 156, as is shown in FIGURE 20. The plate 536 is based from the support assembly 537 by gussets 538. As is best shown in FIGURE 18, the plate 536 carries a pair of curved guides 539 which guide the culls in their movement away from the turret 281.

A discharge chute 540 is secured to one end of the plate 536 in alignment with the guides 539. The discharge chute 540, as is best shown in FIGURE 1, terminates in overlying relation to the lehr conveyor belt 8 so that the culls discharged from the turret 281 will be delivered back to the lehr conveyor 6 for delivery to the cull box 17.

Visual Inspection Conveyor

The receiving or visual inspection conveyor 15 includes a cabinet type support, generally referred to by the numeral 541. The cabinet type support 541 is provided with caster wheels 542 to facilitate the movement thereof from one location to another. When the visual inspection conveyor 15 is in use as a part of the above-described mechanism, it is supported in a fixed elevated position by jacks 543 secured to opposite ends of the support 541.

The visual inspection conveyor 15 includes an elongated frame 544 which is secured to the top of the support 541, and extends beyond opposite ends of the support 541. The frame 544 is of inverted channel cross-section, and is rigidly secured to the support 541. A pair of transversely aligned bearing members 545 are secured to the left end of the frame 544. The bearing members are disposed exteriorly of the frame 544 and a drive shaft 546 is rotatably journaled in the bearing members 545. The drive shaft 546 carries a drive roller 547. A pair of adjustable bearing assemblies 548 are secured to the right end of the frame 544. An idler shaft 549 is rotatably journaled in the adjustable bearing assemblies 548. The idler shaft 549 carries an idler roller 550. A conveyor belt 551 is entrained over the drive roller 547 and the idler roller 550 with the top run of the conveyor belt resting on and being supported by the frame 544. Additional idler rollers 552 are supported by intermediate portions of the frame 544 within the frame 544 and support the lower run of the conveyor belt 551 above the support 541.

A reduction gear unit 553 is mounted within the support 541. An electric motor 554 is coupled to the reduction gear unit for driving the same. The reduction gear unit 553 includes an output shaft 555 on which a sprocket 556 is mounted. The sprocket 556 is aligned with a sprocket 557 carried by the shaft 546. The sprockets 556 and 557 are connected together by a chain 558 which is entrained over these two sprockets.

Referring now to FIGURES 3 and 5 in particular, it will be seen that a vertical plate 559 extends outwardly from the frame 544 at the left end thereof. The plate 559 is provided with vertically spaced bearing members 560 in which a shaft 561 is rotatably journaled. The shaft 561 terminates at its upper end in a mounting plate 562 to which a turntable 563 is secured. The turntable 563 overlies the mounting plate 562 and has an upper surface coplanar with the upper surface of the upper run of the conveyor belt 551.

A drive plate 564 is secured to an intermediate portion of the shaft 561. The drive plate 564 has the underside thereof engaged by a friction drive wheel 565 which is mounted on the end of the drive shaft 546. In this manner, the turntable 563 is constantly rotated and functions as a storage area for glasses during a peak load period.

Reference is again had to FIGURES 1 and 2. As is best shown in FIGURE 2, the visual inspection conveyor 15 terminates adjacent a part of a boxing machine, generally referred to by the numeral 566. As the inspected glassware pass along the top run of the visual inspection conveyor 15, the glassware is manually removed from the visual inspection conveyor 15 and placed in suitable cartons carried by the boxing machine 566. As the glassware is removed from the visual inspection conveyor 15 by the individual placing the glassware in cartons, the glassware is visually inspected. In the event any defects should be found, the cull glassware will be placed onto the chute 16 and thus returned to the Lehr conveyor 6, which will deliver the cull glassware to the cull box 17.

Normally, the individual placing the inspected glassware into cartons will be able to remove the glassware from the visual inspection conveyor 15 as they arrive at the boxing station. However, when a new carton is being positioned, the individual will get behind, and as a result, it is necessary that the overload of glassware be temporarily stored. It is for this purpose that the turntable 563 is provided. Glassware approaching the end of the visual inspection conveyor 15 is directed onto the turntable 563 by a diverter plate 567 which is suitably secured to the frame of the visual inspection conveyor 15 and extends diagonally across the top of the visual inspection conveyor 15, as is best shown in FIGURES 1 and 3.

A control box 568 is illustrated as being mounted above the visual inspection conveyor 15. The control box is supported by a plurality of standards 569 which extend upwardly from the support 541. Under actual operating conditions, additional control boxes (not shown) contain other controls. However, for descriptive purposes, it may be considered that all of the controls for the mechanism are mounted within the control box 568.

Electrical Controls

Reference is now had to FIGURE 39 wherein the primary wiring diagram for the motors of the invention is illustrated. Three line wires A, B, C are provided, and the electrical supply is a 440-volt, three-phase supply. Flow through the line wires A, B, C is controlled by a master control switch 570. The three wires 571 for the transverse conveyor motor 33 are connected to the wires A, B, C, and energization of the electric motor 33 is controlled by a switch 572. The three wires 573 of the electric motor 57 for the transfer mechanism are also connected to the line wires, and energization of the electric motor 57 is controlled by a switch 574. The three wires for the electric motor 176 of the supply conveyor are connected to the line wires and energization of the electric motor 176 is controlled by a switch 576. The wires 577 for the electric motor 226 of the turret are connected to the line wires, and energization of the electric motor 226 is controlled by a switch 578. The electric motor 554 for the visual inspection conveyor is connected to the line wires by three wires 579 and energization of this motor is controlled by a switch 580. The motor 355 is also connected to the line wires A, B, C by three wires 581 and energization thereof is controlled by a switch 582.

The line wires A and C are connected to a transformer 583 which reduces the voltage down to 110 volts. Wires D and E take off from the low voltage side of the transformer 583.

Although the various motors will be provided with the conventional type of motor controls, only a simple open-and-close switch will be illustrated. The switch 572 is mounted in a wire 584 which extends between the wires D and E. A control switch 585 is mounted in the wire 584. A wire 586 is disposed in parallel relation to the switch 572 and incorporates a light 587 to indicate the energization of the motor 33. The switch 574 is mounted in a line 588 which is terminally connected to the wires D and E. A switch 589 is also incorporated in the line 588 to control the actuation of the switch 574. A wire 590 is connected in parallel relation to the switch 574. A wire 590 is connected in parallel relation to the switch 574 and has incorporated therein a light 591 to indicate the energization of the motor 57.

A line 592 extends between the wires D and E and has incorporated therein the motor controller switch 576. Actuation of the motor controller switch 576 is controlled by a switch 593 incorporated in the line 592. A wire 594 is disposed in parallel to the motor controller switch 576 and has incorporated therein a light 595 indicating the energization of the motor 176. The motor controller switch 578 is mounted in a line 596 which extends between the wires D and E. A control switch 597 is also mounted in the line 596, controlling operation of the switch 578. A wire 598 is disposed in parallel with the motor controller switch 578 and has incorporated therein a light 599 for indicating the energization of the motor 226.

A line 600 extends between the wires D and E and has incorporated therein the motor controller switch 580. Actuation of the switch 580 is controlled by a switch 601 mounted in the line 600. A wire 602 is disposed in parallel to the switch 580 and has incorporated therein a light 603 for indicating the energization of the motor 554. The switch 582 is incorporated in a line 604 which is connected to the wires D and E. Operation of the switch 582 is controlled by a switch 605 incorporated in the line 604. A wire 606 is disposed in parallel to the switch 582 and incorporates a light 607 to indicate the energization of the motor 355. The motor for the blower 511 is incorporated in a line 608 which also extends between the wires D and E. Operation of the blower motor is controlled by a switch 609.

Reference is now had to FIGURE 40 wherein there is illustrated the wiring diagram for controlling the operation of both the transfer mechanism and the turret. Since the motor 57 is continuously operating, it is only necessary that the operation of the conventional electric clutch 65 and the conventional electric brake 66 be controlled to control the operation of the transfer mechanism. In order to accomplish this, there is provided a conventional Warner CW-1001 control, which is manufactured by Warner Electric Brake and Clutch Co. of Beloit, Wisconsin for controlling the electric clutch and brake assembly manufactured by that concern and referred to by the numeral 610. The control 610 is connected to the wire D by a wire 611 and to the wire E, by a wire 612. The control 610 includes a conventional solenoid 613 for actuating the electric clutch 65 and a conventional solenoid 614 for actuating the electric brake 66. Since the control 610 is a conventional one, it need not be described in more detail. However, the manner in which the control 610 is actuated will be set forth hereinafter.

The control for the transfer mechanism also includes a conventional photoelectric cell unit 615 of which the photoelectric cell pickup head 152 is a part. The photoelectric cell unit 615 is connected to the wire D by a wire 616 and to the wire E by a wire 617. Also, the light source 151 is connected to the wire D by a wire 618 and to the wire E by a wire 619.

A pair of wires 620 and 621 extend from the control 610 for controlling the actuation of the control 610. A wire 622 extends between the wires 620 and 621. The wire 622 has incorporated therein a switch 623 which is part of a photoelectric cell unit 615. The wire 622 has also incorporated therein one-half 624 of a multiple switch. The photoelectric cell unit 615 is composed of the photo-sensitive pickup head 152 (FIG. 8), a signal amplifier (not shown) and a signal circuit (not shown) which contains a solenoid actuator for operating the switch 623. When the light beam extending from the light source 151 to the pickup head 152 is interrupted such as by a row of glasses 5 on the lehr conveyor 6 (FIG. 1) the conventional photo-sensitive pickup head is caused to give a signal in the well-known manner. Such signal is transmitted to the amplifier. The amplified signal is transmitted to the signal circuit where it is used to energize the solenoid actuator for the switch 623 which causes the switch to close. Units such as photoelectric cell unit 615 are entirely conventional and obtainable on the market from a number of manufacturers. When the switch 624 and the switch 623 are closed, then, the electric clutch 65 will be engaged and the electric brake 66 released. This is accomplished by a circuit being formed from the control 610 through wire 621, switch 624, wire 622, switch 623, wire 620 and back to the control 610. In the control 610 is a solenoid operated switch (not shown) the solenoid of which is a part of the circuit formed. The circuit is energized through wires 611 and 612. Sets of contacts of the solenoid operated switch are respectively wired in series with the solenoid 613 and the solenoid 614 to position each solenoid 613 and 614 in a first position when the solenoid operated switch is energized and in a second position when the solenoid operated switch is not energized. When solenoid 613 is in its first (energized) position it mechanically positions the electric clutch 65 to a clutch engaged position as this solenoid is located within the clutch 65 (FIG. 7) although it is not shown. Electrical energy for controlling the solenoid 613 is supplied by the right brush unit 67' and the right slip ring 67. At the same time, solenoid 614 which is located within the brake 65 is in its first position (de-energized) to mechanically position the electric brake 66 in a brake-off position. Solenoid 614 is supplied with electrical energy through the left brush unit 67' and the left slip ring 67. When solenoid 613 is in its second position (de-energized) and solenoid 614 is in its second position (energized) the clutch 65 is dis-engaged and the brake 66 is engaged. Extending between the wires 620 and 622 and bypassing the switch 623 is a wire 625 in which the limit switch 146 is positioned. The limit switch 146 is normally held closed and is opened only when the transfer mechanism is at a standstill. Another wire 626 extends between the wires 620 and 621. Incorporated in the wire 626 is a switch 627 which is the other half of the switch of which the switch 624 is a part. When the switch 624 is closed, the switch 627 is opened. Also incorporated in the wire 626 is a switch 628 which is considered a jog switch. When it is desired to jog the transfer mechanism, the switch 627 will be closed and the switch 624 will be opened. Then, as long as the switch 628 is held down, the electric clutch 65 will be energized and the electric brake 66 will be released so as to manually control the operation of the transfer mechanism.

A second conventional Warner CW-1001 control 629 is provided for controlling the operation of the conventional electric clutch 220 and the conventional electric brake 221. The control 629 is connected to the wire D by a wire 630 and to the wire E by a wire 631. The control 629 includes a conventional solenoid 632 for controlling the operation of the electric clutch 220, and a conventional solenoid 633 for controlling the operation of the electric brake 221. Solenoid 632 is mounted within the electric clutch 220 (FIG. 16) although it is not shown and solenoid 633 (also not shown) is mounted within the electric brake 221. Solenoid 632 is energized through the right brush unit 222' and right slip ring 222. Solenoid 633 is energized through the left brush unit 222' and left slip ring 222. The solenoids 632 and 633 are energized through a solenoid actuated switch in the control 629 in a manner similar to the description in connection with the operation of solenoids 613 and 614 by a solenoid actuated switch in the control 610.

The control 629 is controlled by switches which are connected to wires 634 and 635 which are connected to the internal control mechanism of the control 629. A first line 636 extends between the wires 634 and 635. Incorporated in the wire 636 is the normally held closed switch 534 and a normally closed switch 637 which is the lower half of a double switch. A wire 638 extends between the wire 634 and the line 636 and has incorporated therein the switch 524. The switch 534 is open when the turret has been indexed. However, when an article of glassware closes the switch 524, the electric clutch 220 will be energized and the electric brake 221 will be released. As the shaft 212 begins to rotate, the switch 534 will close, this happening before the switch 524 opens.

A second line 639 extends between the wires 634 and 635. A switch 640 is incorporated in the line 639, the switch 640 being the other half of the double switch of which the switch 637 is a part. A second switch 641, which is considered a jog switch, is also mounted in the line 639. When it is desired to jog the turret 281, the switch 637 is opened and the switch 640 is closed. Then, while the switch 641 is manually held closed, the turret will rotate and may be started and stopped in any position.

In FIGURE 41, there are illustrated the details of the control for the various inspection stations. These controls include a model 252 modular carrier amplifier control system for the height inspection station 300, the control system being a well-known conventional unit readily available on the open market manufactured by Industrial Electronics, Inc., of Detroit, Michigan, and being referred to by the numeral 642. A conventional linear variable differential transformer 443 is a well-known part of the conventional control system 642. A conventional relay 643, which is also a well known part of the control system 642, is connected to the control system 642 by a wire 644. A second wire 645 connects the relay 643 to the wire E. The relay 643 controls the actuation of a switch operator 646 which has connected thereto a pair of switches 647 and 648. The switch 648 is normally closed, and the switch 647 is normally open.

A wire 649 is connected to the wire D by a wire 650 in which the limit switch 532 is positioned. Thus, the wire 649 is energized only when the turret 281 is in an indexed position. A wire 651 extends between the wire 649 and the switch 647. A wire 652 extends between the switch 647 and the solenoid of the solenoid type actuator 341. The solenoid type actuator 341 is connected to the wire E by a wire 653. Another wire 654 extends between the wire 652 and the wire E and has incorporated therein a light 655 to indicate when the solenoid type actuator 341 is energized.

In actual practice, a defect will be found at the height inspection station 300 at the maximum of approximately every two minutes. However, in order to make an accurate check on the operation of the electrical controls, there is provided a warning device which will indicate when no defect has been found at the height inspection station 300 in a predetermined period of time, for example, fifteen minutes. In order to accomplish this, there is provided an audible alarm device 656, preferably a horn, which is connected to the wire D by a wire 657 and to a wire 658 by a wire 659.

The switch 648 is mounted in a wire 660 which is connected between the wire D and a conventional timer 661. The timer 661 has a wire 662 connected thereto which, in turn, is connected to a solenoid 663 of a solenoid control switch 664. The switch 664 is incorporated in the line 665 which extends between the wires 658 and E. A wire 666 is disposed in parallel to the solenoid 663 and has incorporated therein a light 667 to indicate which circuit is controlling the alarm device 656.

From the foregoing, it will be readily apparent that each time the solenoid 643 is energized, the circuit to the timer 661 will be opened and a new timing period started. However, if there is no defect at the height inspection station 300 for a period of fifteen minutes, or any other predetermined time interval, the circuit to the solenoid 663 will be completed and the switch 664 closed to complete the circuit to the alarm device 656.

The control for the inspection station 301 which gauges glassware for variances in outside diameter and run-out includes a conventional control system 668 which is identical to the control system 642. The control system 668 incorporates the conventional linear variable differential transformer 471 and is connected to the wire D by a wire 669 and to the wire E by the wire 670. A wire 671 extends from the control system 668 and is connected to a conventional relay or solenoid 672 of a switch actuator 673 for a pair of switches 674 and 675. A wire 676 extends between the solenoid 672 to the wire E. Thus, when a defect is indicated at the inspection station 301, the solenoid 672 is energized so as to move the switch actuator 673 and control the positions of the switches 674 and 675.

The switch 674 is incorporated in a line 677 which extends between the wire 649 and the wire E. Also incorporated in the lines 677 is the solenoid type actuator 343. The switch 674 is normally open, and when closed by the energization of the solenoid 672, causes the energization of the solenoid type actuator 343. A wire 678 is disposed in parallel to the solenoid type actuator 343 and has incorporated therein a light 679 to indicate the energization of the solenoid type actuator 343.

A wire 680 extends between the wire D and the switch 675, which switch is normally closed. A second wire 681 is connected to the switch 675 and has its opposite end connected to a conventional timer 682 which will be identical with the timer 661. A wire 683 extends from the timer 682 and is connected to a solenoid 684 of a solenoid actuator switch 685. The switch 685 is incorporated in a line 686 which extends between the wire 658 and the wire E. Thus, when the solenoid 684 is energized, the circuit to the audible alarm 656 will be completed. A wire 687 is disposed in parallel with the solenoid 684 and has incorporated therein a light 688 to indicate which of the circuits resulted in the energization of the alrm device 656.

The two light sources 510 are connected to the wires D and E by wires 689 and 690, respectively. Also, a conventional photoelectric cell unit 691 readily obtainable from numerous sources of supply and containing the same components as the photoelectric cell unit 615, of which the photoelectric cell pickup head 517 is a part, is connected to the wires D and E by wires 692 and 693, respectively. The photoelectric cell unit 691 controls the energization of a solenoid 694 of an actuator 695 for a pair of switches 696 and 697. The solenoid 694 is connected to the electrical system of the photoelectric cell unit 691 by wires 698 and 699. It is to be understood that the solenoid 694 is energized only when the photoelectric cell unit 691 indicates a flaw in an article of glassware being inspected.

The switch 696 is a normally open switch and it is incorporated in a line 700 which extends between the wire 649 and the wire E. Also incorporated in the line 700 is the solenoid type actuator 345. Thus, when the solenoid 694 is energized, the solenoid type actuator 345 will be energized. A wire 701 is connected in parallel with the solenoid type actuator 345 and has incorporated therein a light 702 to indicate when the solenoid type actuator 345 is energized.

A wire 703 extends between the wire D and the switch 697. Another wire 704 connects the switch 697 to a conventional timer 705 which is identical with the timers 661 and 682 which are Type 1101–34–277 time delay relay obtainable from Adams and Westlake Co. of Elkhart, Indiana. Another wire 706 connects the timer 705 to a solenoid 707 of a solenoid actuated switch 708. The switch 708 is incorporated in a line 709 which extends between the wire E and the wire 658 so that when the solenoid 707 is energized, the switch 708 will be closed and the alarm device 656 energized. It is to be understood that the switch 697 is a normally closed switch and is opened only when a defect at the photoelectric cell inspection station 302 is indicated. A wire 710 is disposed in parallel with the solenoid 707 and has incorporated therein a light 711 which indicates that the solenoid 707 has been energized to cause the actuation of the alarm device 656.

Although it has not been illustrated, it is to be understood that the electrical system may be provided with manual controls to individually test components thereof.

*Operation*

In the operation of the present invention, glassware, such as the sherbet glasses 5, pass along the lehr conveyor 6 in uniform rows and columns. As a row of glasses 5 breaks the light beam between the light source 151 and the photoelectric cell pickup head 152, the control 610 is energized so as to energize the electric clutch 65 and to release the electric brake 66. As a result, the shaft 55 will be driven to rotate the cam 92. The rotation of the cam 92 will result in the swinging of the support bar 106 downwardly so that the pickup heads 109 will engage the individual glasses 5 of a row of glasses.

Should the bases 407 be properly formed and the stems 408 properly shaped so that the bases 407 are substantially horizontally disposed, the pickup heads 109 will form a seal with the bases 407 of the inverted sherbet glasses 5. Then, as the support bar 106 is elevated, the sherbet glasses 5 with the properly formed bases 407 and stems 408 will be elevated with the support heads 109. The defective sherbet glasses 5 will remain on the lehr conveyor 6 and be delivered to the cull box 17.

The sherbet glasses 5 picked up by the pickup heads 109 will be swung into overlying relation to the transverse conveyor 9 where they will be automatically released by the unseating of the valve member 132 of each pickup head 109 through the engagement of the lever 134 with the stop bar 141. The sherbet glasses 5 are then deposited onto the transverse conveyor 9 while still in their inverted positions.

The transverse conveyor 9 will move the sherbet glasses 5 in single line arrangement across the lehr conveyor 6 to the right, as viewed in FIGURE 6. At the right end of the transverse conveyor 9, the sherbet glasses 5 will engage the glass inverting mechanism 12 which will simultaneously lower the sherbet glasses 5 onto the supply conveyor 11 and invert the sherbet glasses.

At this time, it is pointed out that the timing of the arrival of rows of sherbet glasses at the pickup point on the lehr conveyor 6 is such that the transfer mechanism 10 will have time to make a complete cycle and come to rest in position for the initiation of another cycle. The stopping of the transfer mechanism 10 at the same point at the end of each cycle is accomplished by the switch 146, as previously described. It is to be understood that the sherbet glasses 5 will be moved off of the transverse conveyor 9 prior to the setting of a next set of sherbet glasses thereon.

As the sherbet glasses 5 tumble onto the supply conveyor 11, they are disposed in upright relation and are spaced apart so that the time interval between adjacent sherbet glasses, even if all sherbet glasses of a row are transferred, will be substantially that desired for the efficient operation of the inspection mechanism 13.

As the sherbet glass 5 is presented to the inspection mechanism 13, it will trip the switch 524 to control the operation of the electric clutch 220 and the releasing of the electric brake 221. This will result in the rotation of the shaft 212. As the shaft 212 rotates, the drive wheel 267 and the cam 316 will be simultaneously rotated. However, when the cam 316 rotates, the movable cam 305 will be moved to an out-of-the-way position to permit the article holder 282 to engage about the sherbet glass being presented to the turret 281. After the article holder 282 aligned with the supply conveyor 11 closes, the driven wheel 268 of the Geneva drive 266 is begun to be driven by the drive wheel 267. Thus, the sherbet glass is firmly engaged by one of the article holders 282 prior to the rotation of the turret 281.

The sherbet glass 5 to be inspected is first presented to the height inspection station 300 where it is gauged for height. In the event it passes the inspection at this station, nothing happens. On the other hand, should it fail to pass the inspection, the solenoid type actuator 341 will be energized to push in the pin 332 corresponding to the particular station of the turret 281.

Irrespective of whether the sherbet glass 5 passes the inspection at the height inspection station 300, it is rotated to the inspection station 301 upon the next indexing of the turret 381. Here, it is inspected by the inspection mechanism located at the inspection station 301 for both outside diameter and run-out. In the event there is an imperfection in the outside diameter or the run-out of the sherbet glass 5 in the area of the rim thereof, the solenoid type actuator 343 will be energized so as to push in the pin 332 corresponding to the particular station of the turret 281 for the glassware.

The sherbet glass 5 is next presented to the photoelectric cell inspection station 302. Here, it is inspected for internal flaws in the glass in the area of the rim. In the event the sherbet glass 5 does not pass this inspection, the solenoid type actuator 345 is energized to push in the pin 332 corresponding to the station of the turret 281 for the article of glassware.

Should the sherbet glass 5 pass all of the three inspections, the pin 332 for its corresponding station remains projected, and as the sherbet glass 5 is next indexed to a position aligned with the visual inspection conveyor 15, the head 333 of the corresponding pin 332 engages the follower 338 of the actuator 337 for the switch 334, with the result that the cam 317 is moved out to engage the follower 292 for the article holder 282 holding the sherbet glass 5 which has just been inspected. As a result, the sherbet glass 5 will be released to the visual inspection conveyor 15. In the event a defect has been found in the sherbet glass 5 being inspected at any one of the three inspection stations, the head 333 of the pin 332 corresponding to the particular station carrying the sherbet glass 5 will have been moved inwardly and will miss the actuator for the switch 334. As a result, the sherbet glass 5 will not be discharged onto the visual inspection conveyor 15, but will remain in the turret 281 and move around to the discharge station 303 where all articles remaining in the turret 281 are discharged and returned to the lehr conveyor 6. The rejected glassware is then moved by the lehr conveyor into the cull box 17.

Those sherbet glasses 5 passing the various inspections of the inspection mechanism 13 now move along the visual inspection conveyor 15 and are picked up individually by a person who places them in cartons. As described above, the packer visually inspects the sherbet glasses and should any defects be found therein, the sherbet glasses are returned to the lehr conveyor 6 along the chute 16 and then moved by the lehr conveyor 6 into the cull box 17.

From the foregoing, it will be seen that novel and advantageous provision has been made for carrying out the desired end. However, attention is again directed to the fact that variations may be made in the example apparatus disclosed herein without departing from the spirit and scope of the invention as defined in the appended claims.

We claim:

1. An inspection system for glass articles and the like, said inspection system comprising a delivery conveyor, an inspection station disposed adjacent to and at one side of said delivery conveyor, said inspection station including inspection means and means for rejecting articles found to be imperfect, transfer means positioned adjacent said delivery conveyor and said inspection station for transferring articles from said delivery conveyor to said inspection station, said transfer means including means for accepting only a certain class of articles and leaving the unacceptable articles on the delivery conveyor and other means positioned adjacent said delivery conveyor and said inspection station for returning articles rejected at said inspection station to said delivery conveyor for disposal with the previously unaccepted articles.

2. The inspection system of claim 1 wherein said other means is in the form of a chute sloping downwardly from said inspection station to said delivery conveyor.

3. The inspection system of claim 1 wherein said transfer means includes means for inverting articles during the movement of the articles from said delivery conveyor to said inspection station.

4. The inspection system of claim 1 together with a receiving conveyor extending from said inspection station for receiving articles passed at said inspection station, a second inspection station intermediate the ends of said receiving conveyor, and means positioned intermediate said delivery conveyor and said receiving conveyor at said second inspection station for returning articles rejected at said second inspection station to said delivery conveyor.

5. The inspection system of claim 4 wherein the first mentioned inspection station includes mechanical inspecting apparatus and said second inspection station is a visual inspection station.

6. An inspection system for glass articles and the like, said inspection system comprising a delivery conveyor, a transverse conveyor extending transversely of and above said delivery conveyor, first transfer means for transferring articles from said delivery conveyor to said transverse conveyor, a supply conveyor extending alongside said delivery conveyor, second transfer means for transferring articles from said transverse conveyor to said supply conveyor, an inspection station at the end of said supply conveyor remote from said second transfer means, said inspection station including inspection means and means for rejecting articles found to be imperfect and a receiving conveyor extending from said inspection station for receiving inspected articles passing the inspection of said inspection station.

7. The inspection system of claim 6 together with third transfer means for transferring articles rejected at said inspection station back to said delivery conveyor.

8. The inspection system of claim 6 together with a second inspection station intermediate the ends of said receiving conveyor, and means for conveying articles rejected at said second inspection station back to said delivery conveyor.

9. The inspection system of claim 6 together with third transfer means for transferring articles rejected at said inspection station back to said delivery conveyor, a second inspection station intermediate the ends of said receiving conveyor, and means for conveying articles rejected at said second inspection station back to said delivery conveyor.

10. The inspection system of claim 6 wherein said inspection station is of the mechanized type and said inspection means includes a turret for sequentially positioning articles at a plurality of individual inspection stations, and means responsive to the results of the inspections at said individual inspection stations controlling the releasing of articles at said receiving conveyor.

11. The inspection system of claim 6 wherein said inspection station is of the mechanized type and said inspection means includes a turret for sequentially positioning articles at a plurality of individual inspection stations, means responsive to the results of the inspections at said individual inspection stations controlling the releasing of articles at said receiving conveyor, and said ejection means including means for ejecting all articles remaining on said turret after said turret passes said receiving conveyor.

12. The inspection system of claim 11 together with third transfer means for transferring articles rejected from said turret by said last mentioned means back to said delivery conveyor.

13. The inspection system of claim 1 wherein said transfer means for accepting only a certain class of articles includes vacuum pick-up heads, whereby an initial inspection of articles is made by said transfer means.

14. The inspection system of claim 6 wherein said second transfer means includes means for inverting articles in the course of transferring articles from said transverse conveyor to said supply conveyor.

15. The inspection system of claim 6 wherein said first transfer means for accepting only a certain class of articles includes vacuum pick-up heads, whereby an initial inspection of articles is made by said first transfer means and articles refused by said vacuum pick-up are left on said delivery conveyor.

16. A transfer system for glass articles and the like, said transfer system comprising a delivery conveyor, a transverse conveyor extending transversely of said delivery conveyor above said delivery conveyor, and transfer means for transferring articles from said delivery conveyor to said transverse conveyor, said transfer means including a support bar, at least one pick-up head on said support bar, a pivotally mounted arm connected to support bar, and drive means connected to said arm for imparting oscillatory movement to said arm to swing said support bar and said pick-up head from a position overlying said delivery conveyor to a position overlying said transverse conveyor and return.

17. The transfer system of claim 16 wherein said drive means includes a pinion connected to said arm, a rack meshed with said pinion, and means connected to said rack for imparting reciprocatory movement to said rack.

18. The transfer system of claim 16 wherein said support bar is rotatably connected to said arm, and means connected to said support bar for rotating said support bar during the swinging of said support bar, whereby said pick-up head remains directed towards said delivery conveyor at all times.

19. The transfer system of claim 16 wherein said pick-up head is in the form of a siphon bellows.

20. The transfer system of claim 16 wherein said pick-up head is in the form of a siphon bellows, said siphon bellows including an upper plate, an apertured lower plate, and a bellows extending between and secured to said plates in sealed relation, said lower plate having a resilient pad on the underside thereof for sealed engagement with the article to be transferred, a vent opening in said upper plate, and a valve normally closing said vent opening.

21. The transfer system of claim 20 wherein said valve has an operating lever, and means mounted adjacent said transverse conveyor for engagement with said operating lever to move said valve to an open position and release and lower the article carried by said pick-up head onto said transverse conveyor.

22. A transfer system for glass articles and the like, said transfer system comprising a delivery conveyor, a transverse conveyor extending transversely of said delivery conveyor above said delivery conveyor, and transfer means for transferring articles from said delivery conveyor to said transverse conveyor, said transfer means including a support bar, at least one pick-up head on said support bar, a pivotally mounted arm, means rotatably mounting said support bar on said arm, drive means connected to said arm for imparting oscillatory movement to said arm to swing said arm and said support bar about a pivot axis for said arm with said support bar and said pick-up head moving back and forth between an article receiving position overlying said delivery conveyor to an article releasing position overlying said transverse conveyor, a first sprocket having a center coaxial with said pivot axis and being fixed against rotation, a second sprocket aligned with said first sprocket and secured to said sprocket bar for rotation therewith, and a drive chain entrained over said first and second sprockets, whereby said pick-up head remains directed towards said delivery conveyor at all times.

23. The transfer system of claim 16 wherein said pick-up head is of the siphon bellows type and includes an upper plate, an apertured lower plate and a bellows extending between and secured to said upper and lower plates in sealed relation, said lower plate having a resilient pad on the underside thereof for sealed engagement with the article to be transferred, a vent opening in said upper plate to permit collapsing of said bellows, a valve normally closing said vent opening and preventing flow of air into said bellows, and an operating lever connected to said valve for engagement with a stop member to automatically release the article supported by the pick-up head.

24. The pick-up head of claim 23 wherein said lower plate has a flat underside and said pad is of a controlled firmness whereby the degree of imperfection in an article to be picked up by the pick-up head necessary to cause refusal of the article by the pick-up head is controlled.

25. In combination with a delivery conveyor having articles disposed thereon in inverted positions, a transfer system, said transfer system comprising a transverse conveyor extending transversely of said delivery conveyor and above said delivery conveyor, first transfer means for transferring articles from said delivery conveyor to said transverse conveyor while retaining the articles in their inverted positions, a supply conveyor extending generally alongside said delivery conveyor, and second transfer means for transferring the articles from said transverse conveyor to said supply conveyor, said second transfer means including article inverting means, whereby the articles are delivered to said supply conveyor in upright positions.

26. The transfer system of claim 25 wherein said first transfer means includes a suction type pick-up head which forms a seal with the base of an article to be transferred whereby articles having imperfectly formed or imperfectly positioned bases are refused by said first transfer means.

27. In combination with a delivery conveyor having articles disposed thereon in transverse rows, a transfer system comprising a transverse conveyor extending transversely of said delivery conveyor above said delivery conveyor, and transfer means for transferring articles of a row of said articles from said delivery conveyor to said transverse conveyor in single file arrangement, said transfer means including drive means, controls for said drive means for effecting a cycle operation of said transfer means with said transfer means completing a transfer operation and coming to rest prior to the arrival of a next row of articles to a pick-up position.

28. The transfer mechanism of claim 27 wherein said controls include means responsive to the arrival of a row of articles adjacent to a pick-up position to actuate said drive means.

29. The transfer mechanism of claim 27 wherein said controls are of the electrical type and include a photoelectric cell unit responsive to the arrival of a row of articles adjacent to a pick-up position to actuate said drive means.

30. The transfer mechanism of claim 27 wherein said drive means includes a continuously operating drive member and an electric clutch and brake assembly connected to said drive member, and said controls are of the electrical type and include a photoelectric cell unit for initiating operation of said drive means.

31. In combination with a delivery conveyor, a transfer system comprising a pair of supports mounted on opposite sides of said delivery conveyor, a transverse conveyor extending transversely of and above said delivery conveyor and having opposite ends secured to said supports in supported relation, a transfer mechanism extending between and supported by said supports in overlying relation to said delivery conveyor and adjacent said transverse conveyor for transferring articles from said delivery conveyor to said transverse conveyor, and drive means for said transfer mechanism, one of said supports being in the form of a housing, said drive means having a major portion thereof disposed within said one support.

32. In an inspection unit, a turret assembly comprising a turntable, drive means connected to said turntable for driving said turntable, a plurality of holders for glassware of the type having a base, a stem and a bowl, each of said holders including a pair of clamp arms pivotally connected to said turntable and having opposed cooperating jaw portions for loosely surrounding a glassware stem, each pair of said jaw portions having an upper recessed part forming a seat for a bowl of the glassware, whereby glassware is supported for both limited vertical movement and rotary movement, a plurality of stations about said turntable, and actuator means connected to said clamp arms for automatically pivoting said clamp arms between open and closed positions in timed relation to the positioning of said turntable relative to said stations, said actuator means including a lever rigidly secured to each of said clamp arms, a slide bar, means mounting said slide bar on said turntable for sliding movement radially of said turntable, a single pivot member pivotally connecting said clamp arms of each holder to said slide bar, and cam means cooperating with said slide bar to position each slide bar and thus control the positions of said clamp arms, said stations including a discharge station for defective glassware and a receiving station for glassware to be inspected, and said cam means including a fixed cam extending between said discharge station and said receiving station, a cam follower secured to each slide bar engageable with said fixed cam, said stations also including a delivery station for glassware passing the inspections of said inspection unit, a movable cam at said delivery station for operating said clamp arms to release an article of glassware when presented to said delivery station and no imperfections have been found therein, a movable cam forming an extension of said fixed cam in alignment with said receiving station, and means operable by said drive means to withdraw said movable cam upon the initiating of said drive means, whereby an article at said receiving station is automatically received between said jaws upon the actuation of said drive means.

33. A height inspection mechanism for glassware comprising rotating platform means for receiving glassware and rotating the glassware about the vertical axis of the glassware during an inspection thereof, a feeler located about said platform for engaging a lip of an article of glassware, means mounting said feeler for vertical movement, and an electric control device connected to said feeler for operation by said feeler to indicate when the height of glassware is outside of predetermined limits, said platform having an upwardly and inwardly sloping surface, and carrier means for delivering glassware to said platform with the under surface of the glassware being disposed below the upper surface of said platform, whereby glassware engaging said platform will ride up on said platform and out of contact with said carrier.

34. The mechanism of claim 33 together with support means carrying said feeler and said feeler mounting means with said feeler normally being out of the path of glassware, and means connected to said support means for positioning said support means with said feeler engaging glassware in timed relation to the seating of glassware on said platform.

35. A runout inspection mechanism for inspecting the rim area of glassware, said mechanism comprising at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, and an electric control device connected to said feeler for operation by said feeler to indicate when the circumference and roundness of glassware rim areas are outside of predetermined limits, said feeler being in the form of a wheel having a lower cylindrical rim engaging surface and an upper frusto-conical lip engaging surface for alignment of said rim engaging surface with glassware rims.

36. The mechanism of claim 35 together with means mounting said wheel for vertical movement, said means including a verticle axle for said wheel of a length greater than the length of said wheel.

37. A runout inspection mechanism for inspecting the rim area of glassware, said mechanism comprising at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, and an electric control device connected to said feeler for operation by said feeler to indicate when the circumference and roundness of glassware rim areas are outside of predetermined limits, said electric control device being a component of an electric circuit including a normally open switch, and means for closing said switch in relation to and after the seating of glassware in said rollers and after said feeler has been engaged with the glassware.

38. A runout inspection mechanism for inspecting the rim area of glassware, said mechanism comprising at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, and an electric control device connected to said feeler for operation by said feeler to indicate when the circumference and roundness of glassware rim areas are outside of predetermined limits, a carrier for positioning glassware in engagement with said drive roller, support means carrying said feeler and said feeler mounting means with said feeler normally being out of the path of glassware, and means connected to said support means for positioning said feeler in engagement with glassware in timed relation with the engagement of the glassware with said drive roller.

39. An inspection unit for glassware comprising a turret having a plurality of individual holders for glassware, a height inspection mechanism and a runout inspection mechanism spaced about said turret for inspecting glassware carried by said turret, said height inspection mechanism including rotating platform means for receiving glassware and rotating the glassware about the vertical axis of the glassware during an inspection thereof, a feeler located above said platform for engaging a lip of an article of glassware, means mounting said feeler for vertical movement, and an electric control device connected to said feeler for operation by said feeler to indicate when the height of glassware is outside of predetermined limits, said runout inspection mechanism including at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, and an electric control device connected to said feeler for operation by said feeler to indicate when the circumference and roundness of glassware rim areas are outside of predetermined limits, and a common drive for said platform and said drive roller.

40. A photoelectric cell inspection mechanism for inspecting the rim area of glassware for internal flaws and for use in combination with a glassware conveyor having holders for continuously supporting glassware during the inspection thereof and permitting rotary movement and only limited vertical movement of the glassware, said inspection mechanism comprising at least three rollers generally lying in a common plane and being engageable with the rim area of glassware, at least one of said said rollers being a drive roller, a fixed light source sloping upwardly and being adapted to intersect the rim area of glassware, a photoelectric cell pick-up head centered with respect to said rollers and being mounted above the plane of said rollers, a mirror assembly normally disposed intermediate said photoelectric cell pick-up head and the plane of said rollers, and support means for lowering said mirror assembly into an article of glassware positioned between said rollers, whereby light from said light source striking a defect in the rim area of glassware will be reflected first to said mirror assembly and then to said photoelectric cell pick-up head.

41. The mechanism of claim 40 wherein said light source includes two separate light beams having axes disposed on opposite sides of a radial line extending from the center of an article of glassware being inspected, said light beams being in converging relation, and said mirror assembly including a mirror for each of said light beams.

42. The mechanism of claim 40 together with a turret for positioning glassware relative to said rollers, drive means for said turret, and drive means for said mirror assembly support means connected to said turret drive means for timing the lowering and raising of said mirror assembly with the indexing of said turret.

43. The mechanism of claim 40 wherein said photoelectric cell pick-up head is a component of a photoelectric cell unit, an electric signal circuit responsive to the detection of a defect in glassware by the inspection mechanism, said photoelectric cell unit controlling a switch forming a part of said signal circuit, said signal circuit also including a normally open switch, and means for closing said normally open switch in timed relation to and after the lowering of said mirror assembly into glassware.

44. An inspection mechanism for glassware comprising a turret having a plurality of individual holders for glassware, a runout inspection mechanism and a photoelectric cell inspection mechanism spaced about said turret, said runout inspection mechanism including at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, and an electric control device connected to said feeler for operation by said feeler to indicate when the circumference and roundness of glassware rim areas are outside of predetermined limits, said photoelectric cell inspection mechanism including at least three rollers generally lying in a common plane and being engageable with the rim area of glassware, at least one of said rollers being a drive roller, a fixed light source sloping upwardly and being adapted to intersect the rim area of glassware, a photoelectric cell pick-up head centered with respect to said rollers and being mounted above the plane of said rollers, a mirror assembly normally disposed intermediate said photoelectric cell pick-up head and the plane of said rollers, support means for lowering said mirror assembly into an article of glassware positioned between said rollers, whereby light from said light source striking a defect in the rim area of glassware will be reflected first to said mirror assembly and then to said photoelectric cell pick-up head, and a common drive for said drive rollers.

45. An inspection mechanism for glassware comprising a turret having a plurality of individual holders for glassware, a height inspection mechanism, a runout inspection mechanism, and a photoelectric cell inspection unit spaced about said turret, said height inspection mechanism including a rotating platform on which glassware is intended to be seated during an inspection thereof, a feeler located above said platform for engaging a lip of an article of glassware, means mounting said feeler for vertical movement, and an electric control device connected to said feeler for operation by said feeler to indicate when the height of glassware is outside of predetermined limits, said runout inspection mechanism including at least three rollers generally lying in a common plane and being engageable with the rim area of glassware, at least one of said rollers being a drive roller, a feeler located above the plane of said rollers for engaging a rim of an article of glassware, means mounting said feeler for movement in the plane of a rim of a glassware article and radially of the rim, an electric control device connected to said feeler for operation by said feeler to indicate when the circumference and roundness of glassware rim areas are outside of predetermined limits, said photoelectric cell inspection mechanism including at least three rollers generally lying in a common plane and being engageable with the rim area of glassware, at least one of said rollers being a drive roller, a fixed light source sloping upwardly and being adapted to intersect the rim area of glassware, a photoelectric cell pick-up head centered with respect to said rollers and being mounted above the plane of said rollers, a mirror assembly normally disposed intermediate said photoelectric cell pick-up head and the plane of said rollers, support means for lowering said mirror assembly into an article of glassware positioned between said rollers, whereby light from said light source striking a defect in the rim area of glassware will be reflected first to said mirror assembly and then to said photoelectric cell pick-up head, and a common drive for said rotating platform and said drive rollers.

46. The mechanism of claim 33 wherein said electric control device is a component of a first signal circuit for indicating a defect in an article being inspected, and a second signal circuit for indicating that a defect has not been indicated by said first signal circuit during a predetermined time interval.

47. The mechanism of claim 35 wherein said electric control device is a component of a first signal circuit for indicating a defect in an article being inspected, and a second signal circuit for indicating that a defect has not been indicated by said first signal circuit during a predetermined time interval.

48. The mechanism of claim 40 wherein said photoelectric cell pick-up head is a component of a photoelectric cell unit, a first signal circuit responsive to the detection of a defect in glassware by the inspection mechanism, said photoelectric cell unit controlling a switch forming a part of said signal circuit, and a second signal circuit for indicating that a defect has not been indicated by said first signal circuit during a predetermined time interval.

49. An inverter for inverting glassware passing from an upper conveyor to a lower conveyor, said inverter including a pair of spaced apart guides, said guides having convex downwardly curving supporting surfaces, the receiving ends of said guides being disposed above the surface of the upper conveyor, whereby as an article of glassware engages said guides it first trips and assumes a generally horizontal position resting on said guides and then slides gently to an upright position overlying the lower conveyor.

50. The inverter of claim 49 wherein said guides are formed of a firm plastic material.

51. An inspection system for articles of glassware each of which has a base and a rim to be inspected, said inspection system comprising a delivery conveyor for delivering inverted articles, a transverse conveyor extending transversely of and above said delivery conveyor, first transfer means for elevating and transferring articles from said delivery conveyor to said transverse conveyor, said first transfer means including vacuum pick-up heads for engaging properly formed article bases and transferring such articles having properly formed bases while leaving unaccepted articles on said delivery conveyor, a supply conveyor extending alongside said delivery conveyor, second transfer means extending between said transverse conveyor and said supply conveyor for delivering said articles from said transverse conveyor to said supply conveyor, said second transfer means including means for inverting articles to upright positions, an inspection station at the end of said supply conveyor remote from said transverse conveyor, said inspection station including means for mechanically inspecting the rims of articles and rejecting detected imperfect articles, a receiving conveyor for receiving articles passing the inspection means, and third transfer means extending between said inspection station and said delivery conveyor for returning rejected articles to said delivery conveyor for disposal together with the initially unaccepted articles.

52. The inspection system of claim 51 together with a second inspection station intermediate the end of said receiving conveyor, and means for conveying articles rejected at said second inspection station back to said delivery conveyor.

53. The inspection system of claim 51 wherein said inspection station inspection means includes means for checking rim runout, means for checking rim height, and photoelectric inspection means for checking for internal flaws, and means operable by each of said checking means for operating said article rejecting means.

References Cited in the file of this patent
UNITED STATES PATENTS

| | | |
|---|---|---|
| 1,083,397 | Gilbert | Jan. 6, 1914 |
| 1,557,505 | Wadsworth | Oct. 13, 1925 |
| 2,309,231 | Bagley | Jan. 26, 1943 |
| 2,338,868 | Owens | Jan. 11, 1944 |
| 2,352,091 | Fedorchak et al. | June 20, 1944 |
| 2,359,433 | McNamara | Oct. 3, 1944 |
| 2,371,748 | Fedorchak | Mar. 20, 1945 |
| 2,422,036 | Oakley | June 10, 1947 |
| 2,485,040 | Cupo | Oct. 18, 1949 |
| 2,542,090 | Lorenz | Feb. 20, 1951 |
| 2,557,260 | Clark | June 19, 1951 |
| 2,623,648 | Rowe | Dec. 30, 1952 |
| 2,642,173 | Wehmiller | June 16, 1953 |
| 2,648,723 | Goldsmith | Aug. 11, 1953 |
| 2,682,802 | Fedorchak | July 6, 1954 |
| 2,695,098 | Rendel | Nov. 23, 1954 |
| 2,696,296 | Simpson | Dec. 7, 1954 |
| 2,701,637 | Rundt | Feb. 8, 1955 |
| 2,713,419 | Hayes | July 19, 1955 |
| 2,776,034 | Jardt | Jan. 1, 1957 |
| 2,793,747 | Pridy | May 28, 1957 |
| 2,812,061 | Pfister | Nov. 5, 1957 |
| 2,898,801 | Rockafellow | Aug. 11, 1959 |
| 2,902,151 | Miles | Sept. 1, 1959 |